(12) United States Patent
Yamashita

(10) Patent No.: US 11,078,982 B2
(45) Date of Patent: Aug. 3, 2021

(54) DAMPER

(71) Applicant: Hitachi Automotive Systems, Ltd., Ibaraki (JP)

(72) Inventor: Mikio Yamashita, Zama (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 154 days.

(21) Appl. No.: 16/486,846

(22) PCT Filed: Mar. 7, 2018

(86) PCT No.: PCT/JP2018/008702
§ 371 (c)(1),
(2) Date: Aug. 19, 2019

(87) PCT Pub. No.: WO2018/164167
PCT Pub. Date: Sep. 13, 2018

(65) Prior Publication Data
US 2020/0271186 A1   Aug. 27, 2020

(30) Foreign Application Priority Data

Mar. 10, 2017 (JP) .............................. JP2017-046272

(51) Int. Cl.
*F16F 9/348* (2006.01)

(52) U.S. Cl.
CPC .......... *F16F 9/348* (2013.01); *B60G 2202/24* (2013.01); *B60G 2206/41* (2013.01)

(58) Field of Classification Search
CPC ........ F16F 9/348; F16F 9/3485; F16F 9/3484; F16F 9/062; F16F 9/465; B60G 2202/24;
(Continued)

(56) References Cited

U.S. PATENT DOCUMENTS 4,673,068 A * 6/1987 De Bruijn ............. F16F 9/3484
188/315
9,597,941 B2 * 3/2017 Yamashita .............. F16F 9/465
(Continued)

FOREIGN PATENT DOCUMENTS

| CN | 105793603 | 7/2016 |
| CN | 105793603 A | 7/2016 |

(Continued)

OTHER PUBLICATIONS

International Search Report of PCT/JP2018/008702 dated May 29, 2018.
(Continued)

*Primary Examiner* — Robert A. Siconolfi
*Assistant Examiner* — San M Aung
(74) *Attorney, Agent, or Firm* — Mattingly & Malur, P.C.

(57) ABSTRACT

A damper includes a cylinder in which a working fluid is enclosed, a piston which is slidably inserted into the cylinder, a piston rod which is connected with the piston, a disk valve which is provided to restrict a flow of a working fluid caused by sliding of the piston and to close an opening portion of a tubular case member, an annular seal portion which is provided on at least one surface side of the disk valve, and a chamber which is partitioned by the disk valve and the seal portion. Recessed portions and projecting portions are alternately formed in the disk valve.

11 Claims, 18 Drawing Sheets

(58) Field of Classification Search
CPC .... B60G 2206/41; B60G 13/08; B60G 17/08; B60G 2500/114
USPC .............................. 188/322.13, 314, 322.15
See application file for complete search history.

(56) References Cited

U.S. PATENT DOCUMENTS

| | | | |
|---|---|---|---|
| 9,868,331 B2 | 1/2018 | Yamashita | |
| 2011/0147147 A1* | 6/2011 | Murakami | F16F 9/465 |
| | | | 188/314 |
| 2011/0214953 A1 | 9/2011 | Maeda et al. | |

FOREIGN PATENT DOCUMENTS

| | | | | |
|---|---|---|---|---|
| JP | 2011-202800 A | | 10/2011 | |
| JP | 5365804 B2 | | 12/2013 | |
| JP | 2014149005 A | * | 8/2014 | ............ F16F 9/3484 |
| KR | 10-2008-0064446 A | | 7/2008 | |

OTHER PUBLICATIONS

Written Opinion of PCT/JP2018/008702 dated May 29, 2018.
Korean Office Action received in corresponding Korean Application No. 10-2019-7022816 dated Dec. 15, 2020.
Chinese Office Action received in corresponding Chinese Application No. 201880014062.4 dated Aug. 17, 2020.
Wang Xinjiang, et al.; "Pro/Engineer Wildfire 4.0 Sheet metal design and welding design tutorial", p. 87, Mettallurigical Industry Press Co., Ltd., Aug. 2014.
Pro/Engineer Wildfire 4.0 . . . 2014; dated Aug. 7, 2020; pp. 1-3.
Korean Application received in corresponding Korean Application No. 10-2019-7022816 dated Dec. 15, 2020.
Chinese Office Action received in corresponding Chinese Application No. 201880014062.4 dated Apr. 8, 2021.
Wu, C. et al., "Microparticle Adhesion and Removal", Metallurgical Industry Press, Jan. 30, 2014, pp. 2-5.

* cited by examiner

DAMPER

TECHNICAL FIELD

The present invention relates to a damper.

Priority is claimed on Japanese Patent Application No. 2017-046272, filed Mar. 10, 2017, the content of which is incorporated herein by reference.

BACKGROUND ART

There are dampers in which a damping force can vary in response to a frequency.

CITATION LIST

Patent Literature

[Patent Literature 1]
Japanese Unexamined Patent Application, First Publication No. 2011-202800

SUMMARY OF INVENTION

Technical Problem

In dampers, there is demand for improvement in productivity.

An object of the present invention is to provide a damper of which productivity can be improved.

Solution to Problem

According to an aspect of the present invention, there is provided a damper including a cylinder in which a working fluid is enclosed, a piston which is slidably inserted into the cylinder, a piston rod which is connected with the piston, a disk valve which is provided to restrict a flow of a working fluid caused by sliding of the piston and to close an opening portion of a tubular case member, an annular seal portion which is provided on at least one surface side of the disk valve, and a chamber which is partitioned by the disk valve and the seal portion. Recessed portions and Projecting portions are alternately formed in the disk valve.

According to another aspect of the present invention, there is provided a damper including an annular bendable disk which is disposed inside a case member while being internally penetrated by a shaft portion, which is supported by an inner circumferential side or an outer circumferential side, and in which an annular elastic member sealing a part between the disk and the case member or a part between the disk and the shaft portion is provided on a non-support side. An annular gap is provided between the disk and the case member or the shaft portion. The elastic member is provided to be fixedly attached to both surfaces of the disk with the gap therebetween. A seal portion is provided on one surface side of the disk, and a stopper portion is provided on an opposite surface side. The elastic member is partially and fixedly attached to the opposite surface of the disk in a circumferential direction.

According to still another aspect of the present invention, there is provided a damper including an annular bendable disk which is disposed inside a case member while being internally penetrated by a shaft portion, which is supported by an inner circumferential side or an outer circumferential side, and in which an annular elastic member sealing a part between the disk and the case member or a part between the disk and the shaft portion is provided on a non-support side. An annular gap is provided between the disk and the case member or the shaft portion. The elastic member is provided to be fixedly attached to both surfaces of the disk with the gap therebetween. A seal portion is provided on one surface side of the disk, and a stopper portion is provided on an opposite surface side. A plurality of cut portions are provided on the gap side of the disk.

Advantageous Effects of Invention

According to the foregoing dampers, productivity can be improved.

DESCRIPTION OF EMBODIMENTS

First Embodiment

Figure 1:
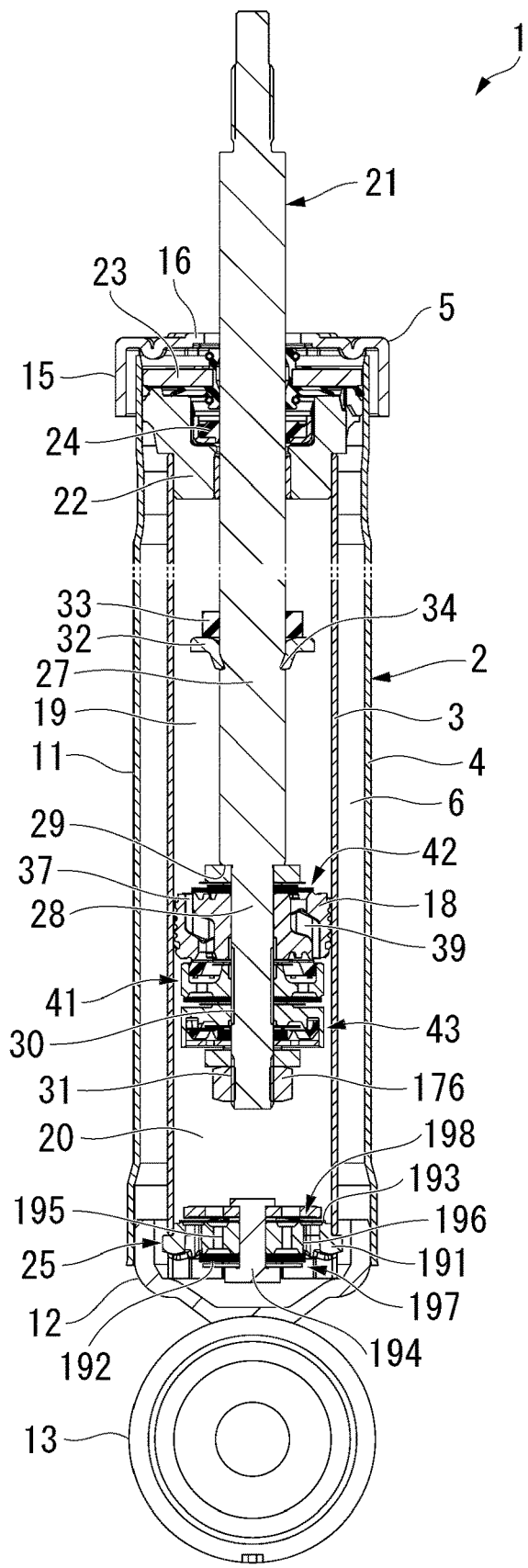
FIG. 1 is a cross-sectional view illustrating a damper of a first embodiment.

A first embodiment according to the present invention will be described based on FIGS. 1 to 6. Hereinafter, for the convenience of description, the upward in the drawings will be described as "up", and the downward in the drawings will be described as "down".

As illustrated in FIG. 1, a damper 1 of the first embodiment is a so-called double cylinder oil pressure damper. The damper 1 includes a cylinder 2 in which oil (not illustrated) used as a working fluid is enclosed. The cylinder 2 has a cylindrical inner cylinder 3, an outer cylinder 4 having a bottomed cylindrical shape, and a cover 5. The outer cylinder 4 has a larger diameter than the inner cylinder 3 and is concentrically provided with the inner cylinder 3 such that the inner cylinder 3 is covered. The cover 5 covers an upper opening side of the outer cylinder 4. In the cylinder 2, a reservoir chamber 6 is formed between the inner cylinder 3 and the outer cylinder 4.

The outer cylinder 4 is constituted of a cylindrical barrel member 11 and a bottom member 12. The bottom member 12 is fitted and fixed to a lower portion side of the barrel member 11 and closes the lower portion of the barrel member 11. An attachment eye 13 is fixed to an outer side of the bottom member 12 opposite to the barrel member 11.

The cover 5 has a tubular portion 15 and an inner flange portion 16. The inner flange portion 16 extends radially inward from an upper end side of the tubular portion 15. The cover 5 covers the barrel member 11 such that an upper end opening portion of the barrel member 11 is covered with the inner flange portion 16 and an outer circumferential surface of the barrel member 11 is covered with the tubular portion 15. In the cover 5, in this state, a part of the tubular portion 15 is swaged radially inward and is fixed to the barrel member 11.

The damper 1 includes a piston 18. The piston 18 is slidably inserted into the inner cylinder 3 of the cylinder 2. This piston 18 is fitted into the inner cylinder 3. This piston 18 partitions the inside of the inner cylinder 3 into two chambers, which are an upper chamber 19 (cylinder chamber, one cylinder chamber) on one side and a lower chamber 20 (cylinder chamber) on the opposite side. Oil (working fluid) is enclosed inside the upper chamber 19 and the lower chamber 20 in the inner cylinder 3. Oil and gas as working fluid are enclosed inside the reservoir chamber 6 between the inner cylinder 3 and the outer cylinder 4.

The damper 1 includes a piston rod 21. One end side of the piston rod 21 in an axial direction is disposed inside the inner cylinder 3 of the cylinder 2, and this one end side is connected with the piston 18. The opposite end side of the piston rod 21 in the axial direction extends to the outside of the cylinder 2. The piston 18 and the piston rod 21 move integrally. An extension stroke of the damper 1 is a stroke in which the protruding amount of the piston rod 21 from the cylinder 2 increases. During this extension stroke, the piston 18 moves to the upper chamber 19 side. A compression stroke of the damper 1 is a stroke in which the protruding amount of the piston rod 21 from the cylinder 2 decreases. During this compression stroke, the piston 18 moves to the lower chamber 20 side.

A rod guide 22 is fitted on the upper end opening side of the inner cylinder 3 and the outer cylinder 4. A seal member 23 is mounted in the outer cylinder 4 on the upper side further outward than the rod guide 22 in the cylinder 2. A frictional member 24 is provided between the rod guide 22 and the seal member 23. All of the rod guide 22, the seal member 23, and the frictional member 24 have an annular shape. The piston rod 21 is slidably inserted through the inner side of each of the rod guide 22, the frictional member 24, and the seal member 23. The piston rod 21 is inserted through the rod guide 22, the frictional member 24, and the seal member 23 and extends to the outside from the inside of the cylinder 2.

The rod guide 22 supports the piston rod 21 while restricting its radial movement and allowing axial movement. The rod guide 22 guides movement of this piston rod 21. In the seal member 23, an outer circumferential portion thereof adheres to the outer cylinder 4. In the seal member 23, an inner circumferential portion thereof comes into sliding contact with the outer circumferential portion of the piston rod 21 moving in the axial direction. The seal member 23 prevents oil inside the inner cylinder 3 and high-pressure gas and oil in the reservoir chamber 6 inside the outer cylinder 4 from leaking out to the outside. In the frictional member 24, an inner circumferential portion thereof comes into sliding contact with the outer circumferential portion of the piston rod 21. The frictional member 24 generates frictional resistance in the piston rod 21. The frictional member 24 is not intended for sealing.

In the rod guide 22, an outer circumferential portion thereof has a stepped shape in which the upper portion has a larger diameter than the lower portion. The lower portion of the rod guide 22 having a small diameter is fitted into the inner circumferential portion at an upper end of the inner cylinder 3. The upper portion of the rod guide 22 having a large diameter is fitted into the inner circumferential portion in the upper portion of the outer cylinder 4. A base valve 25 is installed on the bottom member 12 of the outer cylinder 4. The base valve 25 defines the lower chamber 20 and the reservoir chamber 6. The inner circumferential portion of a lower end of the inner cylinder 3 is fitted into this base valve 25. A part (not illustrated) of the upper end portion of the outer cylinder 4 is swaged radially inward. This swaged part of the outer cylinder 4 and the rod guide 22 sandwich the seal member 23 therebetween.

The piston rod 21 has a main shaft portion 27 and an attachment shaft portion 28 (shaft portion). The attachment shaft portion 28 has a smaller diameter than the main shaft portion 27. The attachment shaft portion 28 is disposed inside the cylinder 2. The piston 18 and the like are attached to the attachment shaft portion 28. An end portion of the main shaft portion 27 on a side closer to the attachment shaft portion 28 constitutes a shaft step portion 29. The shaft step portion 29 expands in an axially orthogonal direction. A passage groove 30 is formed in the outer circumferential portion of the attachment shaft portion 28 at an intermediate position in the axial direction. The passage groove 30 is formed by cutting out the outer circumferential portion of the attachment shaft portion 28. The passage groove 30 extends in the axial direction of the attachment shaft portion 28. A male screw 31 is formed in the outer circumferential portion of the attachment shaft portion 28. The male screw 31 is formed at a distal end position on a side opposite to the main shaft portion 27 of the attachment shaft portion 28 in the axial direction. The passage groove 30 is formed such that a cross-sectional shape on a surface orthogonal to a central axis of the piston rod 21 becomes any of a rectangular shape, a square shape, and a D-shape.

A stopper member 32 and a damping element 33 both having an annular shape are provided in the piston rod 21. The stopper member 32 and the damping element 33 are provided in a part between the piston 18 of the main shaft portion 27 and the rod guide 22. The piston rod 21 is inserted through the inner circumferential side of the stopper member 32. The stopper member 32 is swaged and is fixed to a fixing groove 34 recessed radially inward in the main shaft portion 27. The piston rod 21 is also inserted through the inner side of the damping element 33. The damping element 33 is disposed between the stopper member 32 and the rod guide 22.

In the damper 1, for example, a part of the piston rod 21 protruding from the cylinder 2 is disposed in the upper portion and is supported by a vehicle body. In the damper 1, for example, the attachment eye 13 on the cylinder 2 side is disposed in the lower portion and is connected with a wheel side. In the damper 1, on the contrary, the cylinder 2 side may be supported by the vehicle body, and the piston rod 21 may be connected with the wheel side. In the damper 1, when the wheel vibrates during traveling, the positions of the cylinder 2 and the piston rod 21 relatively change in response to the vibration. This change is suppressed due to fluid resistance in a flow channel formed in at least one of the piston 18 and the piston rod 21. As described below in detail, the damper 1 is made such that the fluid resistance in the flow channel formed in at least one of the piston 18 and the piston rod 21 varies depending on the speed or the amplitude of vibration. In this manner, a ride quality of a vehicle is improved by suppressing vibration. Vibration generated by the wheel acts between the cylinder 2 and the piston rod 21. Furthermore, an inertial force and a centrifugal force generated in the vehicle body during traveling of the vehicle also act between the cylinder 2 and the piston rod 21. For example, when a traveling direction is changed in accordance with an operation of the steering wheel, a centrifugal force is generated in the vehicle body. A force based on this centrifugal force acts between the cylinder 2 and the piston rod 21. As described below, the damper 1 has favorable characteristics with respect to vibration based on a force generated in the vehicle body during traveling of the vehicle. The damper 1 realizes high stability during traveling of the vehicle.

Figure 2:
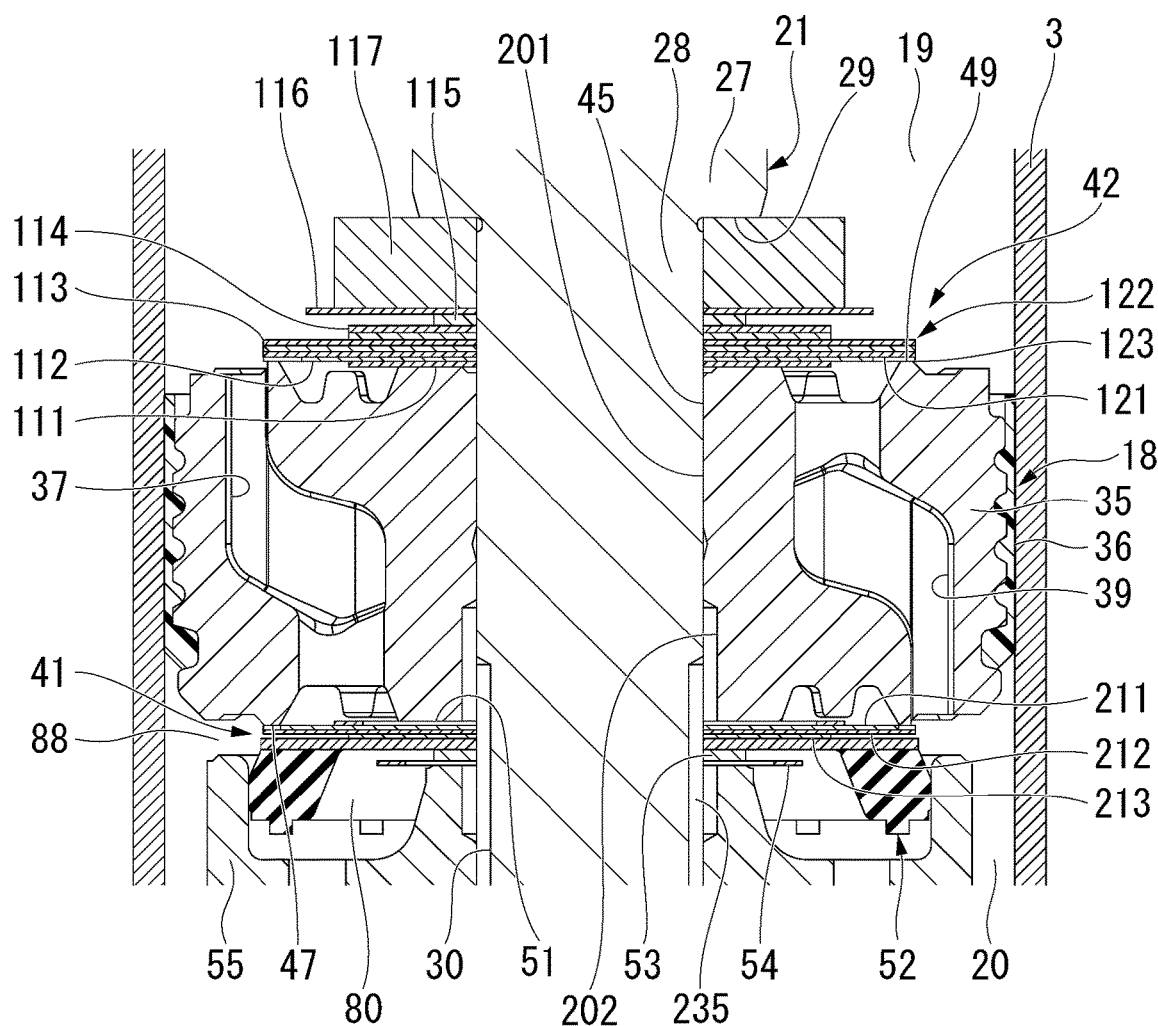
FIG. 2 is a partial cross-sectional view illustrating a part around a piston of the damper of the first embodiment.

As illustrated in FIG. 2, the piston 18 is constituted of a metal piston main body 35 and a synthetic resin sliding member 36. The piston main body 35 is supported by the piston rod 21. The sliding member 36 has an annular shape and is integrally mounted on the outer circumferential surface of the piston main body 35. In the piston 18, the sliding member 36 slides inside the inner cylinder 3.

A plurality of passage holes 37 and a plurality of passage holes 39 are provided in the piston main body 35. Since FIG. 2 illustrates a cross section, only one of the plurality of passage holes 37 is illustrated. Since FIG. 2 illustrates a cross section, only one of the plurality of passage holes 39 is illustrated as well. The plurality of passage holes 37 cause the upper chamber 19 and the lower chamber 20 to communicate with each other. The plurality of passage holes 39 also cause the upper chamber 19 and the lower chamber 20 to communicate with each other. The plurality of passage holes 37 are formed at a uniform pitch in a circumferential direction with one passage hole 39 interposed therebetween. As a result, the number of the plurality of passage holes 37 is half the number of all of the passage holes 37 and 39. In the plurality of passage holes 37, a first side (upward in FIG. 2) which is one side of the piston 18 in the axial direction opens radially outward in the piston 18. In the plurality of passage holes 37, a second side (downward in FIG. 2) which is the opposite side of the piston 18 in the axial direction opens radially inward in the piston 18.

A damping force generation mechanism 41 is provided in the passage holes 37. The damping force generation mechanism 41 generates a damping force by opening and closing passage portions inside the passage holes 37. The damping force generation mechanism 41 is disposed on the lower chamber 20 side in the axial direction, which is one end side of the piston 18 in the axial direction. The damping force generation mechanism 41 is attached to the piston rod 21. The damping force generation mechanism 41 is disposed on the lower chamber 20 side. Accordingly, the passage portion formed inside each of the plurality of passage holes 37 constitutes a passage in which oil flows out from the upper chamber 19 on one side toward the lower chamber 20 on the opposite side during movement of the piston 18 to the upper chamber 19 side, that is, during an extension stroke. The oil is a working fluid. The damping force generation mechanism 41 is provided with respect to the passage portions inside the passage holes 37. The damping force generation mechanism 41 generates a damping force by suppressing the flow of oil in the passage portions inside the passage holes 37 on the extension side. The damping force generation mechanism 41 serves as a damping force generation mechanism on the extension side.

The passage holes 39 shown in FIG. 2 which constitutes the remaining half of the number are formed at a uniform pitch in the circumferential direction with one passage hole 37 interposed therebetween. In the passage holes 39, the second side (downward in FIG. 2) which is the opposite side of the piston 18 in the axial direction opens radially outward in the piston 18. In the passage holes 39, the first side (upward in FIG. 2) which is one side of the piston 18 in the axial direction opens radially inward in the piston 18.

A damping force generation mechanism 42 is provided in the passage holes 39. The damping force generation mechanism 42 generates a damping force by opening and closing the passage portions inside the passage holes 39. The damping force generation mechanism 42 is disposed on the upper chamber 19 side in the axial direction, which is opposite end side of the piston 18 in the axial direction. The damping force generation mechanism 42 is attached to the piston rod 21. The damping force generation mechanism 42 is disposed on the upper chamber 19 side. Accordingly, the passage portion formed inside each of the plurality of passage holes 39 constitutes a passage in which oil flows out from the lower chamber 20 toward the upper chamber 19 during movement of the piston 18 to the lower chamber 20 side, that is, during a compression stroke. The damping force generation mechanism 42 is provided to the passage portions inside these passage holes 39. The damping force generation mechanism 42 generates a damping force by suppressing the flow of oil in the passage portions inside the passage holes 39 on the compression side. The damping force generation mechanism 42 serves as a damping force generation mechanism on the compression side.

As described above, the passage portions inside the plurality of passage holes 37 and the passage portions inside the plurality of passage holes 39 communicate with each other such that oil flows between the upper chamber 19 and the lower chamber 20 in accordance with movement of the piston 18. Oil passes through the passage portions inside the passage holes 37 when the piston rod 21 and the piston 18 move to the extension side (upward in FIG. 2). Oil passes through the passage portions inside the passage holes 39 when the piston rod 21 and the piston 18 move to the compression side (downward in FIG. 2).

The piston main body 35 has a substantially circular plate shape. A fitting hole 45 is formed in a center of the piston main body 35 to axially penetrate in a radial direction. The attachment shaft portion 28 of the piston rod 21 is fitted into the fitting hole 45. In the end portion of the piston main body 35 on the lower chamber 20 side in the axial direction, a part thereof between the fitting hole 45 and the passage holes 37 supports the inner circumferential side of the damping force generation mechanism 41. In the end portion of the piston main body 35 on the upper chamber 19 side in the axial direction, a part thereof between the fitting hole 45 and the passage holes 39 supports the inner circumferential side of the damping force generation mechanism 42.

An annular valve seat portion 47 is formed in the end portion of the piston main body 35 on the lower chamber 20 side in the axial direction. The valve seat portion 47 is formed on the outer side of the piston main body 35 in the radial direction beyond openings of the passage holes 37 of the piston main body 35 on the lower chamber 20 side. The valve seat portion 47 is a part of the damping force generation mechanism 41. In addition, an annular valve seat portion 49 is formed in the end portion of the piston main body 35 on the upper chamber 19 side in the axial direction. The valve seat portion 49 is formed on the outer side of the piston main body 35 in the radial direction beyond openings of the passage holes 39 of the piston main body 35 on the upper chamber 19 side. The valve seat portion 49 is a part of the damping force generation mechanism 42. The fitting hole 45 of the piston main body 35 has a small diameter hole portion 201 and a large diameter hole portion 202. The small diameter hole portion 201 is provided on the valve seat portion 49 side of the fitting hole 45 in the axial direction. The attachment shaft portion 28 of the piston rod 21 is fitted into the small diameter hole portion 201. The large diameter hole portion 202 has a diameter larger than that of the small diameter hole portion 201. The large diameter hole portion 202 is provided on the valve seat portion 47 side in the axial direction with respect to the small diameter hole portion 201 of the fitting hole 45.

In the piston main body 35, a side opposite to the fitting hole 45 of the valve seat portion 47 has a stepped shape of which the height in the axial direction is lower than that of the valve seat portion 47. In the piston main body 35, the openings on the lower chamber 20 side in the passage portions inside the passage holes 39 on the compression side are disposed in this stepped part. In addition, similarly, in the piston main body 35, a side opposite to the fitting hole 45 of the valve seat portion 49 has a stepped shape of which the height in the axial direction is lower than that of the valve seat portion 49. In the piston main body 35, the openings on the upper chamber 19 side in the passage portions inside the passage holes 37 on the extension side are disposed in this stepped part.

Figure 3:
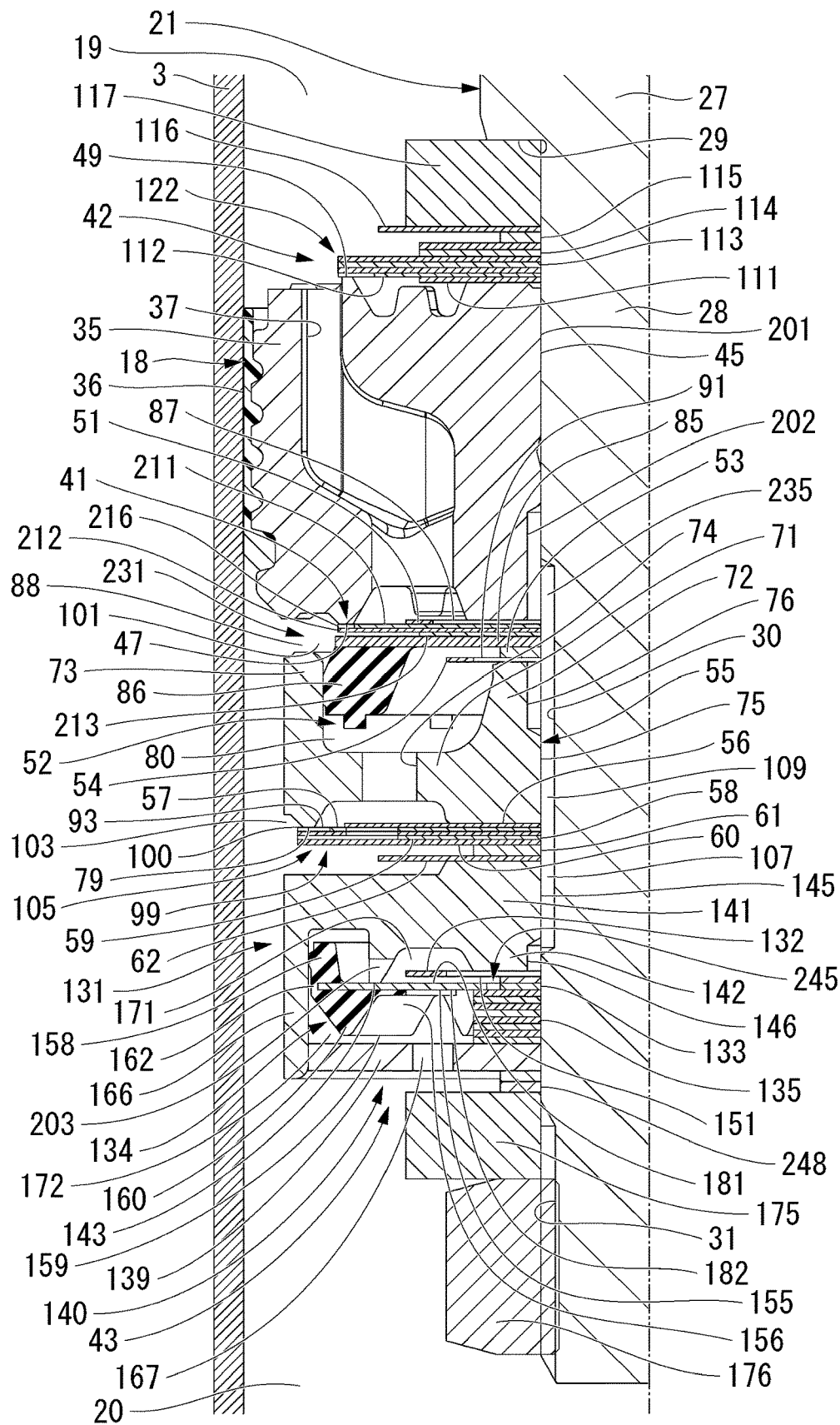
FIG. 3 is a partial cross-sectional view illustrating a part around the piston, a damping force generation mechanism, and a damping force variable mechanism of the damper of the first embodiment.

As illustrated in FIG. 3, in the piston 18, in order from the piston 18 side in the axial direction, one disk 51, one disk 211, one disk 212, one disk 213, one pilot valve 52, one disk 53, one disk 54, one pilot case 55 (case member), one disk 56, one disk 57, one disk 58, one disk 59, one disk 60, one disk 61, and one disk 62 are stacked. Disks 51, 53, 54, 56 to 62, 211, 212, and 213, and the pilot case 55 are all made of a metal. All of the disks 51, 53, 54, 56 to 62, 211, 212, and 213 have a perforated flat plate shape with a uniform thickness, and the attachment shaft portion 28 of the piston rod 21 can be fitted thereinto. The pilot valve 52 and the pilot case 55 have an annular shape, and the attachment shaft portion 28 of the piston rod 21 can be fitted thereinto. The disk 213 has a strip plate shape. The disks 51, 53, 54, 56 to 62, 211, and 212 other than the disk 213 have a circular plate shape.

The pilot case 55 has a bottomed cylindrical shape. The pilot case 55 has a bottom portion 71 having a perforated circular plate shape, an inner cylindrical portion 72 and an outer cylindrical portion 73. The inner cylindrical portion 72 is formed in the inner circumferential side of the bottom portion 71. The inner cylindrical portion 72 has a cylindrical shape in a thickness direction of the bottom portion 71. The outer cylindrical portion 73 is formed in an outer circumferential side of the bottom portion 71. The outer cylindrical portion 73 has a cylindrical shape in the thickness direction of the bottom portion 71. The bottom portion 71 deviates to one side in the axial direction with respect to the inner cylindrical portion 72 and the outer cylindrical portion 73. A penetration hole 74 is formed to axially penetrate the bottom portion 71. A small diameter hole portion 75 and a large diameter hole portion 76 are formed in the inner circumference of the inner cylindrical portion 72. The small diameter hole portion 75 is formed on the bottom portion 71 side of the inner cylindrical portion 72 in the axial direction. The attachment shaft portion 28 of the piston rod 21 is fitted into the small diameter hole portion 75. The large diameter hole portion 76 is formed on a side opposite to the bottom portion 71 of the inner cylindrical portion 72 in the axial direction. The large diameter hole portion 76 has a larger diameter than the small diameter hole portion 75.

The end portion of the pilot case 55 on a side opposite to the bottom portion 71 of the inner cylindrical portion 72 in the axial direction supports the inner circumferential side of the disk 54. The end portion of the inner cylindrical portion 72 on the bottom portion 71 side in the axial direction supports the inner circumferential side of the disk 56. The end portion of the pilot case 55 on the bottom portion 71 side of the outer cylindrical portion 73 in the axial direction constitutes an annular valve seat portion 79. A part between the inner cylindrical portion 72 and the outer cylindrical portion 73 of the pilot case 55 constitutes a pilot chamber 80 (chamber). The pilot chamber 80 includes the penetration hole 74. The pilot chamber 80 is partitioned from the lower chamber 20 by the pilot valve 52 having a disk 85 and a seal portion 86. The pilot chamber 80 causes a pressure to act on the pilot valve 52 including the disk 85 in a direction of the piston 18. The pilot chamber 80 serves as a back pressure chamber applying a back pressure to the pilot valve 52.

Figure 4:
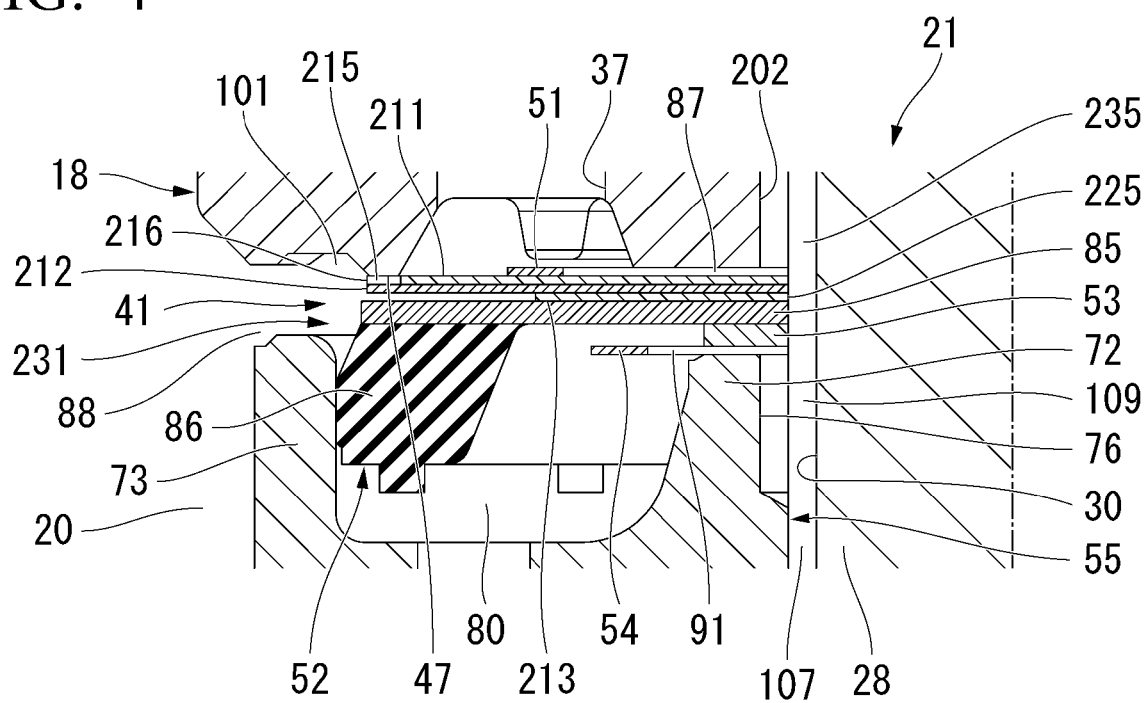
FIG. 4 is a partial cross-sectional view illustrating a part around the damping force generation mechanism of the damper of the first embodiment.

As illustrated in FIG. 4, the disk 51 has an outer diameter smaller than the inner diameter of the valve seat portion 47. A cut 87 is formed in the disk 51. The cut 87 extends radially outward from an inner circumferential edge portion of the disk 51 fitted into the attachment shaft portion 28 of the piston rod 21. The passage portion inside the cut 87 communicates with the passage portions inside the passage holes 37 of the piston 18 at all times. The passage portions inside the passage holes 37 communicates with the passage portion between the large diameter hole portion 202 of the piston 18 and the attachment shaft portion 28, and the passage portion inside the passage groove 30 of the piston rod 21 at all times via the passage portion inside this cut 87.

The disk 211 has an outer diameter larger than the outer diameter of the valve seat portion 47 of the piston 18. The disk 211 abuts the valve seat portion 47. The disk 211 opens and closes the openings of the passage portions inside the passage holes 37 by separating from and abutting the valve seat portion 47. The passage holes 37 are formed in the piston 18. In the disk 211, a cut 215 is formed on the outer circumferential side. The cut 215 radially traverses the valve seat portion 47. The inside of the cut 215 constitutes a fixed orifice 216. The fixed orifice 216 causes the passage portions inside the passage holes 37 to communicate with the lower chamber 20 at all times. In the disk 212, the outer circumferential portion has a circular shape, and the outer diameter thereof is the same as the outer diameter of the disk 211. In the disks 211 and 212, the disk 211 abuts the valve seat portion 47 of the piston 18. In the disks 211 and 212, the disk 211 opens and closes the openings of the passage portions inside the passage holes 37 formed in the piston 18 by separating from and abutting the valve seat portion 47.

The disk 213 has a strip plate shape elongated in one direction. In the disk 213, the maximum outer diameter thereof is smaller than the outer diameters of the disks 211 and 212.

The pilot valve 52 is constituted of the metal disk 85 (disk valve) and the rubber seal portion 86. The seal portion 86 has an annular shape and is provided on one surface side of the disk 85. The seal portion 86 is fixedly attached to the disk 85. The disk 85 has a perforated circular flat plate shape with a uniform thickness. The attachment shaft portion 28 of the piston rod 21 can be fitted into the disk 85. The disk 85 is provided to close an opening portion of the tubular pilot case 55. The disk 85 has an outer diameter slightly larger than the outer diameters of the disks 211 and 212. The seal portion 86 is fixedly attached to the outer circumferential side opposite to the piston 18 in the axial direction of the disk 85. The seal portion 86 has an annular shape. In other words, the pilot valve 52 has the annular seal portion 86 in the outer circumferential portion thereof.

The seal portion 86 is fitted slidably and liquid-tightly on the inner circumferential surface of the outer cylindrical portion 73 of the pilot case 55 throughout the whole circumference. The seal portion 86 seals a gap between the pilot valve 52 and the outer cylindrical portion 73 at all times. In other words, the pilot valve 52 causes the seal portion 86 to be slidably and tightly fitted into the outer cylindrical portion 73 of the pilot case 55. As a result, the pilot valve 52 and the pilot case 55 form the pilot chamber 80 therebetween.

As described above, the disk 211 can be seated in the valve seat portion 47 of the piston 18. The disks 211 to 213 and the pilot valve 52 constitute a damping valve 231. The damping valve 231 is provided in the passage portions inside the passage holes 37 formed in the piston 18. The damping valve 231 generates a damping force by suppressing a flow of oil caused by sliding of the piston 18 to the extension side (upward in FIG. 4). The pilot chamber 80 is provided between the pilot valve 52 and the pilot case 55. The pilot chamber 80 causes an internal pressure to act on this damping valve 231 in the direction of the piston 18, that is, a valve closing direction in which the disk 211 is seated in the valve seat portion 47. Thus, the damping valve 231 is a pilot-type damping valve having the pilot chamber 80. In the damping valve 231 including the disk 85, valve opening is controlled using the pressure in the pilot chamber 80. The damping valve 231 and the pilot chamber 80 constitute a part of the damping force generation mechanism 41. In other words, the damping force generation mechanism 41 includes the damping valve 231 and the pilot chamber 80. The damping force generation mechanism 41 serves as a pressure control valve mechanism.

The disk 53 has an outer diameter substantially the same as the outer diameter of the end portion of the inner cylindrical portion 72 of the pilot case 55 on the disk 53 side. The disk 54 has an outer diameter larger than the outer diameter of a part of the inner cylindrical portion 72 which comes into contact with the disk 54. A cut 91 is formed in the disk 54. The cut 91 extends radially outward from the inner circumferential edge portion fitted into the attachment shaft portion 28 of the piston rod 21 in the disk 54. The passage portion inside the cut 91 communicates with the pilot chamber 80 at all times. The pilot chamber 80 communicates with the passage portion between the large diameter hole portion 76 of the pilot case 55 and the attachment shaft portion 28, and the passage portion inside the passage groove 30 of the piston rod 21 at all times via the passage portion inside this cut 91.

The passage portion inside the cut 87 of the disk 51, the passage portion between the large diameter hole portion 202 of the piston 18 and the attachment shaft portion 28, the passage portion inside the passage groove 30 of the piston rod 21, the passage portion inside the cut 91 of the disk 54, and the passage portion between the large diameter hole portion 76 of the pilot case 55 and the attachment shaft portion 28 constitute a back pressure chamber inflow passage portion 235. The back pressure chamber inflow passage portion 235 causes the passage portions inside the passage holes 37 of the piston 18 and the pilot chamber 80 to communicate with each other at all times. The back pressure chamber inflow passage portion 235 introduces oil from the passage portions inside the passage holes 37 to the pilot chamber 80.

In the damping valve 231, the disk 211 thereof leaves the valve seat portion 47 of the piston 18 and is opened. Consequently, the damping valve 231 causes oil from the passage portions inside the passage holes 37 to flow to the lower chamber 20 via a passage portion 88. The passage portion 88 is a part radially expanding between the piston 18 and the outer cylindrical portion 73 of the pilot case 55. The passage portion formed inside each of the plurality of passage holes 37, a part between the damping valve 231 and the valve seat portion 47, and the passage portion 88 between the piston 18 and the outer cylindrical portion 73 of the pilot case 55 constitute a passage 101 (first passage). Oil as working fluid flows in this passage 101 in accordance with movement of the piston 18. In the passage 101, oil as working fluid flows out from the upper chamber 19 on one side toward the lower chamber 20 on the opposite side during movement of the piston 18 toward the upper chamber 19, that is, during an extension stroke. The passage 101 constitutes a passage on the extension side. As illustrated in FIG. 3, the damping force generation mechanism 41 on the extension side includes the valve seat portion 47 and the damping valve 231. The damping force generation mechanism 41 is provided on the passage 101. The damping force generation mechanism 41 suppresses the flow of oil by opening and closing the passage 101 using the damping valve 231. Accordingly, the damping force generation mechanism 41 generates a damping force. Then, the damping force generation mechanism 41 on the extension side introduces a part of a flow of oil to the pilot chamber 80 via the back pressure chamber inflow passage portion 235. The damping force generation mechanism 41 controls valve opening of the damping valve 231 using the pressure in the pilot chamber 80. In the pilot valve 52, the disk 85 applies the pressure in the pilot chamber 80 to the disks 211 and 212. Accordingly, the disk 85 restricts a flow of a working fluid in the passage 101 caused by sliding of the piston 18 inside the inner cylinder 3. The disk 85 is a disk valve.

The disk 56 has an outer diameter smaller than the inner diameter of the valve seat portion 79 of the pilot case 55. The disk 57 has an outer diameter slightly larger than the outer diameter of the valve seat portion 79. The disk 57 is configured to be capable of being seated in the valve seat portion 79. In the disk 57, a cut 93 is formed on the outer circumferential side. The cut 93 radially traverses the valve seat portion 79.

Each of the disk 58, the disk 59, and the disk 60 has the same outer diameter as the outer diameter of the disk 57. The disk 61 has an outer diameter smaller than the outer diameter of the disk 60. The disk 62 has an outer diameter larger than the outer diameter of the disk 61 and smaller than the outer diameter of the disk 60.

The disks 57 to 60 constitute a valve member 99 which is a disk valve capable of leaving and reaching the valve seat portion 79. The valve member 99 causes the pilot chamber 80 and the lower chamber 20 to communicate with each other and suppresses a flow of oil therebetween by leaving the valve seat portion 79. The passage portion formed inside each of the plurality of passage holes 37, the back pressure chamber inflow passage portion 235, the pilot chamber 80, and a part between the valve member 99 and the valve seat portion 79 constitute a passage 103. The passage 103 causes the upper chamber 19 and the lower chamber 20 to communicate with each other partially in parallel with the passage 101.

The valve member 99 leaves the valve seat portion 79 when the pressure inside the pilot chamber 80 reaches a predetermined pressure. The valve member 99 constitutes a damping force generation mechanism 105 together with the valve seat portion 79. The damping force generation mechanism 105 opens when the pressure inside the pilot chamber 80 reaches a predetermined pressure and generates a damping force by opening the passage 103.

The pilot chamber 80 is formed by being surrounded by the pilot valve 52, the pilot case 55, and the valve member 99. The passage portion inside the cut 93 of the disk 57 constitutes a fixed orifice 100. The fixed orifice 100 causes the pilot chamber 80 to communicate with the lower chamber 20 even if the disk 57 is in a state of abutting the valve seat portion 79. The disk 62 abuts the disk 60 and suppresses deformation of the valve member 99 when the valve member 99 is deformed in the opening direction.

As illustrated in FIG. 2, in the piston 18, in order from the piston 18 side in the axial direction, one disk 111, one disk 112, a plurality of disks 113, a plurality of disks 114, one disk 115, one disk 116, and one annular member 117 are stacked. Disks 111 to 116 and the annular member 117 are all made of a metal. Disks 111 to 116 and the annular member 117 all have a perforated circular flat plate shape with a uniform thickness. The attachment shaft portion 28 of the piston rod 21 can be fitted into all of the disks 111 to 116 and the annular member 117.

The disk 111 has an outer diameter smaller than the inner diameter of the valve seat portion 49 of the piston 18. The disk 112 has an outer diameter slightly larger than the outer diameter of the valve seat portion 49 of the piston 18. The disk 112 is configured to be capable of being seated in the valve seat portion 49. In the disk 112, a cut 121 is formed on the outer circumferential side. The cut 121 radially traverses the valve seat portion 49.

Each of the plurality of disks 113 has the same outer diameter as the outer diameter of the disk 112. Each of the plurality of disks 114 has an outer diameter smaller than the outer diameter of the disk 113. The disk 115 has an outer diameter smaller than the outer diameter of the disk 114. The disk 116 has an outer diameter larger than the outer diameter of the disk 114 and smaller than the outer diameter of the disk 113. The annular member 117 has an outer diameter smaller than the outer diameter of the disk 116. The annular member 117 is thicker and has a higher rigidity than the disks 111 to 116. This annular member 117 abuts the shaft step portion 29 of the piston rod 21.

The disks 112 to 114 constitute a valve member 122, which is a disk valve. The valve member 122 is configured to be capable of leaving and reaching the valve seat portion 49. When the valve member 122 leaves the valve seat portion 49, the passage portions inside the passage holes 39 can be open to the upper chamber 19. The valve member 122 suppresses oil flowing between the upper chamber 19 and the lower chamber 20 via the passage portions inside the passage holes 39. The valve member 122 and the valve seat portion 49 constitute the damping force generation mechanism 42 on the compression side. The cut 121 of the disk 112 constitutes a fixed orifice 123. The fixed orifice 123 causes the upper chamber 19 and the lower chamber 20 to communicate with each other even in a state where the disk 112 abuts the valve seat portion 49. The disk 116 suppresses deformation of the valve member 122 in the opening direction beyond predetermined amount of deformation.

In the present embodiment, inner circumferential clamping disk valves are presented as examples for both the valve member 99 on the extension side and the valve member 122 on the compression side illustrated in FIG. 3. The valve members 99 and 122 are not limited thereto and need only be a mechanism which generates a damping force. For example, the valve members 99 and 122 may be lift-type valves which bias the disk valve using a coil spring or may be poppet valves.

As illustrated in FIG. 3, a damping force variable mechanism 43 is attached to the attachment shaft portion 28 of the piston rod 21 on a side opposite to the piston 18 of the damping force generation mechanism 105. The damping force variable mechanism 43 causes a damping force to be variable in response to a reciprocating frequency of the piston 18 (which will hereinafter be referred to as a piston frequency). The damping force variable mechanism 43 has one case main body 131 which abuts the disk 62, one disk 132, two disks 133, one partitioning disk 134, a plurality of disks 135, and a lid member 139, in order from the damping force generation mechanism 105 side in the axial direction. The case main body 131, the disks 132, 133, and 135, and the lid member 139 are made of a metal. All of the disks 132, 133, and 135, and the lid member 139 have a perforated circular flat plate shape with a uniform thickness. The attachment shaft portion 28 of the piston rod 21 can be fitted into all of the disks 132, 133, and 135, and the lid member 139. The case main body 131 has an annular shape, and the attachment shaft portion 28 of the piston rod 21 can be fitted thereinto. The case main body 131 and the lid member 139 constitute a box-shaped case 140. The attachment shaft portion 28 of the piston rod 21 is partially disposed inside the case 140.

The case main body 131 has a base portion 141 having a perforated circular plate shape, an inner cylindrical portion 142, a support portion 143, and an outer cylindrical portion 166. The inner cylindrical portion 142 is formed on the inner circumferential side of the base portion 141. The inner cylindrical portion 142 has a cylindrical shape in the thickness direction of the base portion 141. The support portion 143 is formed on the outer circumferential side with respect to the inner cylindrical portion 142 of the base portion 141. The support portion 143 has a cylindrical shape in the thickness direction of the base portion 141. The outer cylindrical portion 166 is formed on the outer circumferential side with respect to the support portion 143 of the base portion 141. The outer cylindrical portion 166 has a cylindrical shape in the thickness direction of the base portion 141. The inner cylindrical portion 142 protrudes from the base portion 141 to both sides in the axial direction. The support portion 143 protrudes from the base portion 141 to only one side in the axial direction. The outer cylindrical portion 166 protrudes from the base portion 141 to only the same side as the support portion 143. A small diameter hole portion 145 and a large diameter hole portion 146 are formed inside the inner cylindrical portion 142. The small diameter hole portion 145 is formed on a side opposite to the protruding direction of the support portion 143 in the axial direction of the inner cylindrical portion 142. The attachment shaft portion 28 of the piston rod 21 is fitted into the small diameter hole portion 145. The large diameter hole portion 146 is formed on the support portion 143 side in the axial direction of the inner cylindrical portion 142. The large diameter hole portion 146 has a larger diameter than the small diameter hole portion 145. The lid member 139 is fitted into the outer cylindrical portion 166 of the case main body 131. Accordingly, the lid member 139 and the case main body 131 constitute the tubular case 140.

The attachment shaft portion 28 axially penetrates a middle part of the case 140 in the radial direction. The attachment shaft portion 28 is partially disposed inside the case main body 131. The disk 132, the disk 133, the partitioning disk 134, and the disk 135 are disposed inside the case 140. The attachment shaft portion 28 penetrates the inside of each of the disk 132, the disk 133, the partitioning disk 134, and the disk 135.

In the inner cylindrical portion 142 of the case main body 131, one end portion thereof on the small diameter hole portion 145 side in the axial direction supports the inner circumferential side of the disk 62. In the inner cylindrical portion 142, the opposite end portion thereof on the large diameter hole portion 146 side in the axial direction supports the inner circumferential side of the disk 132. In the support portion 143 of the case main body 131, an end portion thereof on the protruding distal end side supports the outer circumferential side of the annular partitioning disk 134. In addition, a cut 203 is partially formed in the circumferential direction in the support portion 143. The radial inside and the radial outside of the support portion 143 in the case main body 131 communicate with each other at all times by the cut 203.

The disk 132 has an outer diameter larger than a part of the inner cylindrical portion 142 which comes into contact therewith and smaller than the inner diameter of the support portion 143. A cut 151 is formed in the disk 132. The cut 151 extends radially outward from the inner circumferential edge portion fitted into the attachment shaft portion 28 of the piston rod 21 in the disk 132. The cut 151 radially traverses the part of the inner cylindrical portion 142 coming into contact with the disk 132. Each of two disks 133 has an outer diameter smaller than the outer diameter of the disk 132.

The partitioning disk 134 is constituted of a disk 155 (disk valve) formed of a metal material and an elastic member 156 formed of a rubber material. The disk 155 has a perforated circular flat plate shape with a uniform thickness and is bendable. The elastic member 156 is fixedly attached to the outer circumferential side of the disk 155. The partitioning disk 134 has an annular shape in its entirety and is elastically deformable, that is, bendable. The disk 155 is provided to close the opening portion of the tubular case main body 131. The annular disk 155 has an inner diameter such that the disks 133 can be disposed therein with a gap in the radial direction. The disk 155 has a thickness smaller than the thickness of two disks 133. The disk 155 has an outer diameter larger than the outer diameter of the support portion 143 of the case main body 131 and smaller than the inner diameter of the outer cylindrical portion 166. The disk 155 is also disposed inside the case 140 while being internally penetrated by the attachment shaft portion 28.

The elastic member 156 is fixedly attached to the outer circumferential side of the disk 155 in an annular shape. The entire surface of the elastic member 156 facing the disk 155 is fixedly attached to the disk 155. The elastic member 156 has a seal portion 158 and stopper portions 159 (elastic portions). The seal portion 158 has an annular shape and is provided on the outer circumferential side of the disk 155. The seal portion 158 is provided on one surface side of the disk 155 in the axial direction. The seal portion 158 protrudes from the disk 155 to a side opposite to the lid member 139 in the axial direction. The stopper portions 159 protrude from the disk 155 to the lid member 139 side in the axial direction. In other words, the elastic member 156 has the seal portion 158 on the outer circumferential side of one surface 181 of the disk 155 in the axial direction (thickness direction). The elastic member 156 has the stopper portions 159 on the outer circumferential side on an opposite surface 182 of the disk 155 in the axial direction (thickness direction). In the disk 155, the seal portion 158 is provided on the one surface 181 side, and the stopper portions 159 are provided on the opposite surface 182 side.

The seal portion 158 is formed to have an annularly tubular shape continuously formed throughout the whole circumference of the disk 155. The seal portion 158 is fixedly attached to the surface 181 of the disk 155 throughout the whole circumference. The seal portion 158 abuts the inner circumferential surface of the outer cylindrical portion 166 of the case main body 131 throughout the whole circumference. The seal portion 158 seals a part between the disk 155 and the case main body 131. The seal portion 158 closes a part between the disk 155 and the outer cylindrical portion 166 at all times. The stopper portions 159 abut the lid member 139 when the partitioning disk 134 is deformed to the lid member 139 side. As a result, further deformation of the partitioning disk 134 is suppressed.

Figure 5:
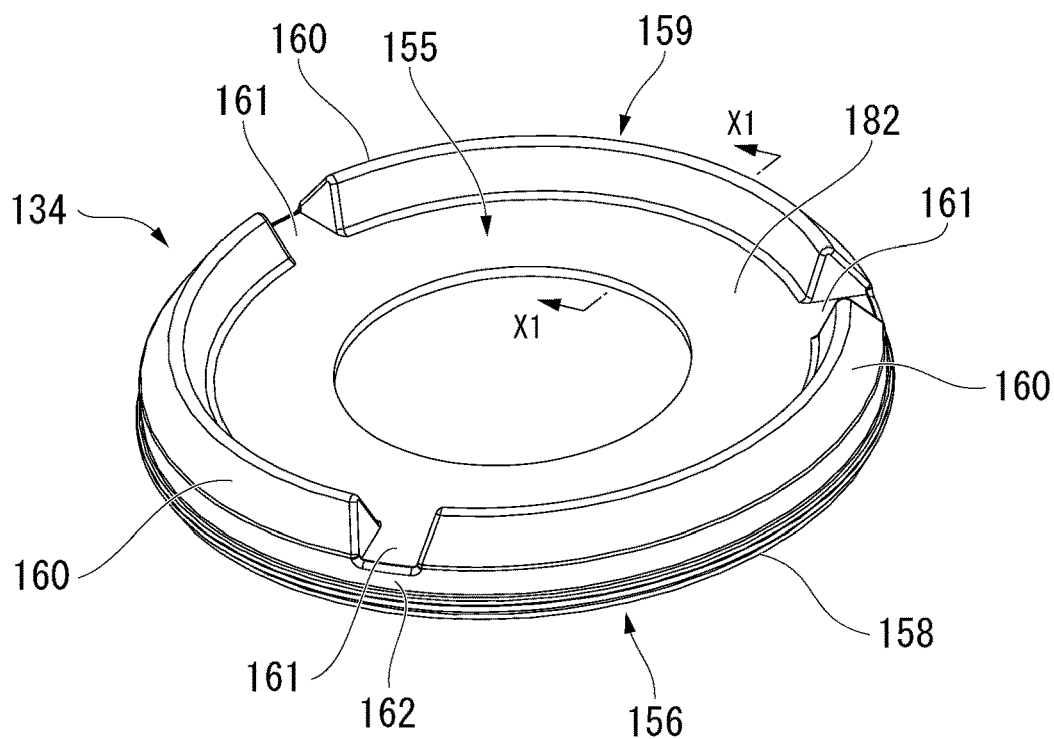
FIG. 5 is a perspective view illustrating a partitioning disk of the damper of the first embodiment.

As illustrated in FIG. 5, the stopper portions 159 are provided on the outer circumferential side on the surface 182. The stopper portions 159 are intermittently formed in the circumferential direction of the disk 155. The stopper portions 159 are constituted of a plurality (specifically, three) of stopper constituting portions 160. The stopper constituting portions 160 have an arc shape along the outer circumferential edge portion of the disk 155. Regarding the stopper portions 159, the stopper constituting portions 160 are fixedly attached to the surface 182 of the disk 155 at intervals in the circumferential direction of the disk 155. As a result, disk exposing portions 161 exposing the disk 155 are provided on the outer circumferential side on the surface 182 where the stopper portions 159 of the disk 155 are provided. Each disk exposing portion 161 is provided between the stopper constituting portions 160 and the stopper constituting portions 160 adjacent to each other in the circumferential direction of the disk 155. A plurality (specifically, three) of disk exposing portions 161 are provided at intervals in the circumferential direction of the disk 155. The disk exposing portions 161 radially traverse the stopper portions 159. Thus, the stopper portions 159 of the elastic member 156 are partially and fixedly attached to the surface 182 of the disk 155 in the circumferential direction.

In the plurality of stopper constituting portions 160, the lengths of the disks 155 in the circumferential direction are equivalent to each other. The plurality of stopper constituting portions 160 are disposed at equal intervals in the circumferential direction of the disk 155. As a result, in a plurality of disk exposing portions 161, the lengths of the disks 155 in the circumferential direction are equivalent to each other. The plurality of disk exposing portions 161 are disposed at equal intervals in the circumferential direction of the disk 155. The length of the stopper constituting portion 160 in the circumferential direction of the disk 155 is larger than the length of the disk exposing portion 161 in the circumferential direction of the disk 155.

Figure 6:
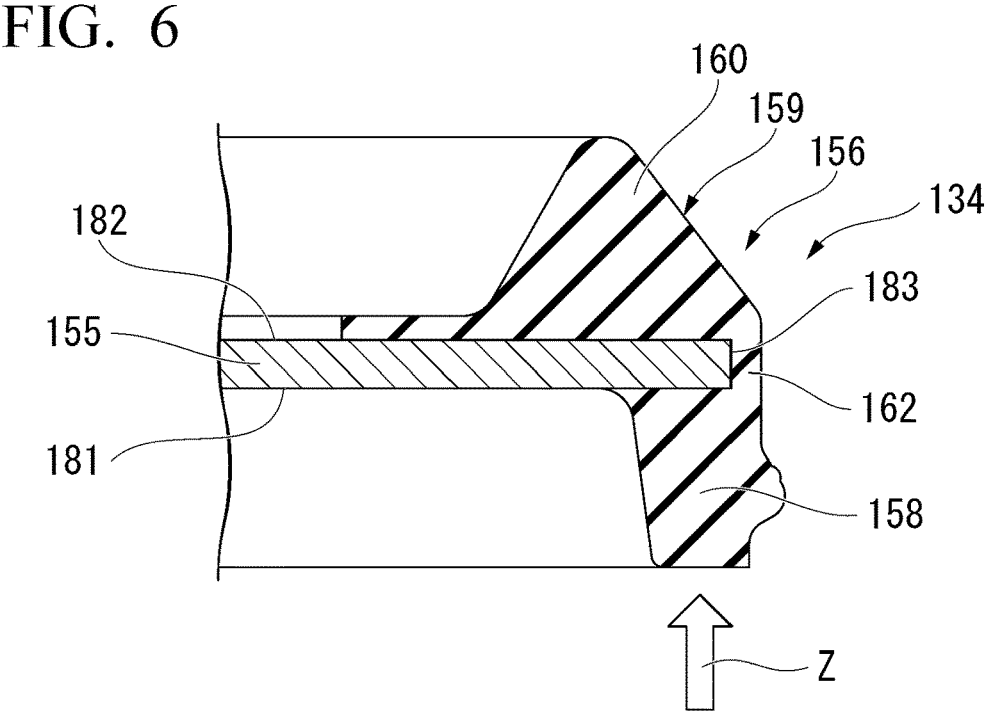
FIG. 6 is a cross-sectional view taken along X1-X1 in FIG. 5 illustrating the partitioning disk of the damper of the first embodiment.

As illustrated in FIG. 3, an annular gap is provided between the disk 155 and the outer cylindrical portion 166 of the case main body 131. In the elastic member 156, the seal portion 158 and the stopper portions 159 are fixedly attached to both surfaces of the disk 155 with this gap therebetween. In other words, the elastic member 156 is provided to be fixedly attached to both surfaces of the disk 155 with the gap between the disk 155 and the outer cylindrical portion 166. In still other words, the seal portion 158 and the stopper portions 159 are connected with each other with the gap between the disk 155 and the outer cylindrical portion 166. Thus, as illustrated in FIG. 6, the elastic member 156 has an annular connecting portion 162. The connecting portion 162 covers an outer circumferential surface 183 of the disk 155 and causes the seal portion 158 and the plurality of stopper constituting portions 160 to be connected with each other. The outer circumferential surface 183 of the disk 155 has a circular shape continuously formed throughout the whole circumference. The connecting portion 162 has a uniform thickness in the radial direction and is fixedly attached to the outer circumferential surface 183 throughout the whole circumference. As illustrated in FIG. 3, this connecting portion 162 is disposed between the disk 155 and the outer cylindrical portion 166.

As illustrated in FIG. 6, in the elastic member 156, the seal portion 158, the stopper portions 159, and the connecting portion 162 are subjected to vulcanized adhesion to the disk 155. A die used for the vulcanized adhesion includes a seal portion forming cavity, a connecting portion forming cavity, and a stopper constituting portion forming cavity. The seal portion forming cavity forms the seal portion 158 and causes this to be fixedly attached to the surface 181 of the disk 155. The connecting portion forming cavity forms the connecting portion 162 and causes this to be fixedly attached to the outer circumferential surface 183 of the disk 155. The stopper constituting portion forming cavity forms the plurality of stopper constituting portions 160 and causes these to be fixedly attached to the surface 182 of the disk 155. Then, in the die, a part between the stopper constituting portion forming cavity and the stopper constituting portion forming cavity adjacent to each other constitutes a disk abutting portion. The disk abutting portion abuts the disk 155 to form the disk exposing portions 161. Thus, when the elastic member 156 is formed in the disk 155, the die supports a plurality (specifically, three) of equal-interval positions in the circumferential direction on the outer circumferential side of the disk 155 in the disk abutting portion disposed at a plurality (specifically, three) of equal intervals.

A rubber material flows in a molten state as indicated with an arrow Z in FIG. 6 with respect to the disk 155 disposed inside the die. The rubber material passes through the connecting portion forming cavity forming the connecting portion 162 from the seal portion forming cavity forming the seal portion 158 and flows to the stopper constituting portion forming cavity forming the stopper portions 159, thereby being introduced into the die. At this time, the flow channel is narrowed in the connecting portion forming cavity. Accordingly, in the disk 155, a differential pressure is generated between the seal portion forming cavity side and the stopper constituting portion forming cavity side. However, the die supports a surface of the disk 155 on the stopper constituting portion forming cavity side, which is the low pressure side, using a plurality of disk abutting portions. Accordingly, even if such a differential pressure is generated, deformation of the disk 155 is suppressed.

As illustrated in FIG. 3, the seal portion 158 has an inner diameter larger than the outer diameter of the support portion 143 in the end portion on the disk 155 side. That is, in the seal portion 158, the minimum inner diameter thereof is larger than the outer diameter of the support portion 143. Accordingly, in the partitioning disk 134, the disk 155 thereof abuts the support portion 143 of the case main body 131 and is supported thereby.

The disk 135 has an outer diameter larger than the inner diameter of the disk 155 of the partitioning disk 134. Accordingly, in the partitioning disk 134, the inner circumferential side of the disk 155 is disposed between the disk 132 and the disk 135, abuts the disk 135, and is supported thereby. In the partitioning disk 134, the outer circumferential side of the disk 155 is supported by the support portion 143 on one side in the axial direction. The disk 135 is a seat portion in which the partitioning disk 134 is seated.

In the partitioning disk 134, the inner circumferential side of the disk 155 is configured to be capable of moving within a range of the axial length of two disks 133 between the disk 132 and the disk 135. In addition, in the partitioning disk 134, the annular elastic member 156 sealing a part between the partitioning disk 134 and the case 140 is provided on the outer circumferential side which is a non-support side opposite to the disk 135 supporting the disk 155. In the partitioning disk 134, the elastic member 156 comes into contact with the outer cylindrical portion 166 of the case 140. Accordingly, the partitioning disk 134 is centered with respect to the case 140. The partitioning disk 134 has a simple support structure in which the inner circumferential side thereof is not clamped from both surface sides and only one surface side is supported by the disk 135. A side radially opposite to a part of the disk 155 to which the seal portion 158 and the stopper portions 159 are fixedly attached becomes a supporting point when the disk 155 is bent.

Here, the stopper portions 159 are constituted of the plurality of stopper constituting portions 160 disposed at intervals in the circumferential direction. On the other hand, the cut 203 is provided in the support portion 143. Accordingly, even if the partitioning disk 134 abuts the lid member 139 in the stopper portions 159 or abuts the support portion 143 of the case main body 131 in the disk 155, a pressure receiving area on a side where the seal portion 158 of the disk 155 is provided and a pressure receiving area on a side where the stopper portions 159 of the disk 155 are provided are approximately the same as each other.

The lid member 139 has a perforated circular plate shape into which the attachment shaft portion 28 of the piston rod 21 can be fitted. The lid member 139 is fitted into the outer cylindrical portion 166 of the case main body 131. A penetration hole 167 axially penetrating an intermediate portion in the radial direction is formed in the lid member 139. The penetration hole 167 is formed in the lid member 139 on a side radially outward from the disk 135. The penetration hole 167 is formed on a side radially inward from the contact parts of the stopper portions 159 which come into contact with the lid member 139 when the partitioning disk 134 is bent.

As described above, the seal portion 158 of the partitioning disk 134 comes into contact with the inner circumferential surface of the outer cylindrical portion 166 of the case main body 131 throughout the whole circumference. Accordingly, the seal portion 158 seals the gap between the partitioning disk 134 and the outer cylindrical portion 166. That is, the partitioning disk 134 is a packing valve. The seal portion 158 seals the gap between the partitioning disk 134 and the outer cylindrical portion 166 at all times even if the partitioning disk 134 is displaced and deformed within an allowable range inside the case 140. In the partitioning disk 134, the seal portion 158 thereof comes into contact with the outer cylindrical portion 166 throughout the whole circumference. Accordingly, the partitioning disk 134 is centered with respect to the case 140 as described above.

The partitioning disk 134 partitions the inside of the case 140 into two chambers, which are a variable chamber 171 (chamber, case chamber) and a variable chamber 172 (chamber, case chamber). In other words, the variable chamber 171 and the variable chamber 172 are partitioned by the partitioning disk 134 having the disk 155 and the seal portion 158. In still other words, two variable chambers 171 and 172 are defined by the disk 155 and the seal portion 158 and are provided inside the case main body 131. The variable chamber 171 can vary in capacity between the partitioning disk 134 and the base portion 141 side of the case main body 131. The variable chamber 172 can vary in capacity between the partitioning disk 134 and the lid member 139. In other words, two variable chambers 171 and 172 are defined by the partitioning disk 134 constituted of the disk 155 and the elastic member 156 and is provided inside the case 140. The variable chamber 171 communicates with the passage portion between the large diameter hole portion 146 of the case main body 131 and the attachment shaft portion 28 via the passage portion inside the cut 151 of the disk 132. The variable chamber 172 communicates with the lower chamber 20 via the passage portion inside the penetration hole 167 of the lid member 139.

In the radial direction of the piston rod 21, the passage groove 30 of the piston rod 21 faces the large diameter hole portion 202 of the piston 18, the cut 87 of the disk 51, the cut 91 of the disk 54, the large diameter hole portion 76 of the pilot case 55, the large diameter hole portion 146 of the case main body 131, and the cut 151 of the disk 132. Thus, the passage portions inside the passage holes 37 of the piston 18, the pilot chamber 80, and the variable chamber 171 communicate with each other at all times via the passage portion inside the cut 87 of the disk 51, the passage portion between the large diameter hole portion 202 of the piston 18 and the attachment shaft portion 28, the passage portion inside the passage groove 30 of the piston rod 21, the passage portion inside the cut 91 of the disk 54, the passage portion between the large diameter hole portion 76 of the pilot case 55 in the damping force generation mechanism 41 on the extension side and the attachment shaft portion 28, the passage portion between the large diameter hole portion 146 of the case main body 131 in the damping force variable mechanism 43 and the attachment shaft portion 28, and the passage portion inside the cut 151 of the disk 132.

The passage portions inside the passage holes 37 of the piston 18, the passage portion inside the cut 87 of the disk 51, the passage portion between the large diameter hole portion 202 of the piston 18 and the attachment shaft portion 28, the passage portion inside the passage groove 30 of the piston rod 21, the passage portion between the large diameter hole portion 146 of the case main body 131 and the attachment shaft portion 28, the passage portion inside the cut 151 of the disk 132, the variable chambers 171 and 172 inside the case 140, and the passage portion inside the penetration hole 167 of the lid member 139 constitute a passage 107 (second passage). The passage 107 extends by connecting the upper chamber 19 and the lower chamber 20 to each other. Thus, the variable chambers 171 and 172, each of which is at least a part of the passage 107, are internally formed in the tubular case main body 131. The passage 107 connects the upper chamber 19 and the lower chamber 20 to each other through a route partially different from the passages 101 and 103. In the partitioning disk 134, the disk 155 restricts a flow of a working fluid in the passage 107 caused by sliding of the piston 18 inside the inner cylinder 3. The disk 155 is a disk valve.

The passage 107 shares the passage portions inside the passage holes 37 on the upper chamber 19 side with the passage 101. The passage 107 is provided such that the lower chamber 20 side with respect to the passage portions inside the passage holes 37 is parallel to the passage 101. That is, in the passage 107, the passage portion inside the cut 87 of the disk 51, the passage portion between the large diameter hole portion 202 of the piston 18 and the attachment shaft portion 28, the passage portion inside the passage groove 30 of the piston rod 21, the passage portion between the large diameter hole portion 146 of the case main body 131 and the attachment shaft portion 28, the passage portion inside the cut 151 of the disk 132, the variable chambers 171 and 172 inside the case 140, and the passage portion inside the penetration hole 167 of the lid member 139 constitute a parallel passage 109. The parallel passage 109 is parallel to a passage connecting a part of the passage 101 between the valve seat portion 47 and the damping valve 231 to the passage portion 88.

The case 140 of the damping force variable mechanism 43 is provided in the parallel passage 109. Thus, two variable chambers 171 and 172, each of which is a part of the parallel passage 109, are provided inside the case 140 while being defined by the partitioning disk 134.

The partitioning disk 134 can be displaced and deformed within a range in which the inner circumferential side moves between the disk 132 and the disk 135 and the outer circumferential side moves between the support portion 143 and the lid member 139. Here, the shortest distance between the support portion 143 and the disk 135 in the axial direction is smaller than the thickness of the disk 155 in the axial direction. The support portion 143 supports the outer circumferential side of the disk 155 of the partitioning disk 134 from one side in the axial direction. The disk 135 supports the inner circumferential side of the disk 155 from the opposite side in the axial direction. Thus, when the pressures in the variable chambers 171 and 172 are the same as each other, the disk 155 comes into pressure contact with the support portion 143 and the disk 135 due to its elastic force in a slightly deformed state.

The partitioning disk 134 blocks circulation of oil between the variable chambers 171 and 172 of the parallel passage 109 in a state where the inner circumferential side of the disk 155 thereof comes into contact with the disk 135 throughout the whole circumference. In addition, the partitioning disk 134 allows circulation of oil between the variable chamber 171 and the variable chamber 172 that is the lower chamber 20, in a state where the inner circumferential side of the disk 155 thereof is separated from the disk 135. Thus, the inner circumferential side of the disk 155 of the partitioning disk 134 and the disk 135 serving as a seat portion constitute a check valve 245. The check valve 245 restricts a flow of oil from the variable chamber 171 to the lower chamber 20 in the parallel passage 109. On the other hand, the check valve 245 allows a flow of oil from the lower chamber 20 to the variable chamber 171.

In the extension stroke, the pressure on the upper chamber 19 becomes higher than the pressure in the lower chamber 20. In this extension stroke, the check valve 245 blocks the parallel passage 109 which can cause the upper chamber 19 and the lower chamber 20 to communicate with each other via the passage portions inside the passage holes 37 of the piston 18. In the compression stroke, the pressure on the upper chamber 19 becomes lower than the pressure in the lower chamber 20. In this compression stroke, the check valve 245 causes the parallel passage 109 to be in a communicating state.

In the check valve 245, the partitioning disk 134 serves as its valve element. The check valve 245 is a free valve in which the partitioning disk 134 in its entirety can move in the axial direction. The partitioning disk 134 may be set such that the whole circumference of the inner circumference of the disk 155 thereof comes into contact with the disk 135 at all times, regardless of the pressure state of the variable chambers 171 and 172. In this manner, the partitioning disk 134 may block circulation between the variable chambers 171 and 172 of the parallel passage 109 at all times. That is, the disk 155 of the partitioning disk 134 is required to block circulation of a working fluid in at least one direction, including blocking of circulation of a working fluid in both directions between the variable chamber 171 and the variable chamber 172 of the passage 107.

In the piston rod 21, in a state where the attachment shaft portion 28 is inserted through the inside thereof, the annular member 117, the disk 116, the disk 115, a plurality of disks 114, a plurality of disks 113, the disk 112, the disk 111, the piston 18, the disk 51, the disk 211, the disk 212, the disk 213, the pilot valve 52, the disk 53, the disk 54, the pilot case 55, the disk 56, the disk 57, the disk 58, the disk 59, the disk 60, the disk 61, the disk 62, the case main body 131, the disk 132, and a plurality of disks 133 are stacked in the shaft step portion 29 in this order. At this time, in the pilot case 55, the seal portion 86 of the pilot valve 52 is fitted into the outer cylindrical portion 73.

In addition, in a state where the disks 133 are inserted through the inside, the partitioning disk 134 is stacked on the support portion 143 of the case main body 131. At this time, the elastic member 156 of the partitioning disk 134 is fitted into the outer cylindrical portion 166 of the case main body 131. Moreover, in a state where the attachment shaft portion 28 is inserted through the inside thereof, a plurality of disks 135 are stacked on the disks 133 and the disk 155 of the partitioning disk 134. In a state where the attachment shaft portion 28 is inserted through the inside, the lid member 139 is stacked on the disks 135. Moreover, a plurality of disks 248, the annular member 117, and an annular member 175 which is a common component are stacked on the lid member 139 while having the attachment shaft portion 28 inserted through the inside thereof.

In this manner, in a state where the components are disposed, a nut 176 is screwed to the male screw 31 of the attachment shaft portion 28 protruding beyond the annular member 175. Accordingly, in each of the annular member 117, the disk 116, the disk 115, a plurality of disks 114, a plurality of disks 113, the disks 112 and 111, the piston 18, the disk 51, the disk 211, the disk 212, the disk 213, the pilot valve 52, the disks 53 and 54, the pilot case 55, the disks 56 to 62, the case main body 131, the disk 132, a plurality of disks 133, a plurality of disks 135, the lid member 139, a plurality of disks 248, and the annular member 175, the inner circumferential side or the entirety is sandwiched by the shaft step portion 29 of the piston rod 21 and the nut 176 and is clamped in the axial direction. At this time, in the partitioning disk 134, the inner circumferential side is not clamped in the axial direction. The nut 176 is a general-purpose hexagon nut.

As described above, the damping force generation mechanism 42 on the compression side, the piston 18, the damping force generation mechanism 41 on the extension side, the damping force generation mechanism 105 on the extension side, and the damping force variable mechanism 43 on the extension side are fastened to the piston rod 21 using the nut 176 in a state where the piston rod 21 is inserted through the inner circumferential side. In other words, the piston 18, the case main body 131 constituting the damping force variable mechanism 43, the disk 132, a plurality of disks 133, a plurality of disks 135, and the lid member 139 are fastened to the piston rod 21 using the nut 176 in a state where the piston rod 21 is inserted through the inner circumferential side. They can also be assembled in the piston rod 21 in a state where the damping force variable mechanism 43 is assembled in advance. In this case, instead of the piston rod 21, a dummy rod is inserted therethrough, and then the attachment shaft portion 28 of the piston rod 21 is inserted through the inner circumferential side of the damping force variable mechanism 43 while pulling the dummy rod. When the damping force variable mechanism 43 is in a state of being assembled in advance, the lid member 139 can be fixed to the outer cylindrical portion 166 of the case main body 131 through press-fitting.

As illustrated in FIG. 1, the foregoing base valve 25 is provided between the bottom member 12 of the outer cylinder 4 and the inner cylinder 3. This base valve 25 has a base valve member 191, a disk 192, a disk 193, and an attachment pin 194. The base valve member 191 partitions the lower chamber 20 and the reservoir chamber 6. The disk 192 is provided on the lower side of the base valve member 191, that is, the reservoir chamber 6 side. The disk 193 is provided on the upper side of the base valve member 191, that is, the lower chamber 20 side. The disk 192 and the disk 193 are attached to the base valve member 191 using the attachment pin 194.

The base valve member 191 has an annular shape, and the attachment pin 194 is inserted through a middle part in the radial direction. A plurality of passage holes 195 and a plurality of passage holes 196 are formed in the base valve member 191. The plurality of passage holes 195 cause oil to circulate between the lower chamber 20 and the reservoir chamber 6. The plurality of passage holes 196 cause oil to circulate between the lower chamber 20 and the reservoir chamber 6 on the radially outer side of the passage holes 195. The disk 192 on the reservoir chamber 6 side allows a flow of oil from the lower chamber 20 to the reservoir chamber 6 via the passage holes 195. On the other hand, the disk 192 suppresses a flow of oil from the reservoir chamber 6 to the lower chamber 20 via the passage holes 195. The disk 193 allows a flow of oil from the reservoir chamber 6 to the lower chamber 20 via the passage holes 196. On the other hand, the disk 193 suppresses a flow of oil from the lower chamber 20 to the reservoir chamber 6 via the passage holes 196.

The disk 192 constitutes a damping valve 197 on the compression side with the base valve member 191. The damping valve 197 is opened during a compression stroke of the damper 1 and causes oil to flow from the lower chamber 20 to the reservoir chamber 6, thereby generating a damping force. The disk 193 constitutes a suction valve 198 with the base valve member 191. The suction valve 198 is opened during the extension stroke of the damper 1 and causes oil to flow into the lower chamber 20 from the reservoir chamber 6. The suction valve 198 functions to cause a fluid to flow from the reservoir chamber 6 to the lower chamber 20 so as to compensate for the shortage of the fluid mainly caused by the cylinder 2 extending from the piston rod 21 without practically generating a damping force.

It is assumed that there is no damping force variable mechanism 43 during an extension stroke in which the piston rod 21 moves to the extension side. Consequently, when the moving speed of the piston 18 (which will hereinafter be referred to as a piston speed) is low, oil from the upper chamber 19 flows from the passage portions inside the passage holes 37 illustrated in FIG. 3 to the lower chamber 20 via the passage 101 including the fixed orifice 216 of the damping force generation mechanism 41 and the passage portion 88 between the piston 18 and the outer cylindrical portion 73 of the pilot case 55. At this time, a damping force of orifice characteristics (in which a damping force is substantially proportional to the square of the piston speed) is generated. Accordingly, characteristics of a damping force with respect to the piston speed become characteristics in which the rate of increase in damping force relatively increases with respect to increase in piston speed.

When the piston speed increases, oil from the upper chamber 19 flows from the passage portions inside the passage holes 37 to the lower chamber 20 via the passage 101 including the gap between the damping valve 231 and the valve seat portion 47 of the piston 18 and the passage portion 88 while the damping valve 231 serving as a main valve of the damping force generation mechanism 41 is being opened. At this time, a damping force of valve characteristics (in which a damping force is substantially proportional to the piston speed) is generated. Accordingly, characteristics of a damping force with respect to the piston speed become characteristics in which the rate of increase in damping force falls with respect to increase in piston speed.

When the piston speed further increases, oil from the upper chamber 19 flows from the back pressure chamber inflow passage portion 235 and the pilot chamber 80 to the lower chamber 20 through the passage 103 including the back pressure chamber inflow passage portion 235, the pilot chamber 80, and the gap between the valve member 99 and the valve seat portion 79 while the valve member 99 (hard valve illustrated in FIG. 3) of the damping force generation mechanism 105 is being opened, in addition to a flow to the lower chamber 20 via the passage 101 including the gap between the damping valve 231 from which the damping force generation mechanism 41 is separated and the valve seat portion 47. Accordingly, increase in damping force is further suppressed. Therefore, characteristics of a damping force with respect to the piston speed become characteristics in which the rate of increase in damping force further falls with respect to increase in piston speed.

When the piston speed further increases, regarding the relationship of a force (oil pressure) acting on the pilot valve 52, a force in the opening direction applied from the passage portions inside the passage holes 37 becomes greater than a force in a closing direction applied from the pilot chamber 80. Thus, in this region, in accordance with increase in piston speed, the damping valve 231 of the damping force generation mechanism 41 is separated from the valve seat portion 47 of the piston 18 beyond that described above and is opened. As a result, in addition to a flow to the lower chamber 20 passing through the passage 103 including the passage portions inside the passage holes 37, the back pressure chamber inflow passage portion 235, the pilot chamber 80, and the gap between the valve member 99 of the damping force generation mechanism 105 and the valve seat portion 79, oil flows to the lower chamber 20 via the passage 101 including the passage portion 88. Accordingly, more oil flows to the lower chamber 20. Therefore, increase in damping force is further suppressed. Thus, characteristics of a damping force with respect to the piston speed become characteristics in which the rate of increase in damping force further falls with respect to increase in piston speed.

During a compression stroke in which the piston rod 21 moves to the compression side, when the piston speed is low, oil from the lower chamber 20 flows to the upper chamber 19 via the passage portions inside the passage holes 39 on the compression side illustrated in FIG. 2 and the fixed orifice 123 of the valve member 122 of the damping force generation mechanism 42. At this time, a damping force of orifice characteristics (in which a damping force is substantially proportional to the square of the piston speed) is generated. Accordingly, in characteristics of a damping force with respect to the piston speed, the rate of increase in damping force relatively increases with respect to increase in piston speed. In addition, when the piston speed increases, oil which has been introduced from the lower chamber 20 to the passage portions inside the passage holes 39 on the compression side flows to the upper chamber 19 through a part between the valve member 122 and the valve seat portion 49 while the valve member 122 of the damping force generation mechanism 42 is being opened. At this time, a damping force of valve characteristics (in which a damping force is substantially proportional to the piston speed) is generated. Accordingly, characteristics of a damping force with respect to the piston speed become characteristics in which the rate of increase in damping force falls with respect to increase in piston speed.

Hereinabove, a case has been described on the assumption that there is no damping force variable mechanism 43. In the first embodiment, even when the piston speed is the same, the damping force variable mechanism 43 causes a damping force to be variable in response to the piston frequency.

That is, when the piston frequency is high, the amplitude of the piston 18 is small. In this manner, during an extension stroke when the piston frequency is high, the pressure in the upper chamber 19 increases, and oil is introduced from the upper chamber 19 to the variable chamber 171 inside the case 140 via the passage portions inside the passage holes 37 of the passage 107 illustrated in FIG. 3, the passage portion inside the cut 87 of the disk 51, the passage portion between the large diameter hole portion 202 of the piston 18 and the attachment shaft portion 28, the passage portion inside the passage groove 30 of the piston rod 21, the passage portion between the large diameter hole portion 146 of the case main body 131 and the attachment shaft portion 28, and the passage portion inside the cut 151 of the disk 132. Consequently, in accordance therewith, the partitioning disk 134 which has abutted the support portion 143 and the disks 135 in the disk 155 by that time causes the stopper portions 159 to be deformed to approach the lid member 139 and expands the volume of the variable chamber 171. At the same time, the partitioning disk 134 discharges oil from the variable chamber 172, which is a part of the passage 107 on the lower chamber 20 side, to the lower chamber 20 via the passage portion inside the penetration hole 167 of the lid member 139.

In this manner, when the partitioning disk 134 is deformed, oil is introduced from the upper chamber 19 to the variable chamber 171. As a result, the flow rate of oil flowing from the upper chamber 19 to the lower chamber 20 via the passage 101 while the damping force generation mechanism 41 is being opened is reduced. Moreover, compared to a case where there is no variable chamber 171, increase in pressure in the pilot chamber 80 is suppressed by introducing oil from the upper chamber 19 to the variable chamber 171. Thus, the damping valve 231 of the damping force generation mechanism 41 is easily opened. According to those described above, a damping force on the extension side is softened. At this time, the damping force generation mechanism 105 (hard valve) is not opened. Here, since the inner circumferential side of the partitioning disk 134 is separated from the disk 132 and is supported by the disks 135 only from one side, the inner circumferential side is easily deformed to approach the disk 132. Thus, in the partitioning disk 134, the stopper portions 159 on the outer circumferential side are easily deformed to approach the lid member 139.

On the other hand, when the piston frequency is low, the amplitude of the piston 18 is large. During an extension stroke when the piston frequency is low, the frequency of deformation of the partitioning disk 134 follows the piston frequency and becomes low. Accordingly, in the initial stage of an extension stroke, similar to that described above, oil flows from the upper chamber 19 to the variable chamber 171 via the passage 107. However, thereafter, the partitioning disk 134 abuts the lid member 139 due to the stopper portions 159 and stops. As a result, oil no longer flows from the upper chamber 19 to the variable chamber 171. Since no oil flows from the upper chamber 19 to the variable chamber 171, the pressure in the variable chamber 171 increases, and therefore the pressure in the pilot chamber 80 which communicates with the variable chamber 171 at all times also increases. Thus, the pilot chamber 80 is in a state of suppressing opening of the damping valve 231 of the damping force generation mechanism 41. That is, the damping force generation mechanism 41 is in a state where the damping valve 231 is not opened and oil flows from the upper chamber 19 to the lower chamber 20 via the fixed orifice 216. As a result, a damping force on the extension side is hardened.

When the pressure in the pilot chamber 80 further increases, oil opens the valve member 99 (hard valve) of the damping force generation mechanism 105 and flows to the lower chamber 20 through the passage 103 including the gap between the valve member 99 and the valve seat portion 79. When the pressure in the pilot chamber 80 further increases, oil opens the damping valve 231 of the damping force generation mechanism 41 and flows from the passage 101 to the lower chamber 20, in addition to a flow through the passage 103. As described above, a damping force on the extension side at the time of a low piston frequency is hardened.

Here, in the damping force variable mechanism 43, at the time of a compression stroke, the pressure in the lower chamber 20 becomes high, so that the pressure in the variable chamber 172 becomes higher than the pressure in the variable chamber 171. As a result, the disk 155 of the partitioning disk 134 serving as a valve element of the check valve 245 is deformed using the support portion 143 of the case main body 131 as a support point and leaves the disks 135 serving as a valve seat of the check valve 245. Accordingly, the check valve 245 opens the passage 107 including the passage portion inside the penetration hole 167 and causes oil to flow from the lower chamber 20 toward the upper chamber 19. At this time, the disk 155 is separated from the disks 135 such that a differential pressure is eliminated, and further movement is suppressed.

In the foregoing damper of Patent Literature 1, a damping force variable mechanism causing a damping force to be variable in response to a frequency is provided. In such a damper, there is demand for improvement in productivity.

The damper 1 of the first embodiment causes a damping force to be variable in response to a frequency. Accordingly, in the damper 1, a part of the passage 107 is formed inside the case 140, and the variable chamber 171 and the variable chamber 172 are defined by the partitioning disk 134 inside the case 140. This partitioning disk 134 is constituted of the disk 155 and the elastic member 156. The elastic member 156 has a structure in which the seal portion 158 is fixedly attached to the one surface 181 side of the disk 155 and the stopper portions 159 are fixedly attached to the opposite surface 182 side of the disk 155. In this manner, in a case of a structure in which the elastic member 156 is fixedly attached to both surfaces 181 and 182 of the disk 155, there is a problem that productivity of the partitioning disk 134 is not so high.

Specifically, the disk 155 is disposed inside a cavity of the die, and a molten material (rubber material) for the elastic member 156 is injected into the cavity. At this time, if the speed of injecting a molten material is high, the disk 155 is deformed due to a differential pressure generated at the time of injection. If the elastic member 156 is solidified in this state, there is a possibility that accuracy for a molded product may not be able to be ensured. In addition, when the width of the connecting portion 162 in the radial direction is increased, a differential pressure generated in the disk 155 can be reduced even if the injection speed is increased, and therefore deformation of the disk 155 can be suppressed. However, when the width of the connecting portion 162 in the radial direction is increased, the rigidity of the seal portion 158 becomes lower, and the pressure resistance of the damper 1 decreases. Accordingly, the speed of injecting a molten material cannot be increased, and there is room for improvement in regard to improvement in productivity.

The damper 1 of the first embodiment has a constitution in which the elastic member 156 is provided to be fixedly attached to both surfaces of the disk 155 with an annular gap provided between the disk 155 and the case 140. Then, the stopper portions 159 which do not require the sealing function and are fixedly attached to the opposite surface 182 side with respect to the seal portion 158 fixedly attached to the one surface 181 side of the disk 155 are partially and fixedly attached in the circumferential direction, thereby forming the disk exposing portions 161. Thus, parts which become the disk exposing portions 161 of the disk 155 on the opposite surface 182 side can be supported by the die. As a result, even if a differential pressure is generated at the time of injecting a molten material for forming the elastic member 156, deformation of the disk 155 can be suppressed. Thus, even if the speed of injecting a material is increased, accuracy for a molded product can be ensured. Therefore, productivity of the partitioning disk 134 can be improved. As a result, productivity of the damper 1 can be improved.

Second Embodiment

Next, a second embodiment will be described based on FIGS. 7, 8, 9A, and 9B, mainly focusing on parts different from the first embodiment. The parts in common with the first embodiment will be described with the same names and the same reference numbers.

Figure 7:
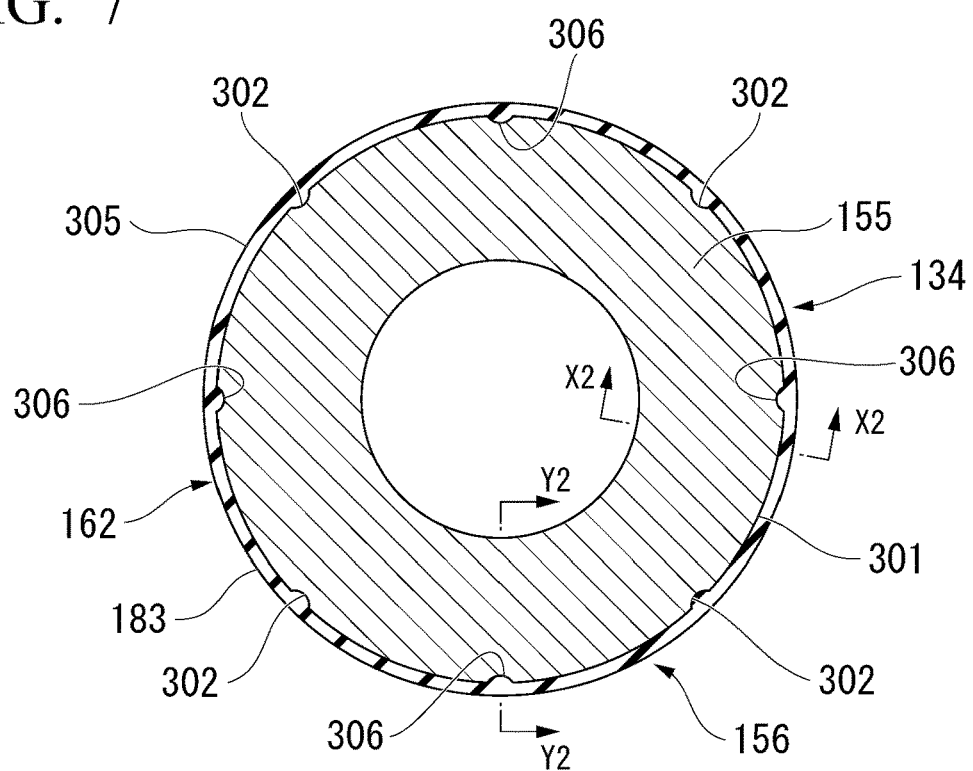
FIG. 7 is a cross-sectional plan view illustrating the partitioning disk of a damper of a second embodiment.

In the second embodiment, only the partitioning disk 134 is partially different from that in the first embodiment. That is, in the second embodiment, as illustrated in FIG. 7, the outer circumferential surface 183 of the disk 155 does not have a circular shape continuously formed throughout the whole circumference as in the first embodiment. In the disk 155, cut portions 302 recessed radially inward from the outer circumferential surface 183 are formed in an outer circumferential edge portion 301 including the outer circumferential surface 183. In other words, in the disk 155, a plurality of cut portions 302 are provided in the outer circumferential edge portion 301 on the gap side with respect to the outer cylindrical portion 166 of the case main body 131. A plurality (specifically, eight) of cut portions 302 are formed at equal intervals in the circumferential direction of the disk 155. The plurality of cut portions 302 axially penetrate the disk 155.

The connecting portion 162 of the elastic member 156 of the second embodiment has a main body portion 305 and protruding portion 306. The main body portion 305 is fixedly attached to the outer circumferential surface 183 of the disk 155 and has an annular shape. The protruding portions 306 protrude radially inward from the main body portion 305 and are fixedly attached to the cut portions 302. The same number (specifically, eight) of protruding portions 306 as the cut portions 302 are provided. The protruding portions 306 are disposed at equal intervals in the circumferential direction of the main body portion 305.

Figure 8:
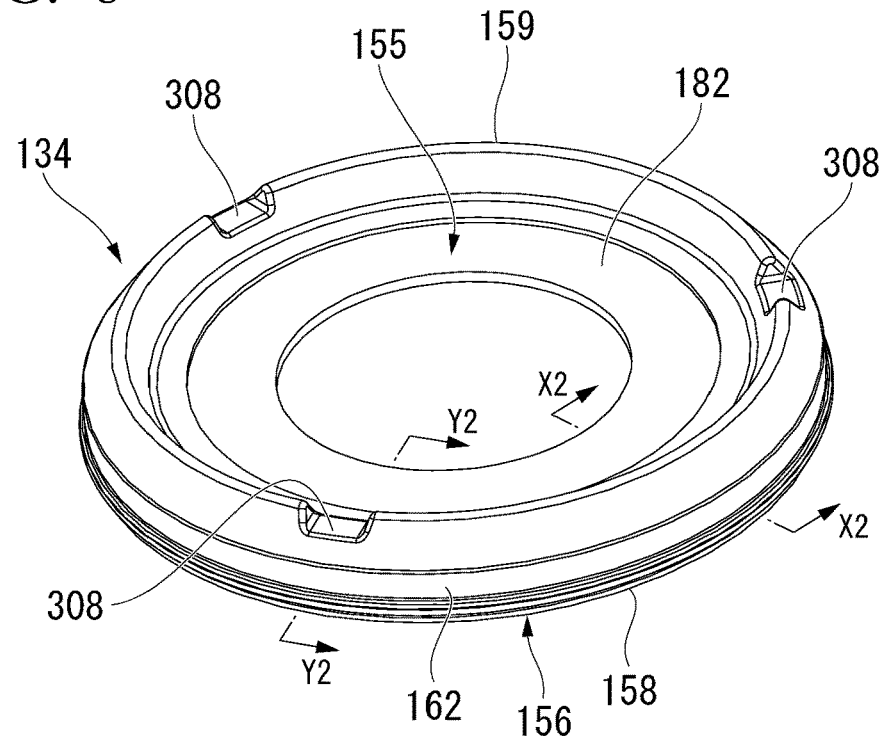
FIG. 8 is a perspective view illustrating the partitioning disk of the damper of the second embodiment.

As illustrated in FIG. 8, the stopper portions 159 of the elastic member 156 of the second embodiment are continuously formed in the circumferential direction of the disk 155 throughout the whole circumference and have an annular shape. That is, in the partitioning disk 134 of the second embodiment, the disk exposing portions 161 of the first embodiment are not formed. In the partitioning disk 134, the annular stopper portions 159 are fixedly attached to the disk 155 throughout the whole circumference. In the stopper portions 159 of the second embodiment, recessed grooves 308 are formed on a side opposite to the disk 155 in the axial direction. The recessed grooves 308 radially penetrate the stopper portions 159. A plurality (specifically, three) of recessed grooves 308 are provided at equal intervals in the circumferential direction of the stopper portions 159.

Figure 9A:
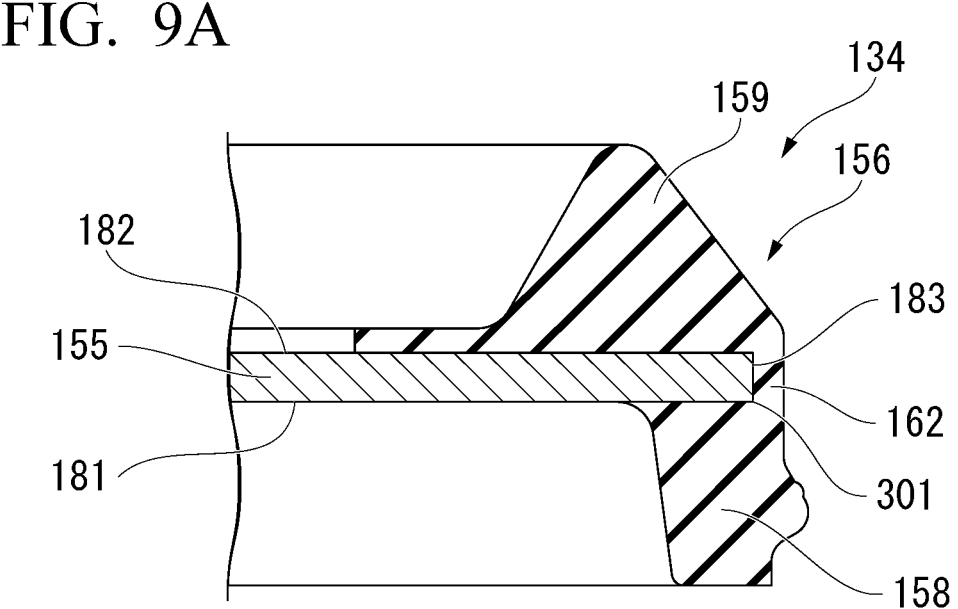
FIG. 9A is a cross-sectional view taken along X2-X2 in FIGS. 7 and 8 illustrating the partitioning disk of the damper of the second embodiment.
Figure 9B:
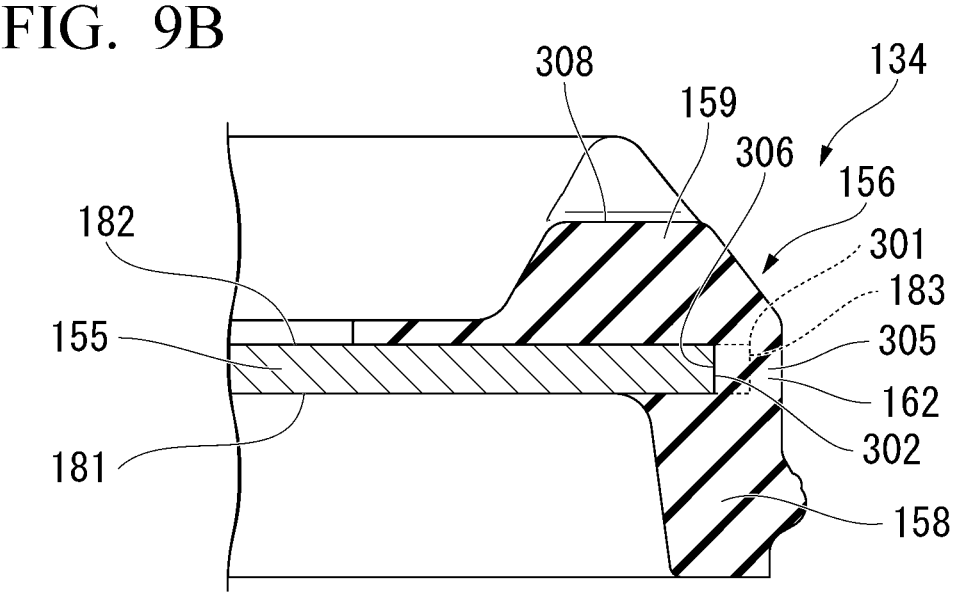
FIG. 9B is a cross-sectional view taken along Y2-Y2 in FIGS. 7 and 8 illustrating the partitioning disk of the damper of the second embodiment.

When the partitioning disk 134 of the second embodiment having such a constitution is manufactured, a rubber material forming the elastic member 156 is introduced to the die in a molten state while passing through the connecting portion forming cavity from the seal portion forming cavity and flowing to the stopper constituting portion forming cavity. At this time, in the disk 155, the plurality of cut portions 302 are formed in the outer circumferential edge portion 301. Accordingly, in the disk 155, the cross-sectional area of the flow channel is partially increased in the plurality of cut portions 302 as illustrated in FIGS. 9A and 9B, and the rubber material easily flows. As a result, a differential pressure between the seal portion forming cavity side and the stopper constituting portion forming cavity side of the disk 155 can be suppressed. Thus, even if the outer circumferential side of the disk 155 is not supported by the die, deformation of the disk 155 can be suppressed. Thus, even if the speed of injecting a material increased, accuracy for a molded product can be ensured. Therefore, productivity of the partitioning disk 134 can be improved. As a result, productivity of the damper 1 can be improved.

In addition, in the partitioning disk 134 of the second embodiment, the outer circumferential side where the elastic member 156 of the disk 155 is provided does not have to be supported by the die. Accordingly, in the partitioning disk 134, the stopper portions 159 continuously formed throughout the whole circumference can be provided to be fixedly attached to the disk 155 throughout the whole circumference. Thus, the strength for fixedly attaching the stopper portions 159 to the disk 155 can be enhanced.

Third Embodiment

Next, a third embodiment will be described based on FIGS. 10, 11, 12A, and 12B, mainly focusing on parts different from the first embodiment. The parts in common with the first embodiment will be described with the same names and the same reference numbers.

Figure 10:
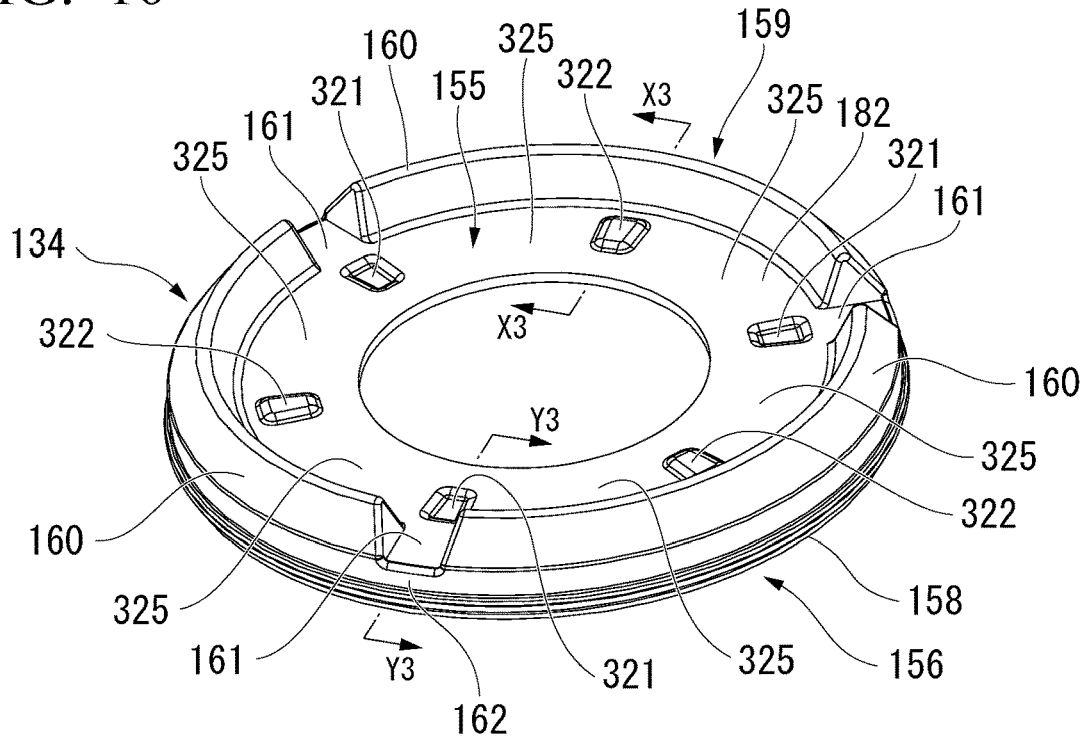
FIG. 10 is a perspective view illustrating the partitioning disk of a damper of a third embodiment.
Figure 11:
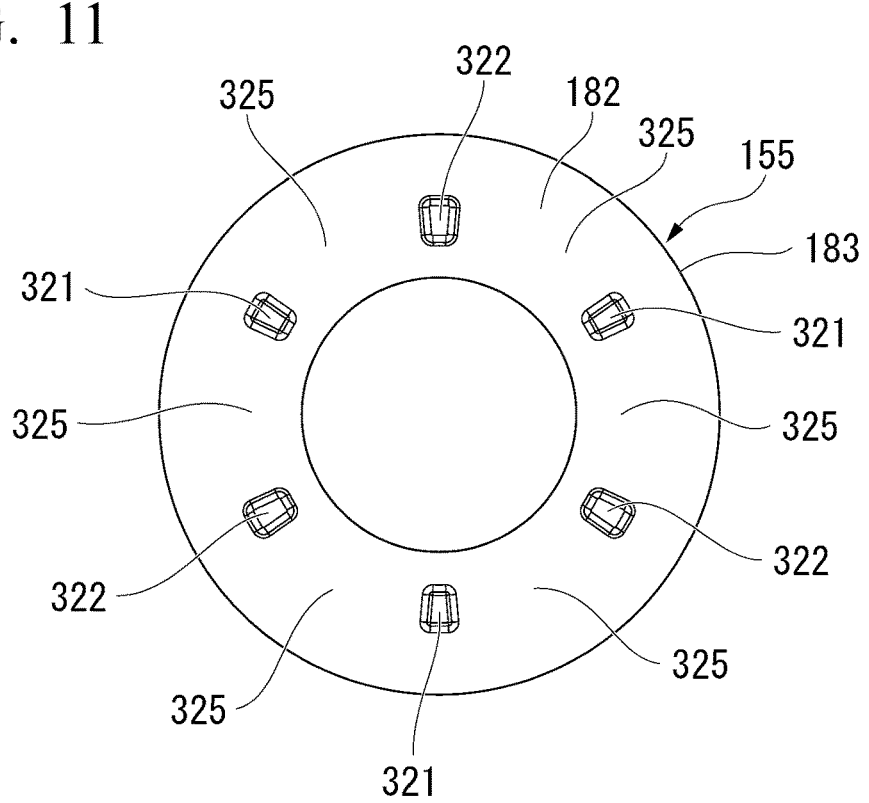
FIG. 11 is a plan view illustrating a disk of the partitioning disk of the damper of the third embodiment.

In the third embodiment, only the disk 155 of the partitioning disk 134 is partially different from that in the first embodiment. That is, in the third embodiment, as illustrated in FIGS. 10 and 11, a plurality (specifically, three) of recessed portions 321 having the same shape and a plurality (specifically, three) of projecting portions 322 having the same shape are formed on the surface 182 side of the disk 155. The recessed portions 321 have a substantially quadrangular shape when viewed in the axial direction of the disk 155, and the projecting portions 322 also have a substantially quadrangular shape when viewed in the axial direction of the disk 155. The surface 182 of the disk 155 is a flat surface and is a surface to which the stopper portions 159 are fixedly attached. The plurality of recessed portions 321 are formed to be recessed from the flat surface 182 in the axial direction (thickness direction) on the inner circumferential side opposite to the outer circumferential side where the elastic member 156 of the disk 155 in the radial direction is provided. The plurality of projecting portions 322 are formed to protrude from the surface 182 in the axial direction (thickness direction) on the inner circumferential side opposite to the outer circumferential side where the elastic member 156 of the disk 155 in the radial direction is provided. The recessed portions 321 and the projecting portions 322 formed on the surface 182 side of the disk 155 are positioned on the radially inner circumferential side with respect to the positions to which the stopper portions 159 of the disk 155 are fixedly attached. The recessed portions 321 and the projecting portions 322 formed on the surface 182 side of the disk 155 are separated from the stopper portions 159. The recessed portions 321 and the projecting portions 322 formed on the surface 182 side of the disk 155 are disposed at positions at an equal distance from the center of the disk 155. The recessed portions 321 and the projecting portions 322 formed on the surface 182 side of the disk 155 are alternately disposed at equal intervals in the circumferential direction of the disk 155. In other words, on the surface 182 of the disk 155, the recessed portions 321 and the projecting portions 322 are alternately formed in the circumferential direction on a side opposite to the outer circumferential side which is a side closer to the gap with respect to the outer cylindrical portion 166 of the case main body 131. In the recessed portions 321 formed on the surface 182 side of the disk 155, the position in the circumferential direction of the partitioning disk 134 coincides with those of the disk exposing portions 161. In the projecting portions 322 formed on the surface 182 side of the disk 155, the position in the circumferential direction of the partitioning disk 134 coincides with those of the stopper constituting portions 160. The recessed portions 321 and the projecting portions 322 formed on the surface 182 side of the disk 155 are evenly disposed in the circumferential direction of the disk 155.

Figure 12A:
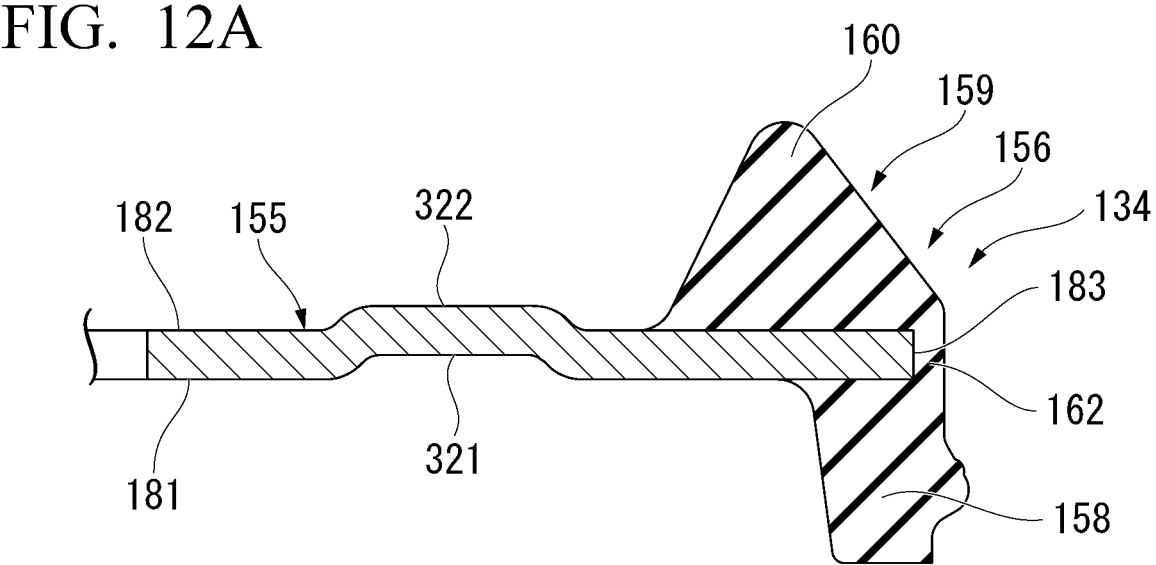
FIG. 12A is a cross-sectional view taken along X3-X3 in FIG. 10 illustrating the partitioning disk of the damper of the third embodiment.
Figure 12B:
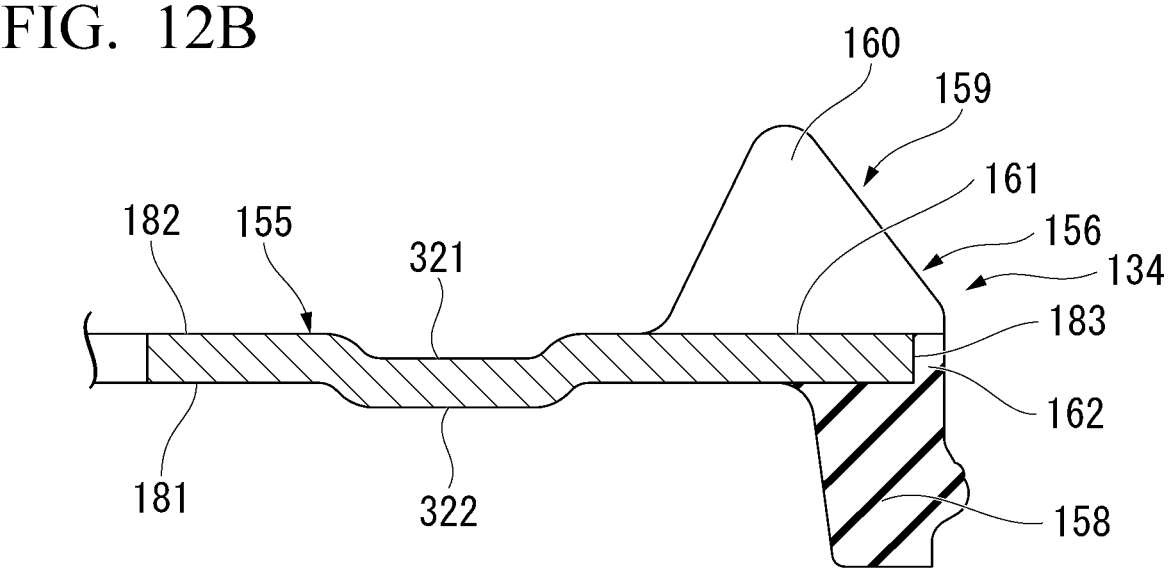
FIG. 12B is a cross-sectional view taken along Y3-Y3 in FIG. 10 illustrating the partitioning disk of the damper of the third embodiment.

As illustrated in FIG. 12A, the surface 181 is a flat surface and is a surface to which the seal portion 158 is fixedly attached. The rear side of the projecting portions 322 protruding from the surface 182 to which the stopper portions 159 are fixedly attached constitutes the recessed portions 321 recessed from the flat surface 181. These recessed portions 321 have the same shape as the recessed portions 321 recessed from the surface 182 illustrated in FIG. 12B. The rear side of the recessed portions 321 recessed from the surface 182 constitutes the projecting portions 322 protruding from the surface 181. These projecting portions 322 have the same shape as the projecting portions 322 protruding from the surface 182 illustrated in FIG. 12A. The recessed portions 321 and the projecting portions 322 formed on the surface 181 side of the disk 155 are positioned on the radially inner circumferential side with respect to the positions to which the seal portion 158 of the disk 155 is fixedly attached. The recessed portions 321 and the projecting portions 322 formed on the surface 181 side of the disk 155 are separated from the seal portion 158. The recessed portions 321 and the projecting portions 322 formed on the surface 181 side of the disk 155 are also alternately disposed at equal intervals in the circumferential direction of the disk 155 at positions at an equal distance from the center of the disk 155. In other words, on the surface 181 side of the disk 155, the recessed portions 321 and the projecting portions 322 are alternately formed in the circumferential direction on a side opposite to the outer circumferential side which is the side closer to the gap with respect to the outer cylindrical portion 166 of the case main body 131. In the recessed portions 321 formed on the surface 181 side of the disk 155, the position in the circumferential direction of the partitioning disk 134 coincides with those of the stopper constituting portions 160. In the projecting portions 322 formed on the surface 181 side of the disk 155, the position in the circumferential direction of the partitioning disk 134 coincides with those of the disk exposing portions 161. The recessed portions 321 and the projecting portions 322 formed on the surface 181 side of the disk 155 are evenly disposed in the circumferential direction of the disk 155.

As illustrated in FIGS. 10 and 11, each of the length of the recessed portions 321 and the projecting portions 322 in the circumferential direction of the disk 155 is smaller than the length of a flat portion 325 in the circumferential direction including the surfaces 181 and 182 between the recessed portions 321 and the projecting portions 322 adjacent to each other in the circumferential direction. All of the recessed portions 321 and the projecting portions 322 are formed on a side of the disk 155 radially inward from the elastic member 156. All of the recessed portions 321 and the projecting portions 322 are formed on a side of the disk 155 radially outward from the abutting part with respect to the disk 135 illustrated in FIG. 3. The disk 155 has the same shape on both the front and rear sides. There is no need for the disk 155 to distinguish the front and the rear sides. The recessed portions 321 and the projecting portions 322 are formed in the disk 155. Accordingly, the disk 155 has a high rigidity compared to the first embodiment in which these are not formed.

Here, the sizes and the depths of the recessed portions 321 and the sizes and the heights of the projecting portions 322 are set such that the surfaces 181 and 182 facing each other have a gap therebetween, in other words, the surfaces 181 and 182 facing each other are set such that they do not overlap each other in two disks 155 before the elastic member 156 is provided even if the recessed portions 321 on the surface 182 of the one disk 155 are positioned to be aligned with the projecting portions 322 on the surface 181 of the opposite disk 155 and the projecting portions 322 on the surface 182 of the one disk 155 are positioned to be aligned with the recessed portions 321 on the surface 181 of the opposite disk 155 to be stacked.

The inner circumferential side of the disk 155 is a side opposite to the outer circumferential side which is the side closer to the gap with respect to the outer cylindrical portion 166 of the case main body 131. In the disk 155, the recessed portions 321 and the projecting portions 322 are alternately formed in the circumferential direction on a side opposite to this gap.

The partitioning disk 134 has a constitution in which the elastic member 156 is fixedly attached to both surfaces 181 and 182 of the disk 155 through vulcanized adhesion. In this constitution, there is a need to apply an adhesive to both surfaces 181 and 182 of the disk 155 before being disposed in a die. In order to apply an adhesive to both surfaces 181 and 182 of the disk 155, for example, there is a need to perform work of applying the adhesive to the one surface 181 and applying the adhesive to the opposite surface 182 after flipping over the disk 155. Accordingly, there is room for improvement in regard to improvement in productivity.

In the damper 1 of the third embodiment, in the disk 155, the recessed portions 321 and the projecting portions 322 are alternately formed in the circumferential direction. Accordingly, in the surface 181 or the surface 182 of the one disk 155 and the surface 181 or the surface 182 of the opposite disk 155, the outer circumferential sides with respect to the recessed portions 321 and the projecting portions 322 can come into surface contact with each other. However, the opposite disk 155 does not come into surface contact with the inner circumferential side beyond the projecting portions 322 of the one disk 155. Thus, the area in which the disks 155 is capable of coming into surface contact with each other can be suppressed to a predetermined value or lower. Therefore, even if an adhesive is applied to the disk 155 through so-called dipping in which a plurality of disks 155 are put into a basket and are immersed in a liquid of an adhesive, sticking between the disks 155 can be suppressed. Thus, an adhesive can be applied to the disk 155 through dipping. Accordingly, an adhesive can be favorably applied to both surfaces 181 and 182 of the disk 155 within a short period of time. Therefore, productivity of the partitioning disk 134 can be improved. As a result, productivity of the damper 1 can be improved.

In addition, the recessed portions 321 and the projecting portions 322 are formed in the disk 155. Accordingly, the rigidity of the disk 155 is enhanced. Thus, when the elastic member 156 is formed in the disk 155, deformation of the disk 155 can be suppressed even if the outer circumferential side of the disk 155 is not supported by a die.

The second embodiment may be applied to the third embodiment. That is, the cut portions 302 may be formed in the outer circumferential edge portion 301 of the disk 155 of the partitioning disk 134 of the third embodiment. Moreover, the protruding portions 306 entering the cut portions 302 may be formed in the connecting portion 162 of the elastic member 156 of the partitioning disk 134 of the third embodiment. At the same time, the stopper portions 159 may be formed to be continuously formed throughout the whole circumference of the disk 155.

Fourth Embodiment

Figure 13:
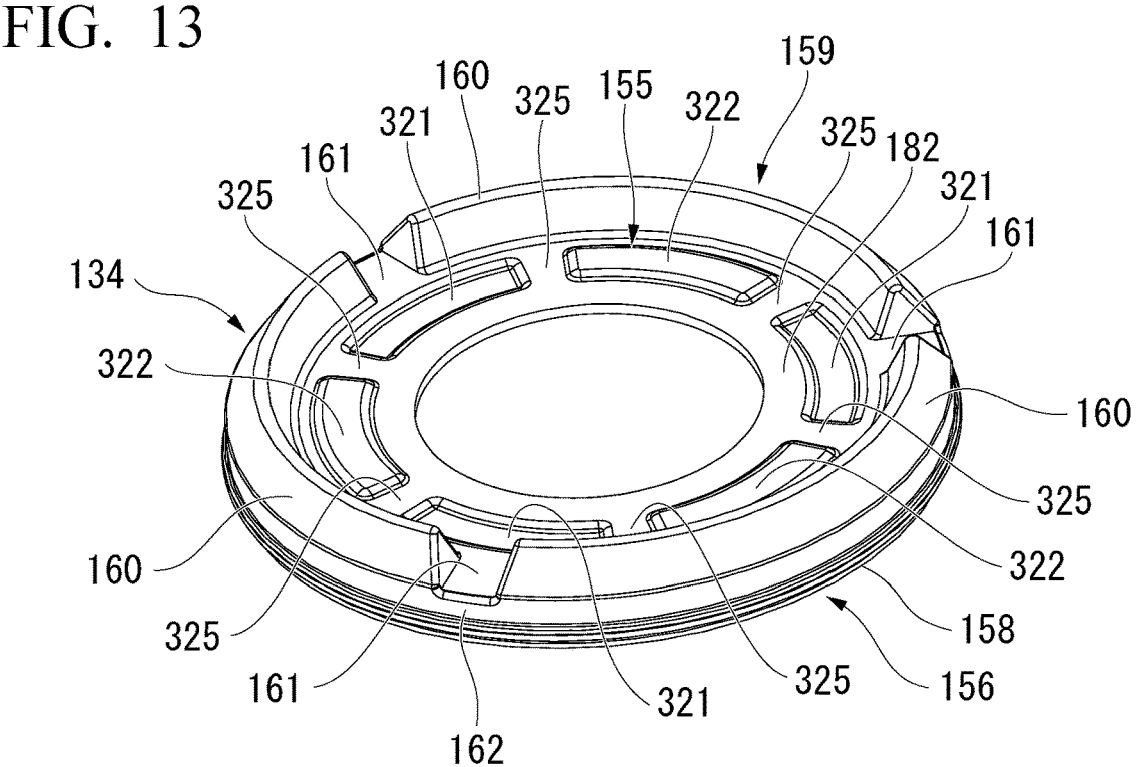
FIG. 13 is a perspective view illustrating the partitioning disk of a damper of the fourth embodiment.
Figure 14:
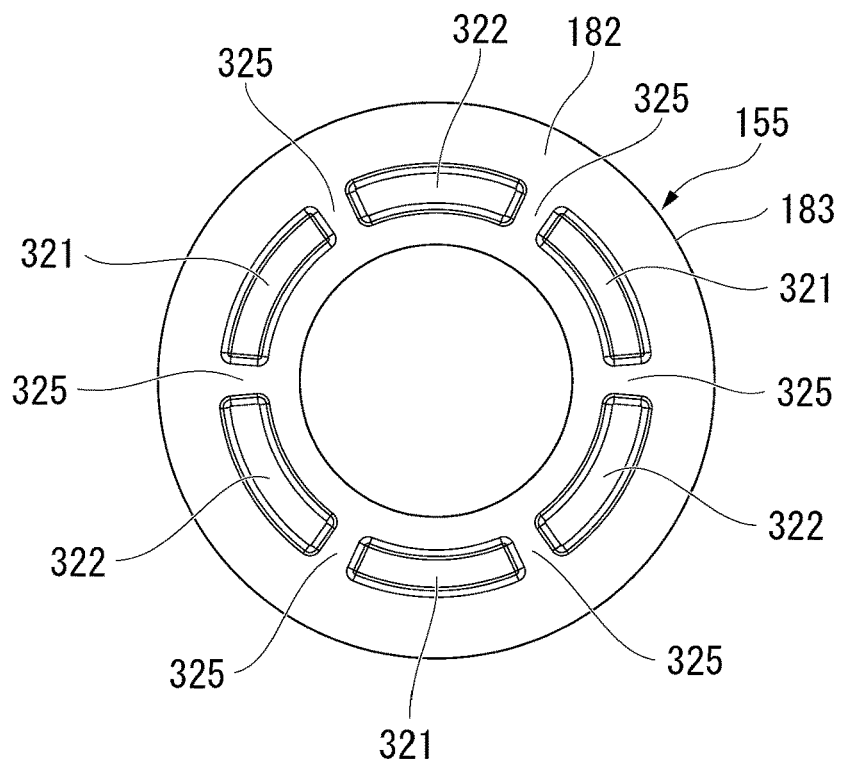
FIG. 14 is a plan view illustrating a disk of the partitioning disk of the damper of the fourth embodiment.

Next, a fourth embodiment will be described based on FIGS. 13 and 14, mainly focusing on parts different from the third embodiment. The parts in common with the third embodiment will be described with the same names and the same reference numbers.

In the fourth embodiment, only the partitioning disk 134 is partially different from that in the third embodiment. That is, in the fourth embodiment, as illustrated in FIGS. 13 and 14, the recessed portions 321 and the projecting portions 322 has an arc shape about the center of the disk 155. In the fourth embodiment, the length of the disk 155 in the circumferential direction in each of the recessed portions 321 and the projecting portions 322 is larger than the length of the flat portion 325 in the circumferential direction between the recessed portions 321 and the projecting portions 322 adjacent to each other in the circumferential direction. In the fourth embodiment as well, sticking between the disks 155 before the elastic member 156 is formed can be suppressed. Accordingly, productivity of the partitioning disk 134 can be improved.

Fifth Embodiment

Next, a fifth embodiment will be described based on FIGS. 15 and 16, mainly focusing on parts different from the first embodiment. The parts in common with the first embodiment will be described with the same names and the same reference numbers.

In the fifth embodiment, the damping force variable mechanism 43 is partially different from that in the first embodiment. As illustrated in FIG. 15, in the damping force variable mechanism 43 of the fifth embodiment, the case main body 131 has a shape in which the outer cylindrical portion 166 and the inner cylindrical portion 142 of the first embodiment are removed. The case main body 131 of the fifth embodiment has the base portion 141, the support portion 143, the small diameter hole portion 145, the large diameter hole portion 146, and the cut 203. In addition, in the damping force variable mechanism 43 of the fifth embodiment, the lid member 139 has a shape including a bottom portion 401 having a flat plate shape and a cylindrical portion 402 having a cylindrical shape. The bottom portion 401 has a flat plate shape including the penetration hole 167. The cylindrical portion 402 axially extends from the outer circumferential edge portion of the bottom portion 401. The case main body 131 is fitted into the cylindrical portion 402 of the lid member 139, thereby forming the case 140.

On the inner circumferential side of the cylindrical portion 402 of the lid member 139, a large diameter portion 405 is provided on a side opposite to the bottom portion 401. On the inner circumferential side of the cylindrical portion 402 of the lid member 139, a small diameter portion 406 having a smaller inner diameter than the large diameter portion 405 is provided on the bottom portion 401 side. On the inner circumferential side of the cylindrical portion 402 of the lid member 139, a step portion 407 expanding in the axially orthogonal direction is formed between the large diameter portion 405 and the small diameter portion 406.

In the fifth embodiment, the partitioning disk 134 is also partially different from that in the first embodiment. In the partitioning disk 134 of the fifth embodiment, the elastic member 156 is fixedly attached to the inner circumferential side of the disk 155 having a perforated circular plate shape. In the partitioning disk 134 of the fifth embodiment, the outer circumferential side of the disk 155 is supported by the step portion 407 serving as a seat portion of the lid member 139. In the partitioning disk 134 of the fifth embodiment, the intermediate position of the disk 155 thereof in the radial direction is supported by the support portion 143 of the case main body 131. The axial dimension between the step portion 407 and the support portion 143 is smaller than the thickness of the disk 155. Accordingly, a set load is applied to the partitioning disk 134.

In the partitioning disk 134 of the fifth embodiment, the elastic member 156 is fixedly attached to the inner circumferential side of the disk 155. In the partitioning disk 134 of the fifth embodiment, the annular seal portion 158 is fixedly attached to the inner circumferential side on the one surface 181 of the disk 155. In the partitioning disk 134 of the fifth embodiment, the stopper portions 159 are fixedly attached to the inner circumferential side on the opposite surface 182 of the disk 155. In addition, as illustrated in FIG. 16, the annular connecting portion 162 is fixedly attached to an inner circumferential surface 185 of the disk 155.

Figure 15:
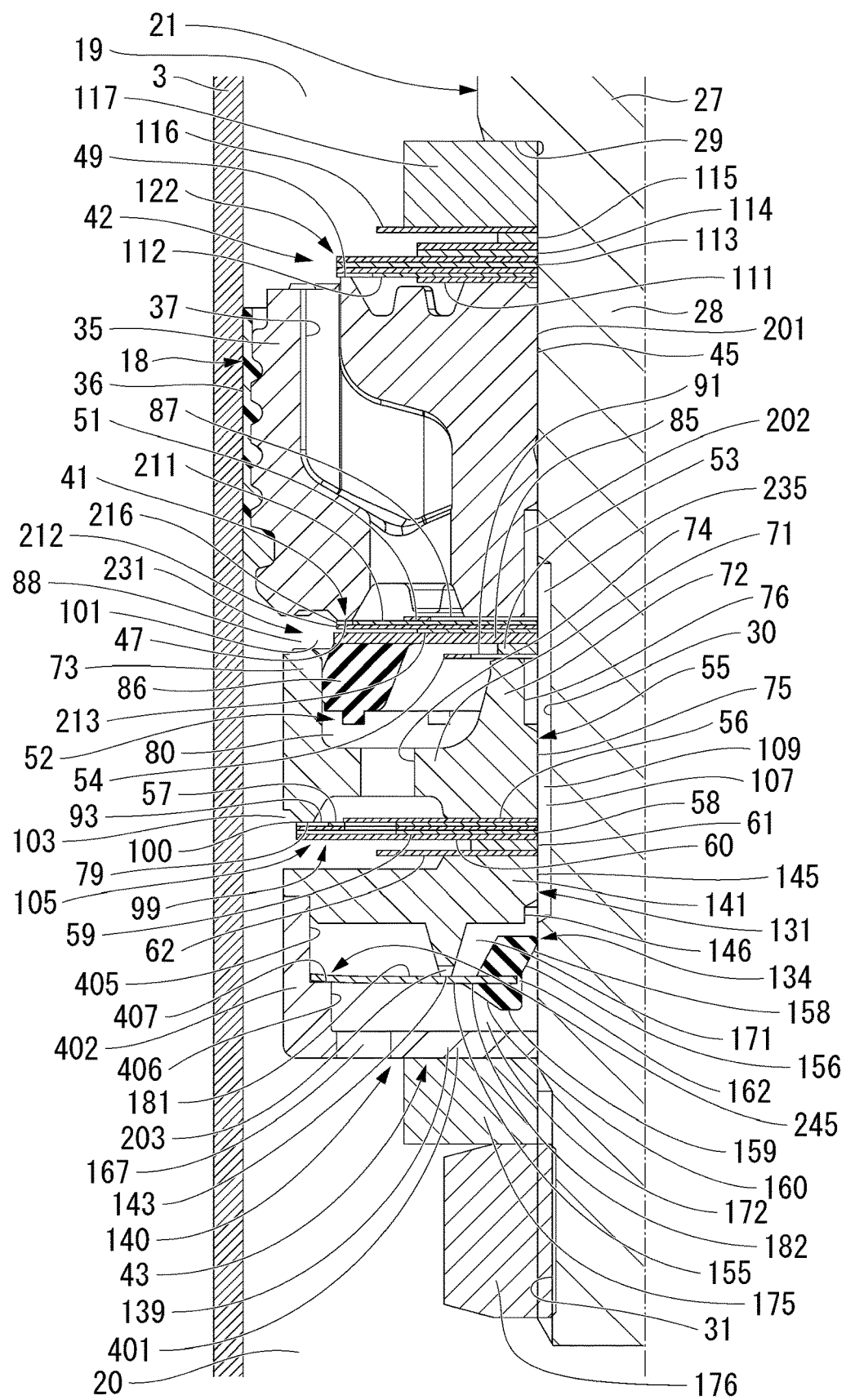
FIG. 15 is a partial cross-sectional view illustrating a part around the piston, the damping force generation mechanism, and the damping force variable mechanism of a damper of the fifth embodiment.
Figure 16:
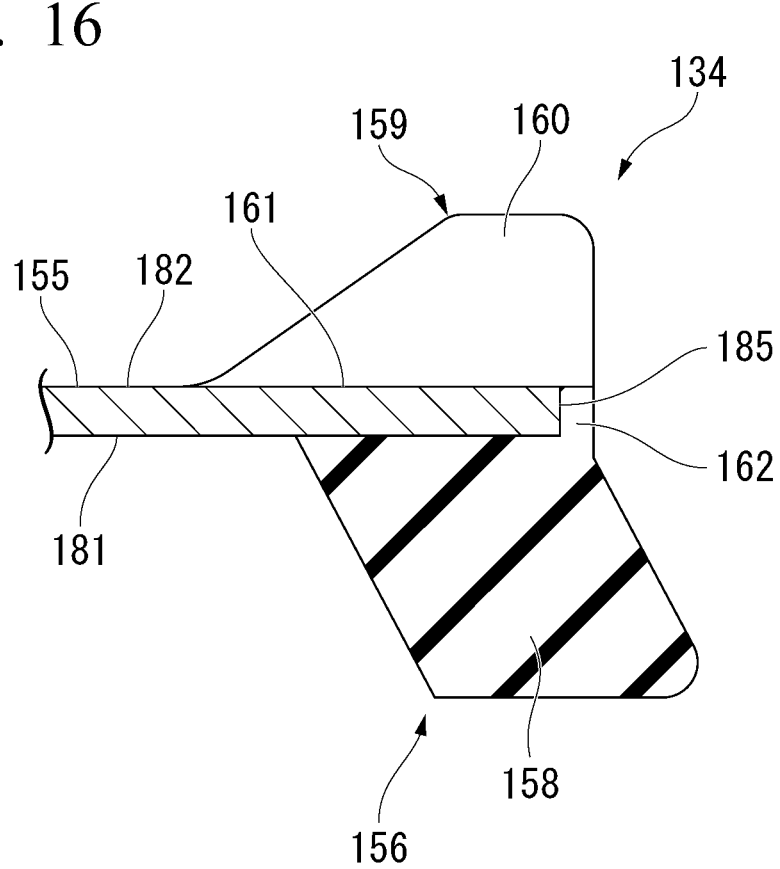
FIG. 16 is a partial cross-sectional view illustrating the partitioning disk of the damper of the fifth embodiment.

As illustrated in FIG. 15, in the partitioning disk 134 of the fifth embodiment, the disk 155 thereof is internally penetrated by the attachment shaft portion 28. The disk 155 thereof has a gap between the disk 155 and the attachment shaft portion 28. Then, the elastic member 156 is provided on the non-support side which is a side closer to the gap of the disk 155 with respect to the piston rod 21. The elastic member 156 seals a part between the disk 155 and the attachment shaft portion 28 using the seal portion 158. In the elastic member 156, the seal portion 158 and the stopper portions 159 are fixedly attached to both surfaces of the disk 155 with the annular gap between the disk 155 and the attachment shaft portion 28. In other words, the elastic member 156 is provided to be fixedly attached to both surfaces of the disk 155 with the gap between the disk 155 and the attachment shaft portion 28.

In the partitioning disk 134 of the fifth embodiment, the stopper portions 159 are constituted of a plurality of stopper constituting portions 160 having an arc shape. These stopper constituting portions 160 have a shape along the inner circumferential edge portion of the disk 155. In the partitioning disk 134 of the fifth embodiment, parts between the stopper constituting portions 160 and the stopper constituting portions 160 adjacent to each other in the circumferential direction of the disk 155 constitute the disk exposing portions 161 in which the disk 155 is exposed as illustrated in FIG. 2.

In the fifth embodiment, the outer circumferential side of the disk 155 of the partitioning disk 134 and the step portion 407 of the case 140 constitute the check valve 245. The check valve 245 restricts a flow of oil from the variable chamber 171 to the lower chamber 20 in the parallel passage 109 of the passage 107. On the other hand, the check valve 245 allows a flow of oil from the lower chamber 20 to the variable chamber 171.

In the fifth embodiment as well, when the elastic member 156 is formed in the disk 155, part which become the disk exposing portions 161 on the surface 182 side of the disk 155 can be pressed using a die. Accordingly, deformation of the disk 155 can be suppressed. Therefore, similar to the first embodiment, productivity can be improved.

Here, the second embodiment may be applied to the damping force variable mechanism 43 of the fifth embodiment. That is, the cut portions 302 recessed radially outward from the inner circumferential surface 185 may be formed in the inner circumferential portion of the disk 155 of the partitioning disk 134 of the fifth embodiment. Moreover, the protruding portions 306 protruding radially outward and entering the cut portions 302 may be formed in the connecting portion 162 of the elastic member 156 of the partitioning disk 134 of the fifth embodiment. At the same time, the stopper portions 159 may be formed to be continuously formed throughout the whole circumference of the disk 155. In addition, the third and fourth embodiments may be applied to the damping force variable mechanism 43 of the fifth embodiment. That is, the recessed portions 321 and the projecting portions 322 may be alternately formed in the circumferential direction on the outer circumferential side of the disk 155 of the partitioning disk 134 of the fifth embodiment.

Sixth Embodiment

Next, a sixth embodiment will be described based on FIGS. 17 to 20, mainly focusing on parts different from the second embodiment. The parts in common with the second embodiment will be described with the same names and the same reference numbers.

Figure 17:
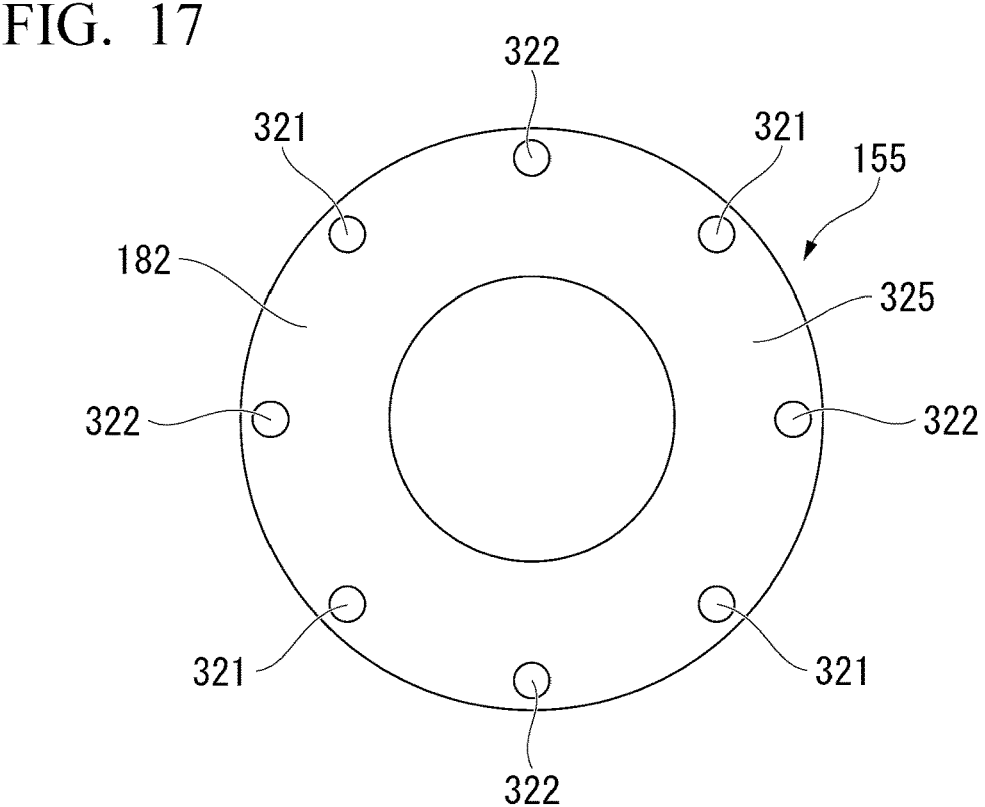
FIG. 17 is a plan view illustrating a disk of the partitioning disk of a damper of a sixth embodiment.
Figure 18:
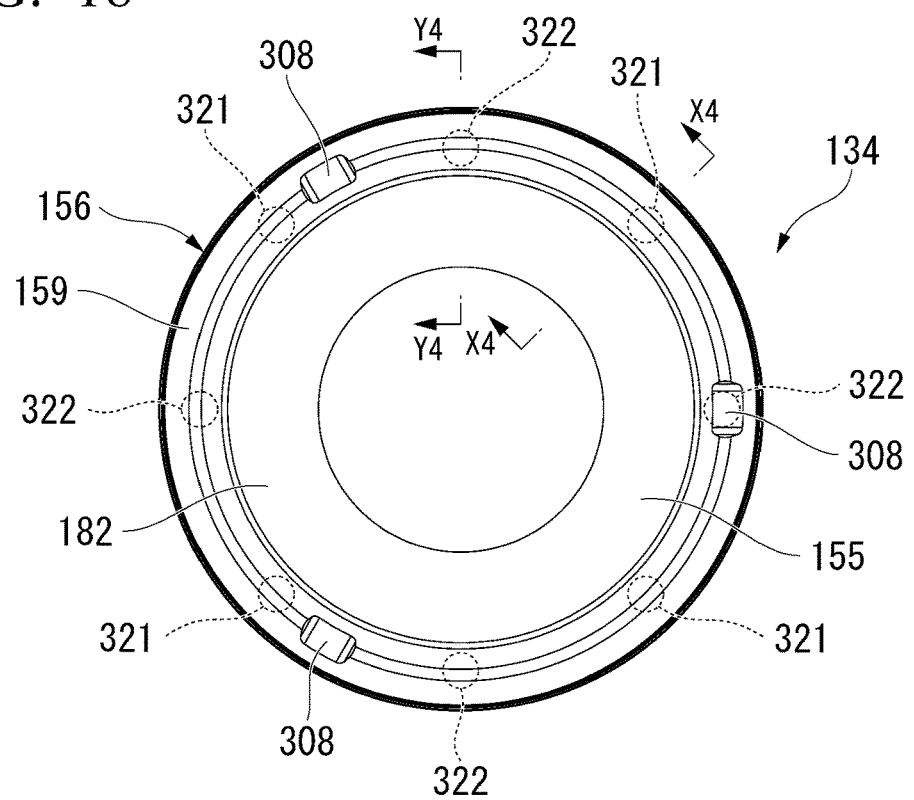
FIG. 18 is a plan view illustrating the partitioning disk of the damper of the sixth embodiment.
Figure 19:
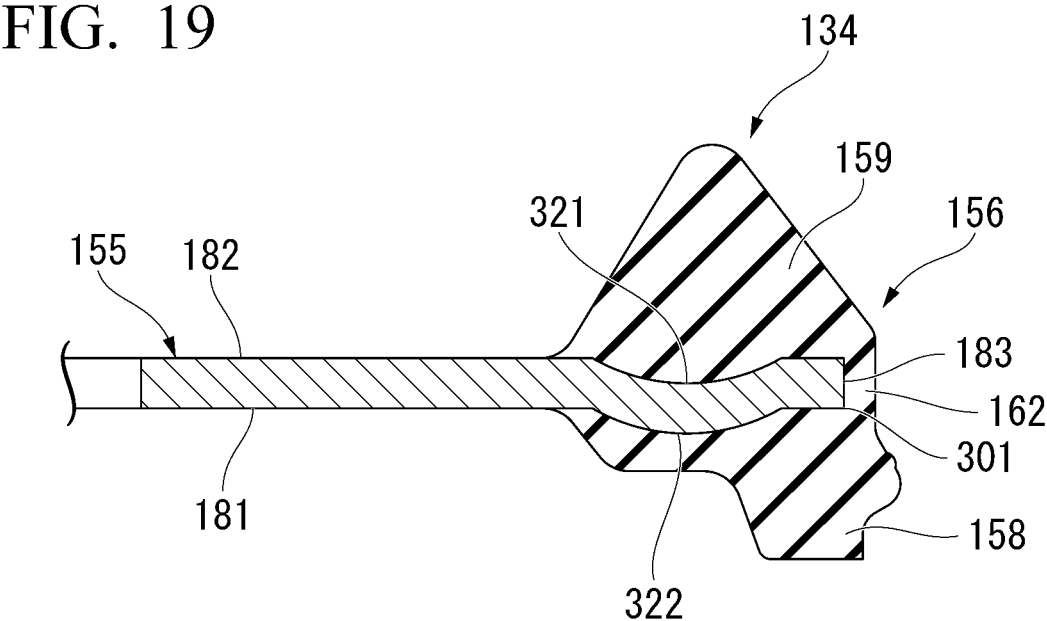
FIG. 19 is a cross-sectional view taken along X4-X4 in FIG. 18 illustrating the partitioning disk of the damper of the sixth embodiment.
Figure 20:
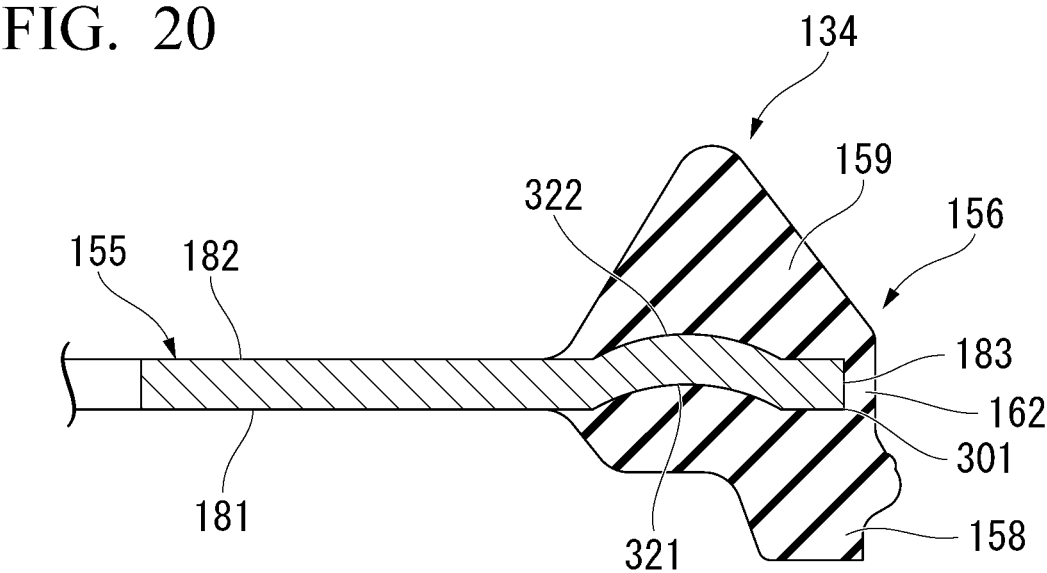
FIG. 20 is a cross-sectional view taken along Y4-Y4 in FIG. 18 illustrating the partitioning disk of the damper of the sixth embodiment.

In the sixth embodiment, the disk 155 of the partitioning disk 134 is partially different from that in the first embodiment. That is, in the sixth embodiment, as illustrated in FIG. 17, a plurality (specifically, four) of recessed portions 321 having the same shape and a plurality (specifically, four) of projecting portions 322 having the same shape are formed on the surface 182 side of the disk 155. The recessed portions 321 have a circular shape when viewed in the axial direction of the disk 155, and the projecting portions 322 also have a circular shape when viewed in the axial direction of the disk 155. The surface 182 of the disk 155 is a flat surface and is a surface to which the stopper portions 159 are fixedly attached, as illustrated in FIG. 18. As illustrated in FIG. 19, the plurality of recessed portions 321 formed on the surface 182 side of the disk 155 are formed to be recessed from the surface 182 in the axial direction (thickness direction) on the outer circumferential side where the elastic member 156 of the disk 155 in the radial direction is provided. As illustrated in FIG. 20, the plurality of projecting portions 322 formed on the surface 182 side of the disk 155 are formed to protrude from the surface 182 in the axial direction (thickness direction) on the outer circumferential side where the elastic member 156 of the disk 155 in the radial direction is provided. The recessed portions 321 and the projecting portions 322 formed on the surface 182 side of the disk 155 are provided at positions to which the stopper portions 159 of the disk 155 are fixedly attached. All of the recessed portions 321 and the projecting portions 322 formed on the surface 182 side of the disk 155 in their entirety overlap the stopper portions 159. All of the recessed portions 321 and the projecting portions 322 formed on the surface 182 side of the disk 155 in their entirety are buried inside the stopper portions 159. As illustrated in FIG. 17, the recessed portions 321 and the projecting portions 322 formed on the surface 182 side of the disk 155 are disposed at positions at an equal distance from the center of the disk 155. The recessed portions 321 and the projecting portions 322 formed on the surface 182 side of the disk 155 are alternately disposed at equal intervals in the circumferential direction of the disk 155. In other words, on the surface 182 side of the disk 155, the recessed portions 321 and the projecting portions 322 are alternately formed in the circumferential direction on the outer circumferential side which is the side closer to the gap with respect to the outer cylindrical portion 166 of the case main body 131 (refer to FIG. 3). The recessed portions 321 and the projecting portions 322 formed on the surface 182 side of the disk 155 are evenly disposed in the circumferential direction of the disk 155.

As illustrated in FIG. 20, the surface 181 is a flat surface and is a surface to which the seal portion 158 is fixedly attached. The rear side of the projecting portions 322 protruding from the surface 182 to which the stopper portions 159 are fixedly attached constitutes the recessed portions 321 recessed from the flat surface 181. These recessed portions 321 have the same shape as the recessed portions 321 recessed from the surface 182 illustrated in FIG. 19. The rear side of the recessed portions 321 recessed from the surface 182 constitutes the projecting portions 322 protruding from the surface 181. These projecting portions 322 have the same shape as the projecting portions 322 protruding from the surface 182 illustrated in FIG. 20. The recessed portions 321 and the projecting portions 322 formed on the surface 181 side of the disk 155 are provided at positions to which the seal portion 158 of the disk 155 is fixedly attached. All of the recessed portions 321 and the projecting portions 322 formed on the surface 181 side of the disk 155 in their entirety overlap the seal portion 158. All of the recessed portions 321 and the projecting portions 322 formed on the surface 181 side of the disk 155 in their entirety are buried inside the seal portion 158. The recessed portions 321 and the projecting portions 322 formed on the surface 181 side of the disk 155 are also alternately disposed at equal intervals in the circumferential direction of the disk 155 at positions at an equal distance from the center of the disk 155. In other words, on the surface 181 side of the disk 155, the recessed portions 321 and the projecting portions 322 are alternately formed in the circumferential direction on the outer circumferential side which is a side closer to the gap with respect to the outer cylindrical portion 166 of the case main body 131 (refer to FIG. 3). The recessed portions 321 and the projecting portions 322 formed on the surface 181 side of the disk 155 are evenly disposed in the circumferential direction of the disk 155.

As illustrated in FIG. 17, the diameter of each of the recessed portions 321 and the projecting portions 322 is shorter than the length of the flat portion 325 in the circumferential direction including the surfaces 181 and 182 between the recessed portions 321 and the projecting portions 322 adjacent to each other in the circumferential direction. As illustrated in FIG. 18, positions of all of the recessed portions 321 and the projecting portions 322 overlap with the positions of the elastic member 156 and the disk 155 in the radial direction. All of the recessed portions 321 and the projecting portions 322 are formed in the disk 155 on a side of the disk 155 radially outward from the abutting part with respect to the disk 135 (refer to FIG. 3). All of the recessed portions 321 and the projecting portions 322 are formed in the disk 155 on a side of the disk 155 radially outward from the abutting part with respect to the support portion 143 (refer to FIG. 3). The disk 155 has the same shape on both the front and rear sides. There is no need for the disk 155 to distinguish the front and the rear sides. The recessed portions 321 and the projecting portions 322 are formed in the disk 155. Accordingly, the disk 155 has a high rigidity on the outer circumferential side compared to the first embodiment in which these are not formed.

Here, the sizes and the depths of the recessed portions 321 and the sizes and the heights of the projecting portions 322 are set such that the surfaces 181 and 182 facing each other have a gap therebetween, in other words, the surfaces 181 and 182 facing each other are set such that they do not overlap each other in two disks 155 before the elastic member 156 is provided even if the recessed portions 321 on the surface 182 of the one disk 155 are positioned to be aligned with the projecting portions 322 on the surface 181 of the opposite disk 155 and the projecting portions 322 on the surface 182 of the one disk 155 are positioned to be aligned with the recessed portions 321 on the surface 181 of the opposite disk 155 to be stacked.

The outer circumferential side of the disk 155 is a side closer to the gap with respect to the outer cylindrical portion 166 of the case main body 131 (refer to FIG. 3). In the disk 155, the recessed portions 321 and the projecting portions 322 are alternately formed in the circumferential direction on this gap side.

In the sixth embodiment as well, the partitioning disk 134 has a constitution in which the elastic member 156 is fixedly attached to both surfaces 181 and 182 of the disk 155 through vulcanized adhesion. In this constitution, there is a need to apply an adhesive to both surfaces 181 and 182 of the disk 155 before being disposed in a die. In order to apply an adhesive to both surfaces 181 and 182 of the disk 155, for example, there is a need to perform work of applying the adhesive to the one surface 181 and applying the adhesive to the opposite surface 182 after flipping over the disk 155. Accordingly, there is room for improvement in regard to improvement in productivity.

In the sixth embodiment, in the disk 155, the recessed portions 321 and the projecting portions 322 are alternately formed in the circumferential direction. Accordingly, in the surface 181 or the surface 182 of the one disk 155 and the surface 181 or the surface 182 of the opposite disk 155, the outer circumferential side with respect to the recessed portions 321 and the projecting portions 322 are capable of coming into surface contact with each other. However, the opposite disk 155 does not come into surface contact with the inner circumferential side beyond the projecting portions 322 of the one disk 155. Moreover, since the recessed portions 321 and the projecting portions 322 are formed on the outer circumferential side of the disk 155, the area in which the disks 155 can come into surface contact with each other can be smaller than that in the third embodiment. Therefore, even if an adhesive is applied to the disk 155 through so-called dipping in which a plurality of disks 155 are put into a basket and are immersed in a liquid of an adhesive, sticking between the disks 155 can be suppressed. Thus, an adhesive can be applied to the disk 155 through dipping. Accordingly, an adhesive can be favorably applied to both surfaces 181 and 182 of the disk 155 within a short period of time. Therefore, productivity of the partitioning disk 134 can be improved. As a result, productivity of the damper 1 can be improved.

In addition, in the disk 155, the recessed portions 321 and the projecting portions 322 are formed on the outer circumferential side. Accordingly, the rigidity of the outer circumferential side of the disk 155 is enhanced. Thus, when the elastic member 156 is formed in the disk 155, deformation of the disk 155 can be suppressed even if the outer circumferential side of the disk 155 is not supported by a die. Moreover, in the present sixth embodiment, since the inner diameters of the stopper portions 159 and the inner diameter of the seal portion 158 are configured to be substantially equivalent to each other, the disk 155 can be supported inside the stopper portions 159 and is no longer necessary to be supported by the outer circumferential side. Thus, as illustrated in FIG. 8, the stopper portions 159 can have an annular shape continuously formed in the circumferential direction of the disk 155 throughout the whole circumference. Therefore, the outer circumferential side of the disk 155 is no longer exposed, and it is possible to further reduce the possibilities that the stopper portions 159 may peel off.

The second embodiment may be applied to the sixth embodiment. That is, the cut portions 302 may be formed in the outer circumferential edge portion 301 of the disk 155 of the partitioning disk 134 of the sixth embodiment. Moreover, the protruding portions 306 entering the cut portions 302 may be formed in the connecting portion 162 of the elastic member 156 of the partitioning disk 134 of the sixth embodiment.

Seventh Embodiment

Figure 21:
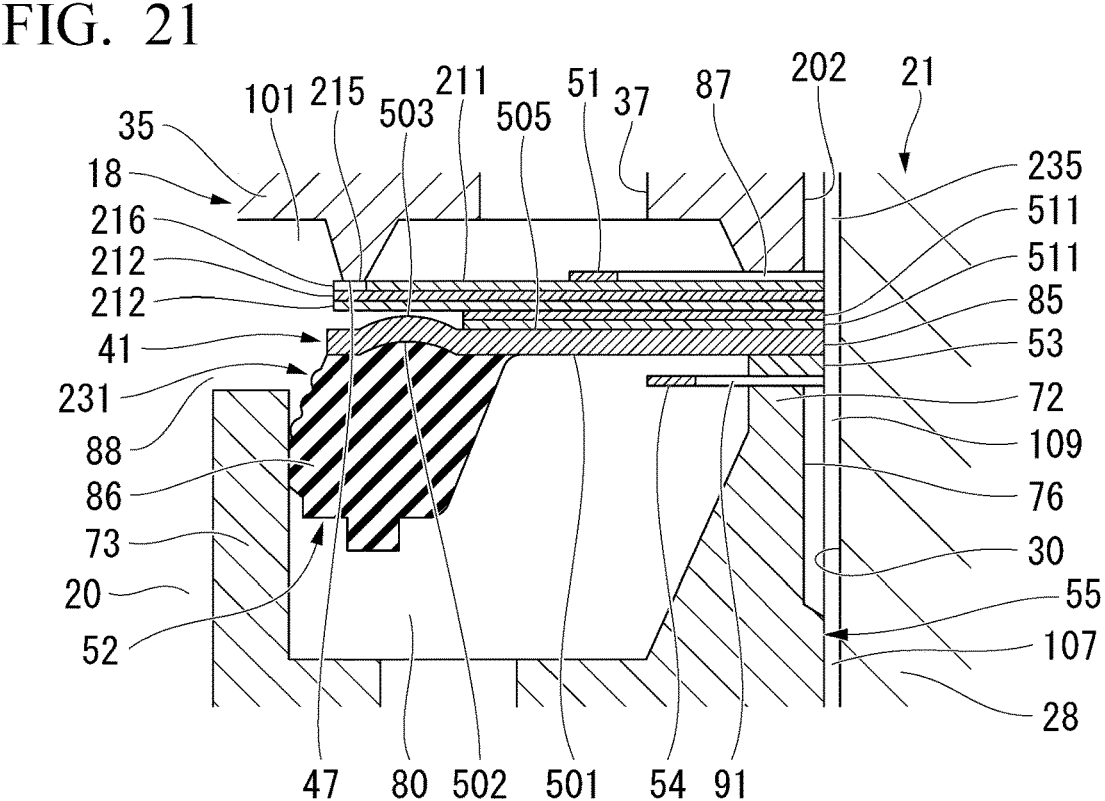
FIG. 21 is a partial cross-sectional view illustrating a part around the damping force generation mechanism of a damper of a seventh embodiment.
Figure 22:
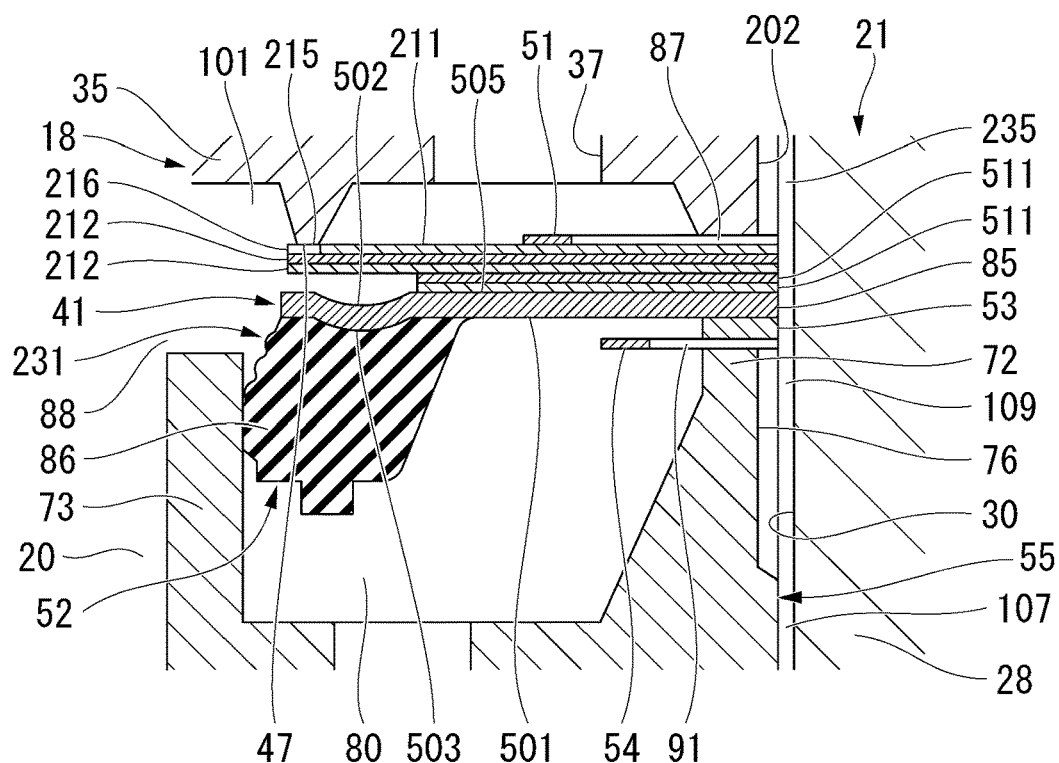
FIG. 22 is a partial cross-sectional view illustrating a part around the damping force generation mechanism of the damper of the seventh embodiment.

Next, a seventh embodiment will be described based on FIGS. 21 and 22, mainly focusing on parts different from the first embodiment. The parts in common with the first embodiment will be described with the same names and the same reference numbers.

In the seventh embodiment, the disk 85 of the pilot valve 52 is partially different from that in the first embodiment. That is, in the seventh embodiment, as illustrated in FIG. 21, a plurality of recessed portions 502 having the same shape are formed on one surface 501 side of the disk 85. Since FIG. 21 is a cross section, only one of the plurality of recessed portions 502 is illustrated therein. In the seventh embodiment, as illustrated in FIG. 22, a plurality of projecting portions 503 having the same shape are formed on the one surface 501 side of the disk 85. Since FIG. 22 is a cross section, only one of the plurality of projecting portions 503 is illustrated therein. The surface 501 is a flat surface and is a surface to which the seal portion 86 is fixedly attached. The recessed portions 502 have a circular shape when viewed in the axial direction of the disk 85, and the projecting portions 503 also have a circular shape when viewed in the axial direction of the disk 85. The plurality of recessed portions 502 formed on the surface 501 side of the disk 85 are formed to be recessed from the flat surface 501 in the axial direction (thickness direction) on the outer circumferential side where the seal portion 86 of the disk 85 in the radial direction is provided. The plurality of projecting portions 503 formed on the surface 501 side of the disk 85 are formed to protrude from the surface 501 in the axial direction (thickness direction) on the outer circumferential side where the seal portion 86 of the disk 85 in the radial direction is provided. All of the recessed portions 502 and the projecting portions 503 formed on the surface 501 side of the disk 85 are provided at positions where the seal portion 86 of the disk 85 is fixedly attached. All of the recessed portions 502 and the projecting portions 503 formed on the surface 501 side of the disk 85 in their entirety overlap the seal portion 86. All of the recessed portions 502 and the projecting portions 503 formed on the surface 501 side of the disk 85 in their entirety are buried inside the seal portion 86. The recessed portions 502 and the projecting portions 503 formed on the surface 501 side of the disk 85 are disposed at positions at an equal distance from the center of the disk 85. The recessed portions 502 and the projecting portions 503 formed on the surface 501 side of the disk 85 are alternately disposed at equal intervals in the circumferential direction of the disk 85. In other words, on the surface 501 of the disk 85, the recessed portions 502 and the projecting portions 503 are alternately formed in the circumferential direction on the outer circumferential side which is a side closer to the gap with respect to the outer cylindrical portion 73 of the pilot case 55. The recessed portions 502 and the projecting portions 503 formed on the surface 501 side of the disk 85 are evenly disposed in the circumferential direction of the disk 85.

An opposite surface 505 of the disk 85 is a flat surface and is a surface on a side opposite to the surface 501 to which the seal portion 86 is fixedly attached. As illustrated in FIG. 22, the rear side of the projecting portions 503 protruding from the surface 501 to which the seal portion 86 is fixedly attached constitutes the recessed portions 502 recessed from the surface 505 on which the seal portion 86 is not provided. These recessed portions 502 have the same shape as the recessed portions 502 recessed from the surface 501 illustrated in FIG. 21. The rear side of the recessed portions 502 recessed from the surface 501 constitutes the projecting portions 503 protruding from the surface 505. These projecting portions 503 have the same shape as the projecting portions 503 protruding from the surface 501 illustrated in FIG. 22. The recessed portions 502 and the projecting portions 503 formed on the surface 505 side of the disk 85 are also alternately disposed at equal intervals in the circumferential direction of the disk 85 at positions at an equal distance from the center of the disk 85. In other words, on the surface 505 of the disk 85, the recessed portions 502 and the projecting portions 503 are alternately formed in the circumferential direction on the outer circumferential side which is the side closer to the gap with respect to the outer cylindrical portion 73 of the pilot case 55. The recessed portions 502 and the projecting portions 503 formed on the surface 505 side of the disk 85 are evenly disposed in the circumferential direction of the disk 85. In the pilot valve 52 of the seventh embodiment, positions of all of the recessed portions 502 and the projecting portions 503 overlap the positions of the seal portion 86 and the disk 85 in the radial direction.

In the seventh embodiment, in place of the disk 213 of the first embodiment (refer to FIG. 4), two disks 511 are provided. Both the disks 511 are made of a metal. Both the disks 511 have a perforated circular plate shape with a uniform thickness. The attachment shaft portion 28 of the piston rod 21 can be fitted into both the disks 511. The disks 511 have an outer diameter smaller than the outer diameters of the disks 211 and 212. The outer diameters of the disks 511 is smaller than the diameter of an inscribed circle connecting maximum outer diameter portions of the plurality of recessed portions 502 formed on the surface 505 side of the disk 85. The maximum outer diameter portions of the plurality of recessed portions 502 are disposed on the surface 505. The outer diameters of the disks 511 are smaller than the diameter of an inscribed circle connecting maximum outer diameter portions of the plurality of projecting portions 503 formed on the surface 505 side of the disk 85. The maximum outer diameter portions of the plurality of projecting portions 503 are disposed on the surface 505. All of the recessed portions 502 and the projecting portions 503 in their entirety are formed in the disk 85 to be separated radially outward from the abutting part with respect to the disks 511. The disks 511 do not interfere with any of the recessed portions 502 and the projecting portions 503. The total thickness of two disks 511 is larger than the heights of the projecting portions 503 of the disk 85 from the surface 505.

The disk 85 of the seventh embodiment has the same shape on both the front and rear sides. There is no need for this disk 85 to distinguish the front and the rear. The recessed portions 502 and the projecting portions 503 are formed in this disk 85. Accordingly, the disk 85 has a high rigidity on the outer circumferential side compared to the first embodiment in which these are not formed.

Here, the sizes and the depths of the recessed portions 502 and the sizes and the heights of the projecting portions 503 are set such that the surfaces 501 and 505 facing each other have a gap therebetween, in other words, the surfaces 501 and 505 facing each other are set such that they do not overlap each other in two disks 85 before the seal portion 86 is provided even if the recessed portions 502 on the surface 501 of the one disk 85 are positioned to be aligned with the projecting portions 503 on the surface 505 of the opposite disk 85 and the projecting portions 503 on the surface 501 of the one disk 85 are positioned to be aligned with the recessed portions 502 on the surface 505 of the opposite disk 85 to be stacked.

The outer circumferential side of the disk 85 is a side closer to the gap with respect to the outer cylindrical portion 73 of the pilot case 55. In the disk 85, the recessed portions 502 and the projecting portions 503 are alternately formed in the circumferential direction on this gap side.

In the seventh embodiment, the pilot valve 52 has a constitution in which the seal portion 86 constituted of an elastic member is fixedly attached to the surface 501 of the disk 85 through vulcanized adhesion. In this constitution, there is a need to apply an adhesive to the surface 501 of the disk 155 before being disposed in a die. In order to apply an adhesive to the surface 501 of the disk 85, for example, there is a need to manually perform work of applying the adhesive. Accordingly, there is room for improvement in regard to improvement in productivity.

In the seventh embodiment, in the disk 85, the recessed portions 502 and the projecting portions 503 are alternately formed in the circumferential direction. Accordingly, in the surface 501 or the surface 505 of the one disk 85 and the surface 501 or the surface 505 of the opposite disk 85, the outer circumferential side with respect to the recessed portions 502 and the projecting portions 503 is capable of coming into surface contact with each other. However, the opposite disk 85 does not come into surface contact with the inner circumferential side beyond the projecting portions 503 of the one disk 85. Moreover, since the recessed portions 502 and the projecting portions 503 are formed on the outer circumferential side of the disk 85, the area in which the disks 85 can come into surface contact with each other can be smaller than a predetermined value. Therefore, even if an adhesive is applied to the disk 85 through so-called dipping in which a plurality of disks 85 are put into a basket and are immersed in a liquid of an adhesive, sticking between the disks 85 can be suppressed. Thus, an adhesive can be applied to the disk 85 through dipping. Accordingly, an adhesive can be favorably applied to the surface 501 of the disk 85 within a short period of time. Therefore, productivity of the pilot valve 52 can be improved. As a result, productivity of the damper 1 can be improved.

In addition, in the disk 85, the recessed portions 502 and the projecting portions 503 are formed on the outer circumferential side. Accordingly, the rigidity of the outer circumferential side of the disk 85 is enhanced.

Eighth Embodiment

Figure 23:
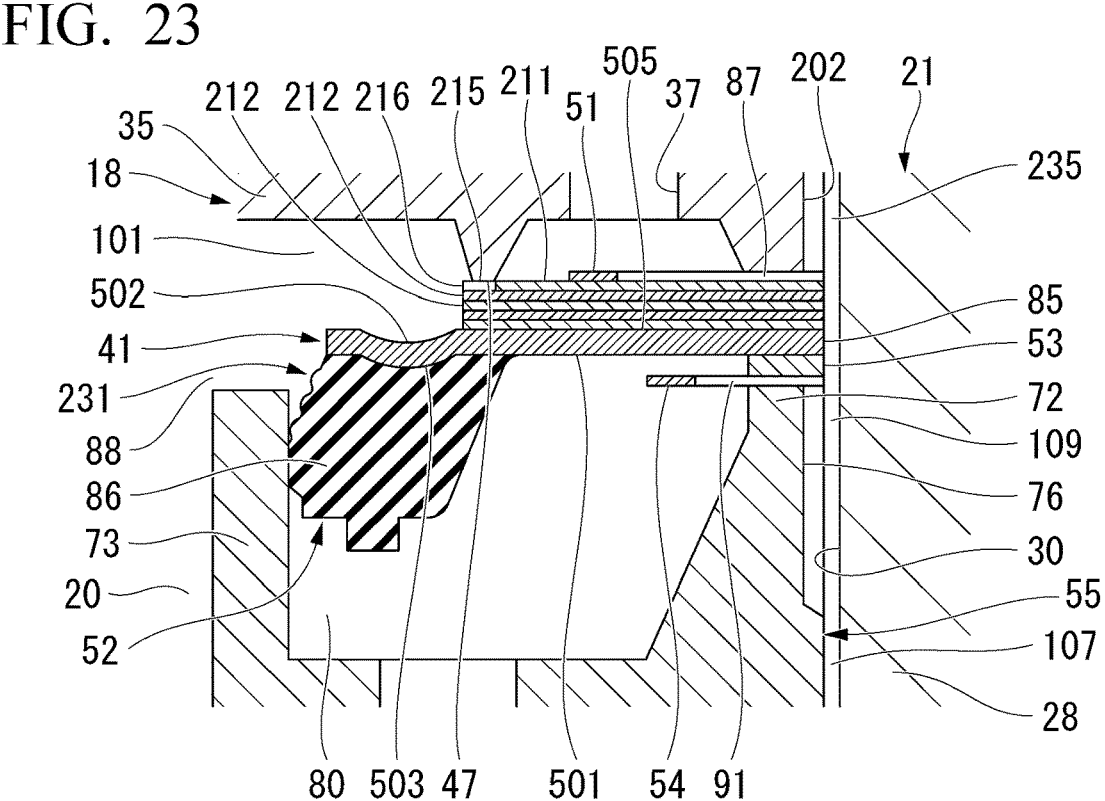
FIG. 23 is a partial cross-sectional view illustrating a part around the damping force generation mechanism of a damper of an eighth embodiment.
Figure 24:
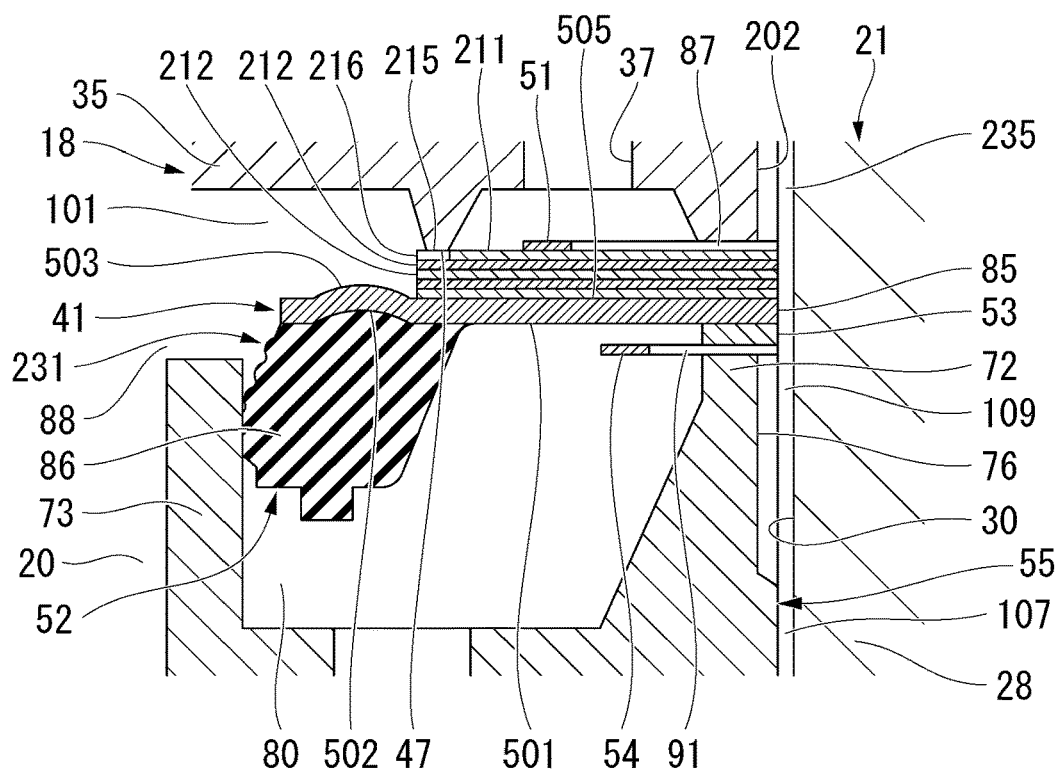
FIG. 24 is a partial cross-sectional view illustrating a part around the damping force generation mechanism of the damper of the eighth embodiment.

Next, an eighth embodiment will be described based on FIGS. 23 and 24, mainly focusing on parts different from the seventh embodiment. The parts in common with the seventh embodiment will be described with the same names and the same reference numbers.

In the eighth embodiment, the piston main body 35 of the piston 18 is different from that in the seventh embodiment. In addition, in the eighth embodiment, the disks 511 of the seventh embodiment are not provided. The pilot valve 52 is similar to that of the seventh embodiment.

In the piston main body 35 of the eighth embodiment, the outer diameter of the annular valve seat portion 47 is smaller than the diameter of an inscribed circle connecting maximum outer diameter portions of the plurality of recessed portions 502 formed on the surface 505 side of the disk 85 of the pilot valve 52. In addition, the outer diameter of the valve seat portion 47 is smaller than the diameter of an inscribed circle connecting maximum outer diameter portions of the plurality of projecting portions 503 formed on the surface 505 side of the disk 85.

In the disks 211 and 212 of the eighth embodiment, the outer diameter is smaller than the diameter of an inscribed circle connecting maximum outer diameter portions of the plurality of recessed portions 502 formed on the surface 505 side of the disk 85 of the pilot valve 52. In addition, the outer diameters of the disks 211 and 212 are smaller than the diameter of the inscribed circle connecting maximum outer diameter portions of the plurality of projecting portions 503 formed on the surface 505 side of the disk 85. All of the recessed portions 502 and the projecting portions 503 in their entirety are formed in the disk 212 to be separated radially outward from the abutting part with respect to the disks 85. Any of the recessed portions 502 and the projecting portions 503 do not interfere with the disks 211 and 212 and the piston main body 35.

In the eighth embodiment, the outer diameter of the valve seat portion 47 is smaller than that in the seventh embodiment. Thus, the pressure receiving area of the damping valve 231 of the eighth embodiment becomes smaller than that of the damping valve 231 of the seventh embodiment. As a result, the damping force generation mechanism 41 including the damping valve 231 of the eighth embodiment is unlikely to be opened. Thus, the damping force generation mechanism 41 of the eighth embodiment opens the valve when the piston speed becomes faster than that of the damping force generation mechanism 41 of the seventh embodiment. In other words, the damping force generation mechanism 41 of the seventh embodiment opens the valve even if the piston speed is lower than that of the damping force generation mechanism 41 of the eighth embodiment.

Ninth Embodiment

Figure 25:
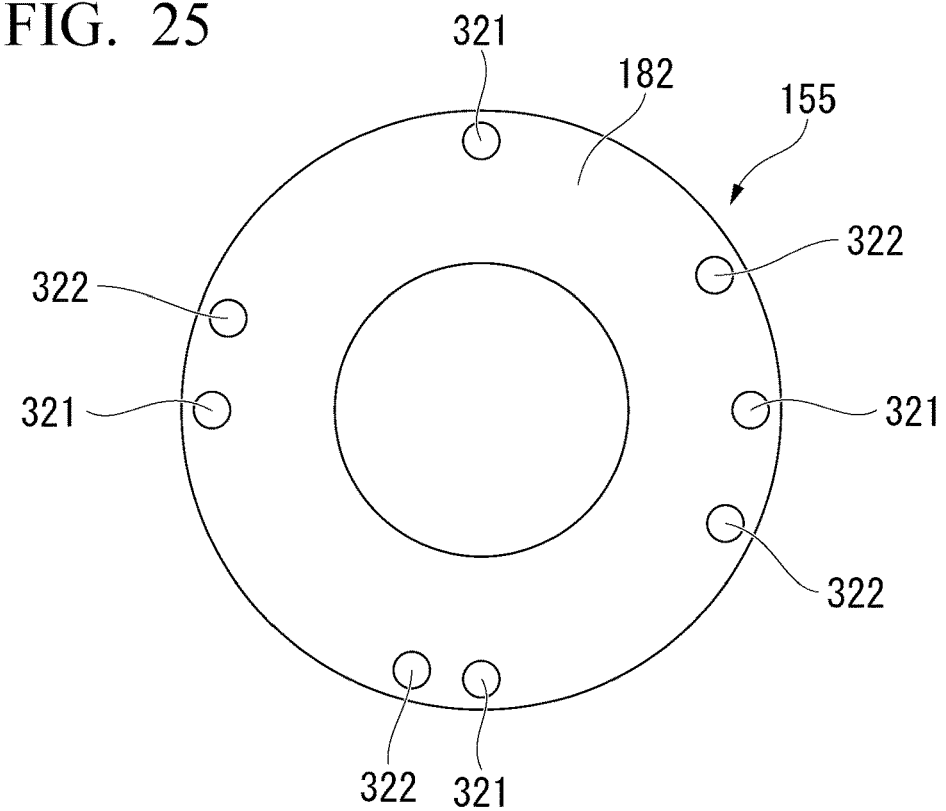
FIG. 25 is a plan view illustrating a disk of the partitioning disk of a damper of a ninth embodiment.

Next, a ninth embodiment will be described based on FIG. 25, mainly focusing on parts different from the sixth embodiment. The parts in common with the sixth embodiment will be described with the same names and the same reference numbers.

In the ninth embodiment, the disk 155 of the partitioning disk 134 is partially different from that in the sixth embodiment. In the ninth embodiment as well, as illustrated in FIG. 25, a plurality (specifically, four) of recessed portions 321 having the same shape and a plurality (specifically, four) projecting portions 322 having the same shape are formed on the surface 182 side of the disk 155. The recessed portions 321 and the projecting portions 322 formed on the surface 182 side of the disk 155 are also disposed at positions at an equal distance from the center of the disk 155. The recessed portions 321 and the projecting portions 322 formed on the surface 182 side of the disk 155 are alternately disposed at unequal intervals in the circumferential direction of the disk 155. In other words, the recessed portions 321 and the projecting portions 322 formed on the surface 182 side of the disk 155 are unevenly disposed in the circumferential direction of the disk 155.

Specifically, on the surface 182 side of the disk 155, four recessed portions 321 are disposed at a uniform pitches of 90 degrees. Four recessed portions 321 are referred to as a first recessed portion 321, a second recessed portion 321, a third recessed portion 321, and a fourth recessed portion 321, in order in the circumferential direction of the disk 155. On the surface 182, four projecting portions 322 are referred to as a first projecting portion 322, a second projecting portion 322, a third projecting portion 322, and a fourth projecting portion 322, in order in the circumferential direction of the disk 155. In the circumferential direction on the surface 182, the closest interval between the recessed portions 321 and the projecting portions 322 adjacent to each other is that between the first recessed portion 321 and the first projecting portion 322.

On the surface 182 side of the disk 155, the angle formed by the center of the first recessed portion 321, the center of the disk 155, and the center of the first projecting portion 322 is 15 degrees, which is the smallest. As a result, the angle formed by the center of the first projecting portion 322, the center of the disk 155, and the center of the second recessed portion 321 becomes 75 degrees. On the surface 182 side of the disk 155, the angle formed by the center of the second recessed portion 321, the center of the disk 155, and the center of the second projecting portion 322 is 20 degrees, which is the next smallest. As a result, the angle formed by the center of the second projecting portion 322, the center of the disk 155, and the center of the third recessed portion 321 becomes 70 degrees. On the surface 182 side of the disk 155, the angle formed by the center of the fourth recessed portion 321, the center of the disk 155, and the center of the fourth projecting portion 322 is 25 degrees, which is the next smallest. As a result, the angle formed by the center of the fourth projecting portion 322, the center of the disk 155, and the center of the first recessed portion 321 becomes 65 degrees. On the surface 182 side of the disk 155, the angle formed by the center of the fourth recessed portion 321, the center of the disk 155, and the center of the third projecting portion 322 is 30 degrees, which is the next smallest. As a result, the angle formed by the center of the third projecting portion 322, the center of the disk 155, and the center of the third recessed portion 321 becomes 60 degrees.

In the ninth embodiment (not illustrated) as well, the rear side of the projecting portions 322 protruding from the surface 182 to which the stopper portions 159 are fixedly attached constitutes the recessed portions 321 recessed from the flat surface 181. These recessed portions 321 have the same shape as the recessed portions 321 recessed from the surface 182. The rear side of the recessed portions 321 recessed from the surface 182 constitutes the projecting portions 322 protruding from the surface 181. These projecting portions 322 have the same shape as the projecting portions 322 protruding from the surface 182. Thus, the recessed portions 321 and the projecting portions 322 formed on the surface 181 side of the disk 155 are also alternately disposed at unequal intervals in the circumferential direction of the disk 155. In other words, the recessed portions 321 and the projecting portions 322 formed on the surface 181 side of the disk 155 are also unevenly disposed in the circumferential direction of the disk 155.

In the ninth embodiment, the rigidity of the disk 155 of the partitioning disk 134 in the circumferential direction becomes uneven. Thus, in the check valve 245 including the partitioning disk 134, the valve opening amount does not instantly expand but gradually expands.

In the ninth embodiment, a change with respect to the disk 155 of the partitioning disk 134 of the sixth embodiment has been described. The disk 85 of the pilot valve 52 of the seventh embodiment may be similarly changed to that in the ninth embodiment, and the recessed portions 502 and the projecting portions 503 may be unevenly disposed in the circumferential direction of the disk 85.

Tenth Embodiment

Figure 26:
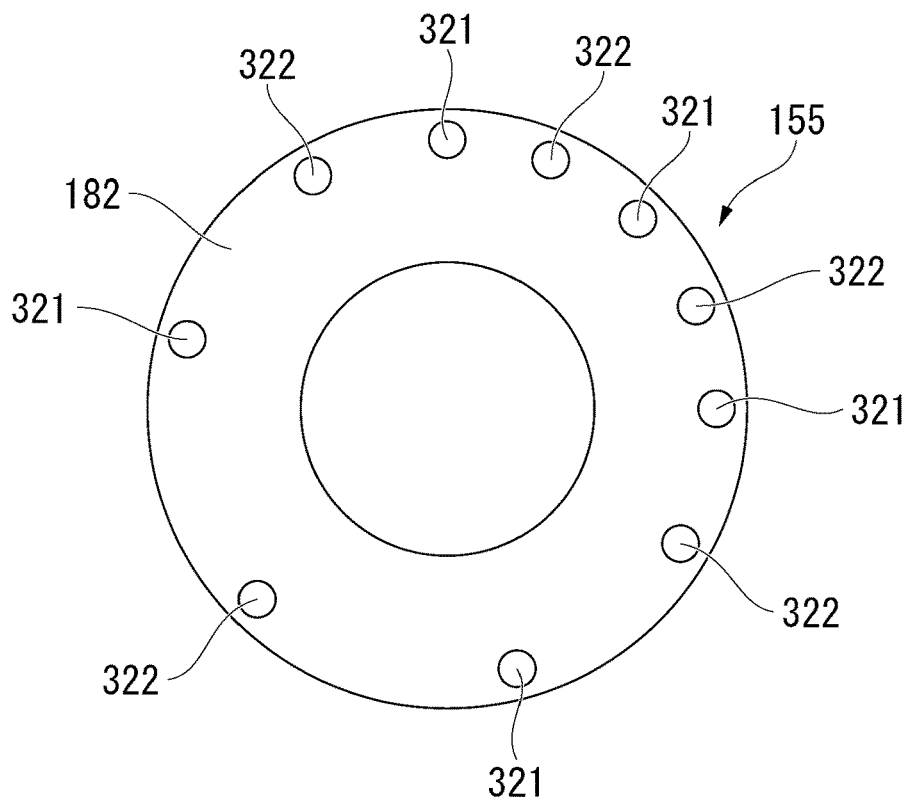
FIG. 26 is a plan view illustrating a disk of the partitioning disk of a damper of a tenth embodiment.

Next, a tenth embodiment will be described based on FIG. 26, mainly focusing on parts different from the ninth embodiment. The parts in common with the ninth embodiment will be described with the same names and the same reference numbers.

In the tenth embodiment, the disk 155 of the partitioning disk 134 is partially different from that in the ninth embodiment. In the tenth embodiment, a plurality (specifically, five) of recessed portions 321 having the same shape and a plurality (specifically, five) of projecting portions 322 having the same shape are formed on the surface 182 side of the disk 155. The recessed portions 321 and the projecting portions 322 formed on the surface 182 side of the disk 155 are also disposed at positions at an equal distance from the center of the disk 155. The recessed portions 321 and the projecting portions 322 formed on the surface 182 side of the disk 155 are alternately disposed at partially unequal intervals in the circumferential direction of the disk 155. The recessed portions 321 and the projecting portions 322 formed on the surface 182 side of the disk 155 are alternately disposed at partially equal intervals in the circumferential direction of the disk 155. In other words, the recessed portions 321 and the projecting portions 322 formed on the surface 182 side of the disk 155 are partially unevenly disposed in the circumferential direction of the disk 155. The recessed portions 321 and the projecting portions 322 formed on the surface 182 side of the disk 155 are partially evenly disposed in the circumferential direction of the disk 155.

Specifically, on the surface 182 side of the disk 155, five recessed portions 321 are referred to as the first recessed portion 321, the second recessed portion 321, the third recessed portion 321, the fourth recessed portion 321, and a fifth recessed portion 321, in order in the circumferential direction of the disk 155. On the surface 182 side, five projecting portions 322 are referred to as the first projecting portion 322, the second projecting portion 322, the third projecting portion 322, the fourth projecting portion 322, and a fifth projecting portions 322, in order in the circumferential direction of the disk 155. The first recessed portion 321, the first projecting portion 322, the second recessed portion 321, the second projecting portion 322, and the third recessed portion 321 are disposed at a pitch of 22.5 degrees, which is the smallest. On the surface 182 side of the disk 155, the angle formed by the center of the third recessed portion 321, the center of the disk 155, and the center of the third projecting portion 322 is 30 degrees. On the surface 182 side of the disk 155, the angle formed by the center of the third projecting portion 322, the center of the disk 155, and the center of the fourth recessed portion 321 is 45 degrees. On the surface 182 side of the disk 155, the angle formed by the center of the fourth recessed portion 321, the center of the disk 155, and the center of the fourth projecting portion 322 is 60 degrees. On the surface 182 side of the disk 155, the angle formed by the center of the fourth projecting portion 322, the center of the disk 155, and the center of the fifth recessed portion 321 is 60 degrees. On the surface 182 side of the disk 155, the angle formed by the center of the fifth recessed portion 321, the center of the disk 155, and the center of the fifth projecting portions 322 is 45 degrees. On the surface 182 side of the disk 155, the angle formed by the center of the fifth projecting portions 322, the center of the disk 155, and the center of the first recessed portion 321 is 30 degrees. As a result, on the surface 182 side of the disk 155, the second recessed portion 321 and the fourth projecting portion 322 are disposed at positions of 180 degrees, and the remaining recessed portions 321 and the remaining projecting portions 322 are disposed in line symmetry based on the line connecting these.

In the tenth embodiment (not illustrated) as well, the rear side of the projecting portions 322 protruding from the surface 182 to which the stopper portions 159 are fixedly attached constitutes the recessed portions 321 recessed from the flat surface 181. These recessed portions 321 have the same shape as the recessed portions 321 recessed from the surface 182. The rear side of the recessed portions 321 recessed from the surface 182 constitutes the projecting portions 322 protruding from the surface 181. These projecting portions 322 have the same shape as the projecting portions 322 protruding from the surface 182. Thus, in the tenth embodiment as well, the recessed portions 321 and the projecting portions 322 formed on the surface 181 side of the disk 155 are also alternately disposed at partially unequal intervals in the circumferential direction of the disk 155. The recessed portions 321 and the projecting portions 322 formed on the surface 181 side of the disk 155 are alternately disposed at partially equal intervals in the circumferential direction of the disk 155. In other words, the recessed portions 321 and the projecting portions 322 formed on the surface 181 side of the disk 155 are partially unevenly disposed in the circumferential direction of the disk 155. The recessed portions 321 and the projecting portions 322 formed on the surface 181 side of the disk 155 are partially evenly disposed in the circumferential direction of the disk 155.

In the tenth embodiment as well, the rigidity of the disk 155 of the partitioning disk 134 in the circumferential direction becomes partially uneven. Thus, in the check valve 245 including the partitioning disk 134, the valve opening amount does not instantly expand but gradually expands.

In the tenth embodiment, a change with respect to the disk 155 of the partitioning disk 134 of the ninth embodiment has been described. The disk 85 of the pilot valve 52 of the seventh embodiment may be similarly changed to that in the tenth embodiment, and the recessed portions 502 and the projecting portions 503 may be partially unevenly disposed and may be partially evenly disposed in the circumferential direction of the disk 85.

Eleventh Embodiment

Figure 27:
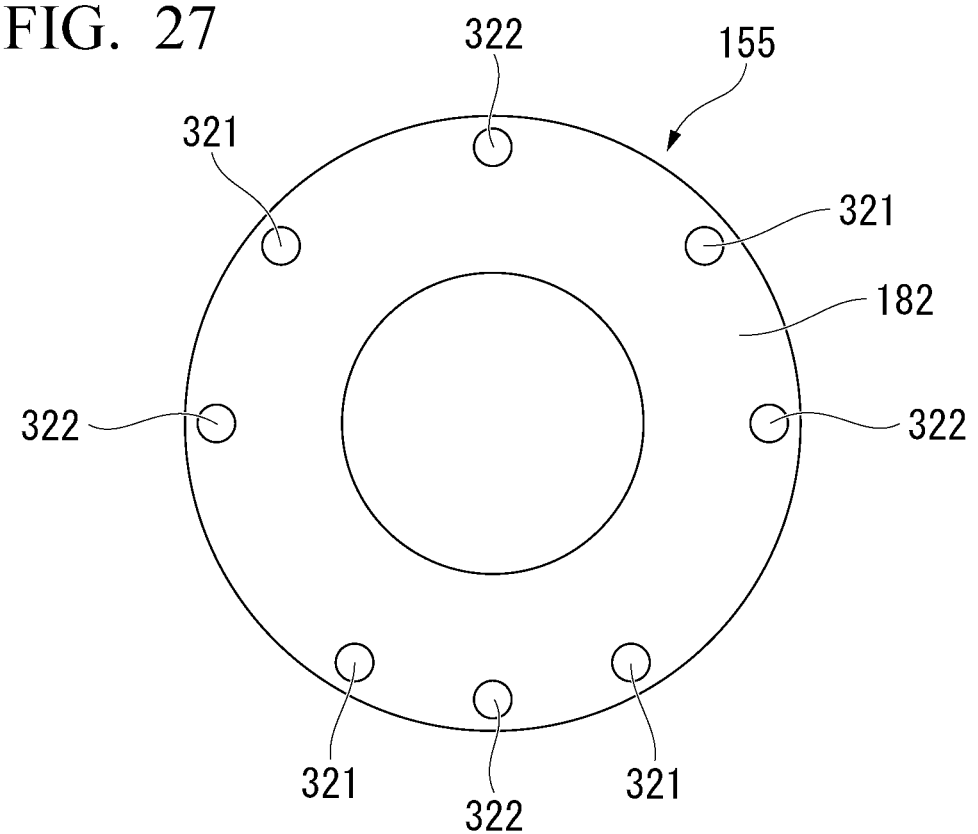
FIG. 27 is a plan view illustrating a disk of the partitioning disk of a damper of an eleventh embodiment.

Next, an eleventh embodiment will be described based on FIG. 27, mainly focusing on parts different from the ninth embodiment. The parts in common with the ninth embodiment will be described with the same names and the same reference numbers.

In the eleventh embodiment, the disk 155 of the partitioning disk 134 is partially different from that in the ninth embodiment. In the eleventh embodiment, the recessed portions 321 and the projecting portions 322 formed on the surface 182 side of the disk 155 are alternately disposed at partially unequal intervals in the circumferential direction of the disk 155. The recessed portions 321 and the projecting portions 322 formed on the surface 182 side of the disk 155 are alternately disposed at partially equal intervals in the circumferential direction of the disk 155. In other words, the recessed portions 321 and the projecting portions 322 formed on the surface 182 side of the disk 155 are partially unevenly disposed in the circumferential direction of the disk 155. The recessed portions 321 and the projecting portions 322 formed on the surface 182 side of the disk 155 are partially evenly disposed in the circumferential direction of the disk 155.

Specifically, on the surface 182 side of the disk 155, four recessed portions 321 are referred to as the first recessed portion 321, the second recessed portion 321, the third recessed portion 321, and the fourth recessed portion 321, in order in the circumferential direction of the disk 155. On the surface 182 side of the disk 155, four projecting portions 322 are referred to as the first projecting portion 322, the second projecting portion 322, the third projecting portion 322, and the fourth projecting portion 322, in order in the circumferential direction of the disk 155. The first recessed portion 321, the first projecting portion 322, and the second recessed portion 321 are disposed at a pitch of 30 degrees, which is the smallest. On the surface 182 side of the disk 155, the angle formed by the center of the second recessed portion 321, the center of the disk 155, and the center of the second projecting portion 322 is 60 degrees. On the surface 182 side of the disk 155, the angle formed by the center of the second projecting portion 322, the center of the disk 155, and the center of the third recessed portion 321 is 40 degrees. On the surface 182 side of the disk 155, the angle formed by the center of the third recessed portion 321, the center of the disk 155, and the center of the third projecting portion 322 is 50 degrees. On the surface 182 side of the disk 155, the angle formed by the center of the third projecting portion 322, the center of the disk 155, and the center of the fourth recessed portion 321 is 50 degrees. On the surface 182 side of the disk 155, the angle formed by the center of the fourth recessed portion 321, the center of the disk 155, and the center of the fourth projecting portion 322 is 40 degrees. On the surface 182 side of the disk 155, the angle formed by the center of the fourth projecting portion 322, the center of the disk 155, and the center of the first recessed portion 321 is 60 degrees. As a result, on the surface 182 side of the disk 155, the first projecting portion 322 and the third projecting portion 322 are disposed at positions of 180 degrees, and the remaining recessed portions 321 and the remaining projecting portions 322 are disposed in line symmetry based on the line connecting these.

In the eleventh embodiment (not illustrated) as well, the rear side of the projecting portions 322 protruding from the surface 182 to which the stopper portions 159 are fixedly attached constitutes the recessed portions 321 recessed from the flat surface 181. These recessed portions 321 have the same shape as the recessed portions 321 recessed from the surface 182. The rear side of the recessed portions 321 recessed from the surface 182 constitutes the projecting portions 322 protruding from the surface 181. These projecting portions 322 have the same shape as the projecting portions 322 protruding from the surface 182. Thus, the recessed portions 321 and the projecting portions 322 formed on the surface 181 side of the disk 155 are also alternately disposed at partially unequal intervals in the circumferential direction of the disk 155. The recessed portions 321 and the projecting portions 322 formed on the surface 181 side of the disk 155 are alternately disposed at partially equal intervals in the circumferential direction of the disk 155. In other words, the recessed portions 321 and the projecting portions 322 formed on the surface 181 side of the disk 155 are partially unevenly disposed in the circumferential direction of the disk 155. The recessed portions 321 and the projecting portions 322 formed on the surface 181 side of the disk 155 are partially evenly disposed in the circumferential direction of the disk 155.

In the eleventh embodiment as well, the rigidity of the disk 155 of the partitioning disk 134 in the circumferential direction becomes partially uneven. Thus, in the check valve 245 including the partitioning disk 134, the valve opening amount does not instantly expand but gradually expands.

In the eleventh embodiment, a change with respect to the disk 155 of the partitioning disk 134 of the ninth embodiment has been described. The disk 85 of the pilot valve 52 of the seventh embodiment may be similarly changed to that in the eleventh embodiment, and the recessed portions 502 and the projecting portions 503 may be partially unevenly disposed in the circumferential direction of the disk 85.

The foregoing embodiments have described examples applying the present invention in a double cylinder oil pressure damper. However, the embodiments are not limited thereto. The present invention may be applied to a monotube oil pressure damper in which an outer cylinder is removed and a gas chamber is formed by a partitioning element which can slide to a side opposite to the upper chamber 19 in the lower chamber 20 inside the cylinder 2. The present invention can be applied to various kinds of dampers including a pressure control valve that uses a packing valve having a structure in which a seal member is provided in a disk. Naturally, the present invention can also be applied to the foregoing damping force generation mechanism 42 on the compression side. The present invention can also be applied to the foregoing base valve 25. In addition, the present invention can also be applied to a case where an oil passage communicating with the inside of the cylinder 2 is provided outside the cylinder 2 and a damping force generation mechanism is provided in this oil passage. In addition, the foregoing embodiments have been described with an example of an oil pressure damper. However, water or air can also be used as a fluid.

According to a first aspect of the embodiments described above, there is provided a damper including a cylinder in which a working fluid is enclosed, a piston which is slidably inserted into the cylinder, a piston rod which is connected with the piston, a disk valve which is provided to restrict a flow of a working fluid caused by sliding of the piston and to close an opening portion of a tubular case member, an annular seal portion which is provided on at least one surface side of the disk valve, and a chamber which is partitioned by the disk valve and the seal portion. Recessed portions and projecting portions are alternately formed in the disk valve. Accordingly, productivity can be further improved.

In a second aspect, according to the first aspect, the chamber is a pilot chamber causing a pressure in a valve closing direction to act on the disk valve. Opening of the disk valve is controlled using the pressure in the pilot chamber.

In a third aspect, according to the first aspect, the damper further includes a first passage in which a working fluid flows in accordance with movement of the piston; a second passage which is provided to be parallel to the first passage; a damping force generation mechanism which is provided in the first passage and generates a damping force; the case member in which at least a part of the second passage is formed; a shaft portion which is disposed inside the case member; the disk valve which is disposed inside the case member while being internally penetrated by the shaft portion, which is supported by an inner circumferential side or an outer circumferential side, in which the seal portion sealing a part between the disk valve and the case member or a part between the disk valve and the shaft portion is provided on one surface side that is a non-support side, and in which an elastic portion is provided on an opposite surface side; and two case chambers which are provided to be defined by the disk valve and the seal portion inside the case member. The disk valve is provided to block circulation of a working fluid to at least one side in the second passage.

In a fourth aspect, according to any one of the first to third aspects, the recessed portions and the projecting portions are provided at positions where the seal portion of the disk valve is fixedly attached.

In a fifth aspect, according to any one of the first to third aspects, the recessed portions and the projecting portions are positioned on the radially inner circumferential side with respect to the position where the seal portion of the disk valve is fixedly attached.

In a sixth aspect, according to any one of the first to fifth aspects, the recessed portions and the projecting portions are evenly disposed in a circumferential direction of the disk valve.

In a seventh aspect, according to any one of the first to fifth aspects, the recessed portions and the projecting portions are unevenly disposed in the circumferential direction of the disk valve.

In an eighth aspect, according to the third aspect, the elastic portion is partially and fixedly attached to the opposite surface side of the disk valve in the circumferential direction.

In a ninth aspect, according to the third aspect, an annular gap is provided between the disk valve and the case member or the shaft portion. The seal portion and the elastic portion are connected with each other with the gap therebetween. A plurality of cut portions are provided on the gap side of the disk valve.

In a tenth aspect, according to the third aspect, a side radially opposite to a part of the disk valve to which the elastic portion is fixedly attached becomes a supporting point when the disk valve is bent.

According to an eleventh aspect, there is provided a damper including a cylinder in which a working fluid is enclosed; a piston which is slidably fitted into the cylinder and partitions an inside of the cylinder into two cylinder chambers; a piston rod of which one end side is connected with the piston and of which an opposite end side extends to an outside of the cylinder; a first passage in which a working fluid flows out from one cylinder chamber in accordance with movement of the piston; a second passage which is provided to be parallel to the first passage; a damping force generation mechanism which is provided in the first passage and generates a damping force; a tubular case member in which at least a part of the second passage is formed; a shaft portion which is disposed inside the case member; an annular bendable disk which is disposed inside the case member while being internally penetrated by the shaft portion, which is supported by an inner circumferential side or an outer circumferential side, and in which an annular elastic member sealing a part between the disk and the case member or a part between the disk and the shaft portion is provided on a non-support side; and two case chambers which are provided to be defined by the disk and the elastic member inside the case member. The disk is provided to block circulation of a working fluid to at least one side in the second passage. An annular gap is provided between the disk and the case member or the shaft portion. The elastic member is provided to be fixedly attached to both surfaces of the disk with the gap therebetween. In the elastic member, a seal portion is provided on one surface side of the disk, and a stopper portion is provided on an opposite surface side. The elastic member is partially and fixedly attached to the opposite surface of the disk in a circumferential direction. Accordingly, productivity can be improved.

According to a twelfth aspect, there is provided a damper including a cylinder in which a working fluid is enclosed; a piston which is slidably fitted into the cylinder and partitions an inside of the cylinder into two cylinder chambers; a piston rod of which one end side is connected with the piston and of which an opposite end side extends to an outside of the cylinder; a first passage in which a working fluid flows out from one cylinder chamber in accordance with movement of the piston; a second passage which is provided to be parallel to the first passage; a damping force generation mechanism which is provided in the first passage and generates a damping force; a tubular case member in which at least a part of the second passage is formed; a shaft portion which is disposed inside the case member; an annular bendable disk which is disposed inside the case member while being internally penetrated by the shaft portion, which is supported by an inner circumferential side or an outer circumferential side, and in which an annular elastic member sealing a part between the disk and the case member or a part between the disk and the shaft portion is provided on a non-support side; and two case chambers which are provided to be defined by the disk and the elastic member inside the case member. The disk is provided to block circulation of a working fluid to at least one side in the second passage. An annular gap is provided between the disk and the case member or the shaft portion. The elastic member is provided to be fixedly attached to both surfaces of the disk with the gap therebetween. In the elastic member, a seal portion is provided on one surface side of the disk, and a stopper portion is provided on an opposite surface side. A plurality of cut portions are provided on the gap side of the disk. Accordingly, productivity can be improved.

In a thirteenth aspect, according to the eleventh or twelfth aspect, on a side opposite to the gap of the disk, recessed portions and projecting portions are alternately formed in the circumferential direction. Accordingly, productivity can be further improved.

INDUSTRIAL APPLICABILITY

According to the foregoing dampers, productivity can be improved.

REFERENCE SIGNS LIST

1 Damper
2 Cylinder
18 Piston
19 Upper chamber (one cylinder chamber, cylinder chamber)

20 Lower chamber (cylinder chamber)
21 Piston rod
28 Attachment shaft portion (shaft portion)
41 Damping force generation mechanism
55 Pilot case (case member)
80 Pilot chamber (chamber)
85 Disk (disk valve)
86 Seal portion
101 Passage (first passage)
107 Passage (second passage)
131 Case main body (case member)
155 Disk (disk valve)
156 Elastic member
158 Seal portion
159 Stopper portion (elastic portion)
171 Variable chamber (chamber, case chamber)
172 Variable chamber (chamber, case chamber)
181 One surface
182 Opposite surface
302 Cut portion
321, 502 Recessed portion
322, 503 Projecting portion

The invention claimed is:

1. A damper comprising:
a cylinder in which a working fluid is enclosed;
a piston which is slidably inserted into the cylinder;
a piston rod which is connected with the piston;
a disk valve which is provided to restrict a flow of a working fluid caused by sliding of the piston and to close an opening portion of a tubular case member;
an annular seal portion which is provided on at least one surface side of the disk valve; and
a chamber which is partitioned by the disk valve and the seal portion,
wherein recessed portions and projecting portions are alternately formed in the disk valve, and
wherein the recessed portions and the projecting portions are provided at positions where the seal portion of the disk valve is fixedly attached.

2. A damper comprising:
a cylinder in which a working fluid is enclosed;
a piston which is slidably inserted into the cylinder;
a piston rod which is connected with the piston;
a disk valve which is provided to restrict a flow of a working fluid caused by sliding of the piston and to close an opening portion of a tubular case member;
an annular seal portion which is provided on at least one surface side of the disk valve; and
a chamber which is partitioned by the disk valve and the seal portion,
wherein recessed portions and projecting portions are alternately formed in the disk valve, and
wherein the recessed portions and the projecting portions are positioned on the radially inner circumferential side with respect to the position where the seal portion of the disk valve is fixedly attached.

3. The damper according to claim 1,
wherein the chamber is a pilot chamber causing a pressure in a valve closing direction to act on the disk valve, and opening of the disk valve is controlled using the pressure in the pilot chamber.

4. The damper according to claim 1, further comprising:
a first passage in which a working fluid flows in accordance with movement of the piston;
a second passage which is provided to be parallel to the first passage;
a damping force generation mechanism which is provided in the first passage and generates a damping force;
the case member in which at least a part of the second passage is formed;
a shaft portion which is disposed inside the case member;
the disk valve which is disposed inside the case member while being internally penetrated by the shaft portion, which is supported by an inner circumferential side or an outer circumferential side, in which the seal portion sealing a part between the disk valve and the case member or a part between the disk valve and the shaft portion is provided on one surface side that is a non-support side, and in which an elastic portion is provided on an opposite surface side; and
two case chambers which are provided to be defined by the disk valve and the seal portion inside the case member,
wherein the disk valve is provided to block circulation of a working fluid to at least one side in the second passage.

5. The damper according to claim 1,
wherein the recessed portions and the projecting portions are evenly disposed in a circumferential direction of the disk valve.

6. The damper according to claim 1,
wherein the recessed portions and the projecting portions are unevenly disposed in the circumferential direction of the disk valve.

7. The damper according to claim 4,
wherein the elastic portion is partially and fixedly attached to the opposite surface side of the disk valve in the circumferential direction.

8. The damper according to claim 4,
wherein an annular gap is provided between the disk valve and the case member or the shaft portion,
wherein the seal portion and the elastic portion are connected with each other with the gap therebetween, and
wherein a plurality of cut portions are provided on the gap side of the disk valve.

9. The damper according to claim 4,
wherein a side radially opposite to a part of the disk valve to which the elastic portion is fixedly attached becomes a supporting point when the disk valve is bent.

10. A damper comprising:
a cylinder in which a working fluid is enclosed;
a piston which is slidably fitted into the cylinder and partitions an inside of the cylinder into two cylinder chambers;
a piston rod of which one end side is connected with the piston and of which an opposite end side extends to an outside of the cylinder;
a first passage in which a working fluid flows out from one cylinder chamber in accordance with movement of the piston;
a second passage which is provided to be parallel to the first passage;
a damping force generation mechanism which is provided in the first passage and generates a damping force;
a tubular case member in which at least a part of the second passage is formed;
a shaft portion which is disposed inside the case member;
an annular bendable disk which is disposed inside the case member while being internally penetrated by the shaft portion, which is supported by an inner circumferential side or an outer circumferential side, and in which an annular elastic member sealing a part between the disk and the case member or a part between the disk and the shaft portion is provided on a non-support side; and two case chambers which are provided to be defined by the disk and the elastic member inside the case member, wherein the disk is provided to block circulation of a working fluid to at least one side in the second passage, wherein an annular gap is provided between the disk and the case member or the shaft portion, the elastic member is provided to be fixedly attached to both surfaces of the disk with the gap therebetween, a seal portion is provided on one surface side of the disk, and a stopper portion is provided on an opposite surface side, and wherein the elastic member is partially and fixedly attached to the opposite surface of the disk in a circumferential direction.

11. A damper comprising:

a cylinder in which a working fluid is enclosed;

a piston which is slidably fitted into the cylinder and partitions an inside of the cylinder into two cylinder chambers;

a piston rod of which one end side is connected with the piston and of which an opposite end side extends to an outside of the cylinder;

a first passage in which a working fluid flows out from one cylinder chamber in accordance with movement of the piston;

a second passage which is provided to be parallel to the first passage;

a damping force generation mechanism which is provided in the first passage and generates a damping force;

a tubular case member in which at least a part of the second passage is formed;

a shaft portion which is disposed inside the case member;

an annular bendable disk which is disposed inside the case member while being internally penetrated by the shaft portion, which is supported by an inner circumferential side or an outer circumferential side, and in which an annular elastic member sealing a part between the disk and the case member or a part between the disk and the shaft portion is provided on a non-support side; and two case chambers which are provided to be defined by the disk and the elastic member inside the case member, wherein the disk is provided to block circulation of a working fluid to at least one side in the second passage, wherein an annular gap is provided between the disk and the case member or the shaft portion, wherein the elastic member is provided to be fixedly attached to both surfaces of the disk with the gap therebetween, a seal portion is provided on one surface side of the disk, and a stopper portion is provided on an opposite surface side, and wherein a plurality of cut portions are provided on the gap side of the disk.

* * * * *